(12) United States Patent
Anderson

(10) Patent No.: US 10,503,755 B2
(45) Date of Patent: Dec. 10, 2019

(54) DATA CLUSTERING, SEGMENTATION, AND PARALLELIZATION

(71) Applicant: Arlen Anderson, Islip (GB)

(72) Inventor: Arlen Anderson, Islip (GB)

(73) Assignee: Ab Initio Technology LLC, Lexington, MA (US)

(*) Notice: Subject to any disclaimer, the term of this patent is extended or adjusted under 35 U.S.C. 154(b) by 1609 days.

(21) Appl. No.: 13/677,991

(22) Filed: Nov. 15, 2012

(65) Prior Publication Data

US 2013/0124474 A1 May 16, 2013

Related U.S. Application Data

(60) Provisional application No. 61/560,257, filed on Nov. 15, 2011, provisional application No. 61/660,259, filed on Jun. 15, 2012.

(51) Int. Cl.
*G06F 16/28* (2019.01)
*G06F 16/20* (2019.01)
(Continued)

(52) U.S. Cl.
CPC ............ *G06F 16/285* (2019.01); *G06F 16/20* (2019.01); *G06F 16/24534* (2019.01); *G06F 16/3338* (2019.01)

(58) Field of Classification Search
USPC ....................................................... 707/634
See application file for complete search history.

(56) References Cited

U.S. PATENT DOCUMENTS

| 5,179,643 A | 1/1993 | Homma et al. |
| 5,388,259 A | 2/1995 | Fleischman et al. |

(Continued)

FOREIGN PATENT DOCUMENTS

| CN | 101583949 | 11/2009 |
| CN | 101751400 | 6/2010 |

(Continued)

OTHER PUBLICATIONS

Zorrilla et al., "Vertical Partitioning Algorithms in Distributed Databases," Computer Aided Systems Theory—Eurocast '99 Lecture Noted in Computer Sceience;LNCS, Springer, Berlin, DE, pp. 465-474 XP019048781.

(Continued)

*Primary Examiner* — Muluemebet Gurmu
(74) *Attorney, Agent, or Firm* — Occhiuti & Rohlicek LLP

(57) ABSTRACT

A first set of original records is processed by a first processing entity to generate a second set of records that includes the original records and one or more copies of each original record, each original record including one or more fields. The processing of each of at least some of the original records includes: generating at least one copy of the original record, and associating a first segment value with the original record and associating a second segment value with the copy. The method also includes partitioning the second set of records among a plurality of recipient processing entities based on the segment values associated with the records in the second set, and, at each recipient processing entity, performing an operation based on one or more data values of the records received at the recipient processing entity to generate results.

40 Claims, 40 Drawing Sheets

(51) Int. Cl.
    *G06F 16/33*       (2019.01)
    *G06F 16/2453*     (2019.01)

(56)             References Cited

U.S. PATENT DOCUMENTS

| | | | |
|---|---|---|---|
| 5,832,182 | A | 11/1998 | Zhang et al. |
| 6,026,398 | A | 2/2000 | Brown et al. |
| 6,285,995 | B1 | 9/2001 | Abdel-Mottaleb et al. |
| 6,317,707 | B1 | 11/2001 | Bangalore et al. |
| 6,456,995 | B1 | 9/2002 | Salo et al. |
| 6,493,709 | B1 | 12/2002 | Aiken |
| 6,581,058 | B1 | 6/2003 | Fayyad et al. |
| 6,658,626 | B1 | 12/2003 | Aiken |
| 7,043,476 | B2 | 5/2006 | Robson |
| 7,246,128 | B2 | 7/2007 | Jordahl |
| 7,283,999 | B1 | 10/2007 | Ramesh et al. |
| 7,287,019 | B2 | 10/2007 | Kapoor et al. |
| 7,472,113 | B1 | 12/2008 | Watson et al. |
| 7,584,205 | B2 | 9/2009 | Stanfill et al. |
| 7,634,464 | B2 | 12/2009 | Chen et al. |
| 7,672,833 | B2 | 3/2010 | Blume et al. |
| 7,912,842 | B1 | 3/2011 | Bayliss |
| 8,032,546 | B2 | 10/2011 | Arasu et al. |
| 8,175,875 | B1 | 5/2012 | Dean et al. |
| 8,195,626 | B1 | 6/2012 | Goodwin |
| 8,433,715 | B1 | 4/2013 | Mirhaji |
| 8,463,742 | B1* | 6/2013 | Floyd et al. ............... 707/609 |
| 9,535,954 | B2 | 1/2017 | Narita |
| 2002/0002454 | A1 | 1/2002 | Bangalore et al. |
| 2002/0099536 | A1 | 7/2002 | Bordner et al. |
| 2002/0124015 | A1 | 9/2002 | Cardno et al. |
| 2003/0018652 | A1 | 1/2003 | Heckerman et al. |
| 2003/0033138 | A1 | 2/2003 | Bangalore |
| 2003/0041047 | A1 | 2/2003 | Chang et al. |
| 2003/0065958 | A1* | 4/2003 | Hansen et al. ............. 713/300 |
| 2003/0120630 | A1 | 6/2003 | Tunkelang |
| 2003/0182310 | A1 | 9/2003 | Charnock et al. |
| 2004/0015498 | A1 | 1/2004 | Rabaioli |
| 2004/0024720 | A1 | 2/2004 | Fairweather |
| 2004/0036716 | A1 | 2/2004 | Jordahl |
| 2004/0064303 | A1 | 4/2004 | Bangalore et al. |
| 2004/0073534 | A1 | 4/2004 | Robson |
| 2004/0139072 | A1 | 7/2004 | Broder et al. |
| 2004/0249789 | A1 | 12/2004 | Kapoor et al. |
| 2005/0038784 | A1 | 2/2005 | Zait et al. |
| 2005/0120011 | A1 | 6/2005 | Dehlinger et al. |
| 2005/0262044 | A1 | 11/2005 | Chadhuri et al. |
| 2006/0004744 | A1* | 1/2006 | Nevidomski et al. ........... 707/4 |
| 2006/0036593 | A1 | 2/2006 | Dean et al. |
| 2006/0059173 | A1 | 3/2006 | Hirsch et al. |
| 2006/0059207 | A1 | 3/2006 | Hirsch et al. |
| 2006/0253418 | A1 | 11/2006 | Charnock et al. |
| 2007/0112714 | A1 | 5/2007 | Fairweather |
| 2007/0156614 | A1 | 7/2007 | Flinn et al. |
| 2007/0239741 | A1 | 10/2007 | Jordahl |
| 2007/0244925 | A1 | 10/2007 | Albouze |
| 2008/0040342 | A1 | 2/2008 | Hust et al. |
| 2008/0140653 | A1 | 6/2008 | Matzke et al. |
| 2008/0162533 | A1 | 7/2008 | Mount et al. |
| 2008/0228802 | A1* | 9/2008 | Marshall ................... 707/102 |
| 2008/0249999 | A1 | 10/2008 | Renders et al. |
| 2009/0006394 | A1 | 1/2009 | Snapp et al. |
| 2009/0055380 | A1 | 2/2009 | Peng et al. |
| 2009/0171955 | A1 | 7/2009 | Merz et al. |
| 2009/0182728 | A1 | 7/2009 | Anderson |
| 2009/0234826 | A1 | 9/2009 | Bidlack |
| 2009/0319518 | A1 | 12/2009 | Koudas et al. |
| 2009/0327320 | A1 | 12/2009 | Yan et al. |
| 2010/0067745 | A1 | 3/2010 | Kovtun et al. |
| 2010/0106724 | A1 | 4/2010 | Anderson |
| 2010/0169299 | A1 | 7/2010 | Pollara |
| 2010/0169311 | A1 | 7/2010 | Tengli et al. |
| 2010/0231995 | A1 | 9/2010 | Tsunematsu |
| 2010/0268724 | A1 | 10/2010 | Nevidomski et al. |
| 2010/0274770 | A1 | 10/2010 | Gupta et al. |
| 2010/0274785 | A1 | 10/2010 | Procopiuc et al. |
| 2010/0281036 | A1 | 11/2010 | Inoue et al. |
| 2010/0332456 | A1 | 12/2010 | Prahlad et al. |
| 2011/0029536 | A1 | 2/2011 | Knight et al. |
| 2011/0113032 | A1 | 5/2011 | Boscolo et al. |
| 2011/0153577 | A1 | 6/2011 | Dean et al. |
| 2011/0213974 | A1 | 9/2011 | Ardon et al. |
| 2011/0302168 | A1 | 12/2011 | Aggarwal |
| 2012/0072421 | A1 | 3/2012 | Bhattacharya et al. |
| 2012/0158696 | A1 | 6/2012 | Arasu et al. |
| 2012/0209808 | A1 | 8/2012 | Tien et al. |
| 2013/0124524 | A1 | 5/2013 | Anderson |
| 2013/0297635 | A1 | 11/2013 | Bayliss |

FOREIGN PATENT DOCUMENTS

| | | |
|---|---|---|
| CN | 102067128 | 5/2011 |
| EP | 1302873 | 4/2003 |
| EP | 1962209 | 8/2008 |
| JP | H02-129756 | 5/1990 |
| JP | H06-044309 | 2/1994 |
| JP | H09-044518 | 2/1997 |
| JP | 10275159 | 10/1998 |
| JP | 11184884 | 7/1999 |
| JP | 2000029899 | 1/2000 |
| JP | 2003-006226 | 1/2003 |
| JP | 2007012039 | 1/2007 |
| WO | WO 01/31479 | 5/2001 |
| WO | WO 2005/073881 | 8/2005 |
| WO | WO 2006/102227 | 9/2006 |
| WO | 20120104943 | 8/2012 |

OTHER PUBLICATIONS

Japanese Office Action, with English translation, application No. 2010-543117, dated Nov. 6, 2013, 6 pages.

Japanese Office Action, with English translation, application No. 2011-533380, dated Oct. 10, 2013, 7 pages.

Whang et al., "Entity Resolution with Iterative Blocking" Computer Science Department, Stanford University, Stanford, CA 2008; 13 pages.

Talend "Matching Technology Improves Data Quality," White Paper pp. 1-18, (2010).

Sahoo, Nachiketa, "Incremental Hierarchical Clustering of Text Documents," May 5, 2006 (26 pages).

Hylton, Jeremy A. "Identifying and Merging Related Bibliographic Records," Massachusetts Institute of Technology, Jun. 1996 (99 pages).

Lewis et al., "RCV1: A New Benchmark Collection for Text Categorization Research," Journal of Machine Learning Research, 5:361-397 (2004).

Young et al., "A Fast and Stable Incremental Clustering Algorithm," (6 pages); Seventh International Conference on Information Technology. IEEE (2010).

IQ Associates, "Typical Match Merge Process Flowchart," 2009.

Mevedev, Timofey and Alexander Ulanov, "Company Names Matching in the Large Patents Datasts" HP Laboratories, 2011 (7 pages).

Kim, Hung-sik and Dongwon Lee, "HARRA: Fast Iterative Hashed Record Linkage for Large-Scale Data Collections" EDBT 2010, Mar. 22-26, 2010, Lausanne, Switzerland (12 pages).

De Vries et al., "Robust Record Linkage Blocking using Suffix Arrays" (2009) (10 pages).

McCallum et al., "Efficient Clustering of High Dimensional Data Sets with Application to Reference Matching," (2000) (10 pages).

Abdule-Wahab et al., "New Directions to Improve Clustering with a Scatter Search Based Algorithm" Technical Report n 283 Laboratoire d'Informatique Universit de Tours. R. Abdule-Wahab N. Monmarch M. Slimane M. Fandil and H. Saleh (2006) (14 pages).

Cohen, William and Jacob Richman, "Learning to March and Cluster Entity Names," Whizbang Labs, Pittsburg, PA in ACM SIGIR-2001 Workshop on Mathematical/Formal Methods in Information Retrieval (9 pages).

Ester et al., "Incremental Clustering for Mining in a Data Warehousing Environment," Proceedings of the $24^{th}$ VLDB Conference, New York, USA 1998 (11 pages).

(56) References Cited

OTHER PUBLICATIONS

Jain et al., "Data Clustering: A Review," ACM Computing Surveys, vol. 31, No. 3 (1999) (60 pages).
Ananthakrishna, Rohit et al., "Eliminating Fuzzy Duplicates in Data Warehouses." *Proceedings of the 28th VLDB Conference*, Hong Kong, China, 2002. 12 pages.
Atallah, M. J., et al., "A Randomized Algorithm for Approximate String Matching," Algorithmica, vol. 29, Springer-Verlag, New York, NY, 2001, pp. 468-486.
Baeza-Yates, Ricardo A. et al., "Fast and practical approximate string matching." Information Processing Letters, vol. 59, Issue 1, Jul. 8, 1996, pp. 21-27.
Bocek, Thomas et al., "Fast Similarity Search in Large Dictionaries." *Technical Report*, Department of Informatics, University of Zurich, Apr. 2007. 32 pages.
Bocek, Thomas et al., "Fast-Similarity Search in Peer-to-Peer Networks." *Network Operations and Management Symposium*, 2008. NOMS 2008. IEEE, Aug. 26, 2008. pp. 240-247.
Buss, Samuel R., et al., "A Bipartite Matching Approach to Approximate String Comparison and Search," CiteseerX—Scientific Digital Library and Search Engine, 1995, pp. I and 1-19.
Chaudhuri, Surajit, Presentation: "Robust and Efficient Fuzzy Match for Online Data Cleaning." *Databases and Information Management Seminar*, Stanford University. Downloaded from <http://www.es.ucsb.edu/~gayatri/Presentations/Robust%20and%20Efficient%20Fuzzy%20Match%20for%20Online%20Data.ppt>. on Oct. 19, 2009. 33 pages.
Chaudhuri, Surajit, et al., "Robust and Efficient Fuzzy Match for Online Data Cleaning," SIGMOD 2003, San Diego, CA, Jun. 9-12, 2003, pp. 313-324.
Christen, Peter, "Febrl—A Freely Available Record Linkage System with a Graphical User Interface." *Australasian Workshop on Health Data and Knowledge Management (HDKM 2008), Wollongong, NSW Australia, Conferences in Research and Practice in Information Technology (CRPIT)*, vol. 80, 2008. 9 pages.
Christen, Peter et al., "Towards Scalable Real-Time Entity Resolution Using a Similarity-Aware Inverted Index Approach." *Seventh Australasian Data Mining Conference (AusDM 2008), Glenelg, Australia, Conferences in Research and Practice in Information Technology (CRPIT)*, vol. 87, 2009. 10 pages.
Du, Mengmeng, "Approximate Name Matching." Master's Thesis in Computer Science at the School of Computer Science and Engineering, Royal Institute of Technology, Stockholm, Sweden, 2005. 55 pages.
Gu, Lifang, et al., "Adaptive Filtering for Efficient Record Linkage," Proceedings of the 4th SIAM International Conf. on Data Mining, Lake Buena Vista, FL, Apr. 22-24, 2004, pp. 477-481.
Gravano, Luis et al., "Approximate String Joins in a Database (Almost) for Free." *Proceedings of the 27th VLDB Conference*, Roma, Italy, 2001. 10 pages.
Hassanzadeh, Oldie, et al., "Accuracy of Approximate String Joins Using Grams," VLDB'07, Sep. 23-28, 2007, 8 pages.
Heller, Katherine A. et al., "Statistical Models for Partial Membership," Engineering Department, University of Cambridge, Cambridge, UK, copyright 2008, 8 pages.

"Inverse (mathematics)," Wikipedia, downloaded from: en.wikipedia.org/wiki/Inverse_(mathematics), Apr. 5, 2010, 1 page.
Marzal, Andrés et al., "Speeding Up the Computation of the Edit Distance for Cyclic Strings," Proceedings of the 15th International Conference on Pattern Recognition, Barcelona, Spain, Sep. 3-7, 2000, pp. 891-894.
Microsoft Computer Dictionary, Microsoft Press, Redmond, WA, 2002, p. 446.
Monge, Alvaro E. et al., "An efficient domain-independent algorithm for detecting approximately duplicate database records." CiteSeer 1997, pp. 1-7.
Navarro, Gonzalo, "A Guided Tour to Approximate String Matching." *ACM Computing Surveys*, vol. 33, No. 1, Mar. 2001. pp. 31-88.
Navarro, Gonzalo, et al., "Compressed Full-Text Indexes," ACM Computing Surveys (CSUR), vol. 39, Issue 1, Apr. 2007, pp. 1-66.
Navarro, Gonzalo et al., "Indexing Methods for Approximate String Matching." *IEEE Data Engineering Bulletin*, 24 (4), 2001. pp. 19-27.
Novak, David et al., Presentation: "Metric Index: An Efficient and Scalable Solution for Similarity Search." *SISAP 2009*, Prague, Aug. 29, 2009. 26 pages.
Parizeau, Marc et al., "Optimizing the Cost Matrix for Approximate String Matching Using Genetic Algorithms," Pattern Recognition, vol. 31, No. 4, 1998, pp. 431-440.
Pedrycz, Witold et al. "Fuzzy Systems Engineering Toward Human-Centric Computing," IEEE Press, Hoboken, New Jersey, Wiley & Sons, Inc. 2007.
Winkler, William E., "Frequency-Based Matching in Fellegi-Sunter Model of Record Linkage." Bureau of the Census Statistical Research Division, Statistical Research Report Series No. RR2000/06, dated Oct. 4, 2000, 14 pages.
Yamamoto, Eiko, "Dynamic Programming Matching for Large Scale Information Retrieval." *In Proceedings of the Sixth International Workshop on Information Retrieval with Asian Languages*, 2003. pp. 100-108.
Zadeh, L.A., "Fuzzy Sets." *Information and Control 8*, 1965. pp. 338-353.
Khan, Shehroz S. and Amir Ahmad, "Cluster Center Initialization Algorithm for K-means Clustering," Pattern Recognition Letters 25 1293-1302 (2004).
Kazuyo Narita and other one, Parallel String Similarity Joins using a Trie with Edit Distance Constraints, Proceedings of the 3rd Forum on Data Engineering and Information Management, The Institute of Electronics, Information and Communication Engineers, Special Section on Data Engineering, Aug. 4, 2011.
Yongli Liu et al: "Incremental Clustering Using Information Bottleneck Theory", International Journal of Pattern Recognition Andartificial Intelligence (IJPRAI), World Scientific Publishing, Si, vol. 25, No. 5, Aug. 1, 2011 (Aug. 1, 2011), pp. 695-712.
Young et al., "A fast and stable incremental clustering algorithm." in Information Technology: New Generations (ITNG), 2010, Seventh International Conference, IEEE, (2010) pp. 204-209.

\* cited by examiner

DATA CLUSTERING, SEGMENTATION, AND PARALLELIZATION

CROSS-REFERENCE TO RELATED APPLICATIONS

This application claims priority to U.S. Application Ser. No. 61/560,257, filed on Nov. 15, 2011, and U.S. Application Ser. No. 61/660,259, filed on Jun. 15, 2012, each of which is incorporated herein by reference.

BACKGROUND

This description relates to data clustering, segmentation, and parallelization.

Data clustering is a method whereby information that is substantially similar is labeled with a shared identifier so that it may later be processed as if the information had been grouped together in a common location. This information can include information of various types such as financial data or health care records, for example. Each cluster (among a set of multiple clusters) includes units of data (e.g., documents, database records, or other data objects) that have been determined to meet some similarity criterion. Some techniques are "off-line" techniques that process units of data as a batch to generate clusters or add to existing clusters. Some techniques are "on-line" techniques that process units of data incrementally as they are received. Clusters can be hierarchical, where a given cluster at one level is itself divided into multiple clusters at another level. In some cases, the clusters correspond to a partitioning of the data units in which each data unit is in exactly one of the clusters, and in some cases clusters may overlap with a data unit being a member of more than one cluster.

SUMMARY

In one aspect, in general, a method includes: processing a first set of original records by a first processing entity to generate a second set of records that includes the original records and one or more copies of each original record, each original record including one or more fields. The processing of each of at least some of the original records includes: generating at least one copy of the original record, and associating a first segment value with the original record and associating a second segment value with the copy, where the first segment value corresponds to a first portion of one or more data values of respective fields of the original record and the second segment value correspond to a second portion of the one or more data values of the respective fields of the original record different from the first portion. The method also includes partitioning the second set of records among a plurality of recipient processing entities based on the segment values associated with the records in the second set, and, at each recipient processing entity, performing an operation based on one or more data values of the records received at the recipient processing entity to generate results.

Aspects can include one or more of the following features.

The first segment value corresponds to a first sequence of characters from a first data value of a first field taken from a first set of positions of the characters in the first data value, and the second segment value corresponds to a second sequence of characters from the first data value taken from a second set of positions of the characters in the first data value.

The first set of positions are non-overlapping with the second set of positions.

The first set of positions are even positions relative to the first character of the data value, and the second set of positions are odd positions relative to the first character of the data value.

Associating a segment value with a record includes writing the associated segment value into a new field of the record.

Performing an operation based on the one or more data values of the records received at the recipient processing entity includes determining a match between character strings occurring in one or more data values of a first record and character strings occurring in one or more data values of at least a second record.

The match is an approximate match.

The approximate match allows the strings being matched to be different up to a specified edit distance.

The approximate match is based on a match criterion that defines allowed differences between a data value of the first record and a data value of the second record, and wherein, for each original record, the first portion of the one or more data values and the second portion of the one or more data values are selected so that at least one of the first segment value or the second segment value does not change in response to a change of the one or more data values according to any of the allowed differences.

The allowed differences include differences between a first character string occurring in the data value of the first record and a second character string occurring in the data value of the second record.

The allowed differences include differences between a first binary value occurring in the data value of the first record and a second binary value occurring in the data value of the second record.

Performing an operation based on the one or more data values of the records received at the recipient processing entity includes surrogate key assignment.

The results generated at the recipient processing entity include, for each record received at the recipient processing entity, the record augmented with an assigned surrogate key based on the one or more data values of the record.

Performing an operation based on the one or more data values of the records received at the recipient processing entity includes clustering the received records into one or more clusters.

The results generated at the recipient processing entity include, for each record received at the recipient processing entity, the record augmented with an assigned cluster based on the one or more data values of the record and the one or more data values of at least some of the other records received at the recipient processing entity.

The operation includes at least one of: surrogate key assignment, clustering, roll-up, or join.

The first segment value corresponds to a first portion of multiple data values of respective fields of the original record and the second segment value correspond to a second portion of the multiple data values of the respective fields of the original record different from the first portion.

The method further includes receiving results from each recipient processing entity at a second processing entity, and processing the received results to remove redundant results.

The second set of records includes the original records and at least one copy of each original record.

Processing the received results to remove redundant results includes selecting at most one of: a first result associated with an original record, or a second result associated with a copy of the original record.

The method further includes receiving results from each recipient processing entity at the first processing entity, and processing the received results to remove redundant results.

Each of the recipient processing entities perform the respective operations independently.

The number of recipient processing entities is at least as large as the smallest number of different segment values associated with each original record and its copies.

The processing entities are cores in a multicore processor, and the first processing entity sends the partitioned records from the second set of records to the recipient processing entities over an interconnection network in the multicore processor.

The processing entities are processors in a multi-processor computer system, and the first processing entity sends the partitioned records from the second set of records to the recipient processing entities over an interconnection network in the multi-processor computer system.

The processing entities are server computers in a rack-mounted server system, and the first processing entity sends the partitioned records from the second set of records to the recipient processing entities over an interconnection network in the rack-mounted server system.

The processing entities are computer systems in communication over a network, and the first processing entity sends the partitioned records from the second set of records to the recipient processing entities over the network.

In another aspect, in general, a computer program is stored on a computer-readable storage medium. The computer program includes instructions for causing a computing system to process a first set of original records by a first processing entity to generate a second set of records that includes the original records and one or more copies of each original record, each original record including one or more fields. The processing of each of at least some of the original records includes: generating at least one copy of the original record, and associating a first segment value with the original record and associating a second segment value with the copy, where the first segment value corresponds to a first portion of one or more data values of respective fields of the original record and the second segment value correspond to a second portion of the one or more data values of the respective fields of the original record different from the first portion. The computer program includes instructions for causing the computing system to partition the second set of records among a plurality of recipient processing entities based on the segment values associated with the records in the second set, and, at each recipient processing entity, perform an operation based on one or more data values of the records received at the recipient processing entity to generate results.

In another aspect, in general, a computing system includes a first processing entity configured to process a first set of original records to generate a second set of records that includes the original records and one or more copies of each original record, each original record including one or more fields. The processing of each of at least some of the original records includes: generating at least one copy of the original record, and associating a first segment value with the original record and associating a second segment value with the copy, where the first segment value corresponds to a first portion of one or more data values of respective fields of the original record and the second segment value correspond to a second portion of the one or more data values of the respective fields of the original record different from the first portion. The computing system includes a plurality of recipient processing entities receiving respective subsets of the second set of records partitioned based on the segment values associated with the records in the second set, each recipient processing entity configured to perform an operation based on one or more data values of the records received at the recipient processing entity to generate results.

In another aspect, in general, a method includes: partitioning a set of records by a first processing entity into multiple subsets of records; and processing different subsets of the set of records by different respective recipient processing entities and storing results in data storage accessible to each of the recipient processing entities. The processing by each recipient processing entity includes: performing an operation on each record in the subset based on determining whether or not there is an approximate match between one or more values of one or more fields of the record and an entry within local reference information maintained by the recipient processing entity or an entry within the data storage that was provided by any of the other recipient processing entities, and updating the data storage based on the local reference information maintained by the recipient processing entity.

Aspects can include one or more of the following features.

The data storage accessible to each of the recipient processing entities includes a non-volatile storage medium.

The local reference information maintained by each recipient processing entity is stored in a volatile storage medium.

The approximate match allows the values being matched to be different up to a specified edit distance.

Performing an operation on each record in the subset includes surrogate key assignment.

Results generated at a recipient processing entities include, for each record received at the recipient processing entity, the record augmented with an assigned surrogate key based on the one or more values of the record.

Performing an operation on each record in the subset includes clustering the records into one or more clusters.

Results generated at a recipient processing entity include, for each record received at the recipient processing entity, the record augmented with an assigned cluster based on the one or more values of the record and the one or more values of at least some of the other records received at the recipient processing entity.

The operation includes at least one of: surrogate key assignment, clustering, roll-up, or join.

In another aspect, in general, a computer program is stored on a computer-readable storage medium. The computer program includes instructions for causing a computing system to: partition a set of records by a first processing entity into multiple subsets of records; and process different subsets of the set of records by different respective recipient processing entities and storing results in data storage accessible to each of the recipient processing entities. The processing by each recipient processing entity includes: performing an operation on each record in the subset based on determining whether or not there is an approximate match between one or more values of one or more fields of the record and an entry within local reference information maintained by the recipient processing entity or an entry within the data storage that was provided by any of the other recipient processing entities, and updating the data storage based on the local reference information maintained by the recipient processing entity.

In another aspect, in general, a computing system includes a first processing entity configured to partition a set of records into multiple subsets of records; and a plurality of recipient processing entities each configured to process a different respective subset of the set of records and store results in data storage accessible to each of the recipient processing entities. The processing by each recipient processing entity includes: performing an operation on each record in the subset based on determining whether or not there is an approximate match between one or more values of one or more fields of the record and an entry within local reference information maintained by the recipient processing entity or an entry within the data storage that was provided by any of the other recipient processing entities, and updating the data storage based on the local reference information maintained by the recipient processing entity.

Aspects can have one or more of the following advantages.

When clustering large volumes of data, one of the main factors limiting performance and scalability is the number of computations that have to be made between records to determine which are close under a suitable distance measure. A simple all-to-all comparison scales quadratically in the number of records being clustered.

An improved approach incrementally discovers clusters and represents each by a representative record that a new query record must be close to before further scoring of nearby records is undertaken. To discover that a query record belongs to a new cluster scales quadratically in the number of distinct clusters because every existing cluster representative must first be checked before a new cluster may be created. For large numbers of distinct clusters, as are common when clustering individuals or households within a customer database of a business, this approach becomes untenable.

The data clustering method described herein uses a search process to determine whether a query record is sufficiently close, under an approximate distance measure, to any existing cluster before any expensive comparisons are made. This converts the worst case in the previous approach of a query record being the first record of a new cluster into a best case. If the query record has insufficient overlap with the existing records, it will return no candidate records from the search, and it must be a member of a new cluster.

The data clustering method described herein uses a narrowly targeted search based on a combination of a number of queries expanded from an initial query. The multiple queries enable variant matches of query terms to be detected during search and for simultaneous queries from multiple tokens in a field or from multiple fields in a record. The search seeks to find candidate records from a set of master records, serving as representatives of existing clusters, that meet a candidate match criterion. Search indices may be precomputed against the full dataset in a batch mode or may be populated cumulatively in an incremental mode. In batch mode, the search indices may contain location information for matching records in the form of bitvectors. This facilitates Boolean computation to combine the results of multiple searches.

The candidate match criterion may be formulated in terms of search codes, codes that encode qualitative results of combinations of searches, for example, whether a search for a customer had a match on both last name and city. Sample records associated with each search code may be extracted to assist a user in tuning the candidate match criterion. Search codes also make it possible in some implementations to realize the entire candidate match criterion as a Boolean expression on search results, making search very fast even when tokens need only match approximately.

After candidate records are found that meet the candidate match criterion, representative records from each cluster associated with the candidate records are retrieved for detailed comparison with the query record. A more expensive distance measurement is used for this comparison. Analogous to search codes, match codes are constructed to qualitatively summarize the comparison, including the qualitative match found between each pair of compared individual fields or combinations of fields and states of population of compared individual fields or combinations of fields, indicating whether particular fields were, for example, null, blank or populated. Statistics may be accumulated after clustering from the match codes to quantify the number of matches of varying quality. Fixed numbers of sample records may also be extracted associated to each match code to assist the user in judging the quality of matches of different kinds and iteratively tuning the comparison functions used to compare records accordingly to alter the match outcomes. Correlations between population features of records and quality of match outcomes may also be deduced from match codes.

The set of detailed comparisons between the query record and the representative records from candidate clusters may be analyzed to find the best matching pair above some match threshold. If there is no best matching pair above the match threshold, the query record is made the first record of a new cluster. If there is one best matching pair above the match threshold, the query record is added to the corresponding cluster. If there is more than one matching pair above the match threshold to different existing clusters, the query record is added to the cluster associated with the best matching pair, but the set of alternative clusters is recorded to be available for review by a user.

After cluster membership decisions have been made and all query records have been assigned to clusters, a user may review the network of clustered records and engage in a cluster approval process. Ambiguous matches are flagged to the user for review. The user may choose to confirm any record within its cluster, in which case if that record is ever presented to clustering again it will receive the same cluster id, without going through the clustering process. This meets the business requirement that if a user has manually confirmed a record is in the correct cluster, that decision must persist.

A user may choose to exclude a record from the cluster in which it has been placed. On a subsequent clustering run, the record is blocked from being assigned to that cluster and will be assigned to the next best cluster as determined by the algorithm.

A user may choose to map a record to a new cluster. On a subsequent clustering run, the record will be assigned to a new cluster. Any non-confirmed records may join that record in the new cluster providing they are closer to the record than to records in other existing clusters. Similarly, a user may remap a selected record to a different existing cluster, where it has not been placed by the clustering process. On a subsequent run, the selected record will be placed in the chosen cluster and any (non-confirmed) records close to that record will move with the selected record to the chosen cluster. This makes it possible for a user to remap a handful of selected individual records and allow reclustering to remap all records that are closely related to the selected records.

The approval process is facilitated by a process that extracts all records affected by the user's changes and reruns them through the clustering process. The resulting data clusters are differenced against the previous data clusters, and the user is shown the result. The user may then choose to apply further changes on top of those just made and iterate or discard the changes and start the approval process over from the beginning. The entire approval process may be executed in a temporary work area, and when the process is complete and the user is satisfied, the underlying cluster stores that guide the clustering process may be published back to a persistent production area.

A further advantage of the data clustering process described herein is that a batch mode clustering can be made on an initial dataset and future data may be added to the existing clusters using the incremental mode, without having to recluster the entire accumulated dataset. This satisfies a business expectation and requirement that cluster membership of individual records do not change as new data arrives. Unless unconfirmed records are reprocessed as they may be during the cluster approval process, their assignment to individual clusters cannot change.

Multinational institutions can store information about individuals in numerous countries. These countries may have data privacy laws or regulations that restrict how data may be used and exported to other countries. The data privacy laws may protect a wide variety of different types of data including healthcare records and financial records. Data protection laws in some countries block the export of data to any other country. In other countries, such laws allow the export of data to some countries while blocking the export of data to other countries. As used herein, countries that restrict the flow of data to any other country are referred to as prohibited data export countries, countries that restrict the flow of data to selective countries are referred to as selective data export countries, and restrictive data export countries will be used to collectively refer to prohibited data export countries and selective data export countries.

At the same time, requesting countries may require that selected information be made available from entities under their jurisdiction. For example, the United States (in this example, a requesting country) may require that a global banking institution under its jurisdiction provide a list of bank accounts associated with a person of interest; however, the required data may be located in Switzerland (in this example, a restrictive data export country).

The data clustering techniques described herein can be used to cluster records associated with persons of interest in a requesting country with records in restricted data export countries without exporting data from those countries.

DESCRIPTION

1 Overview 1.1 Search-Based Cluster Process Overview

Figure 1A:
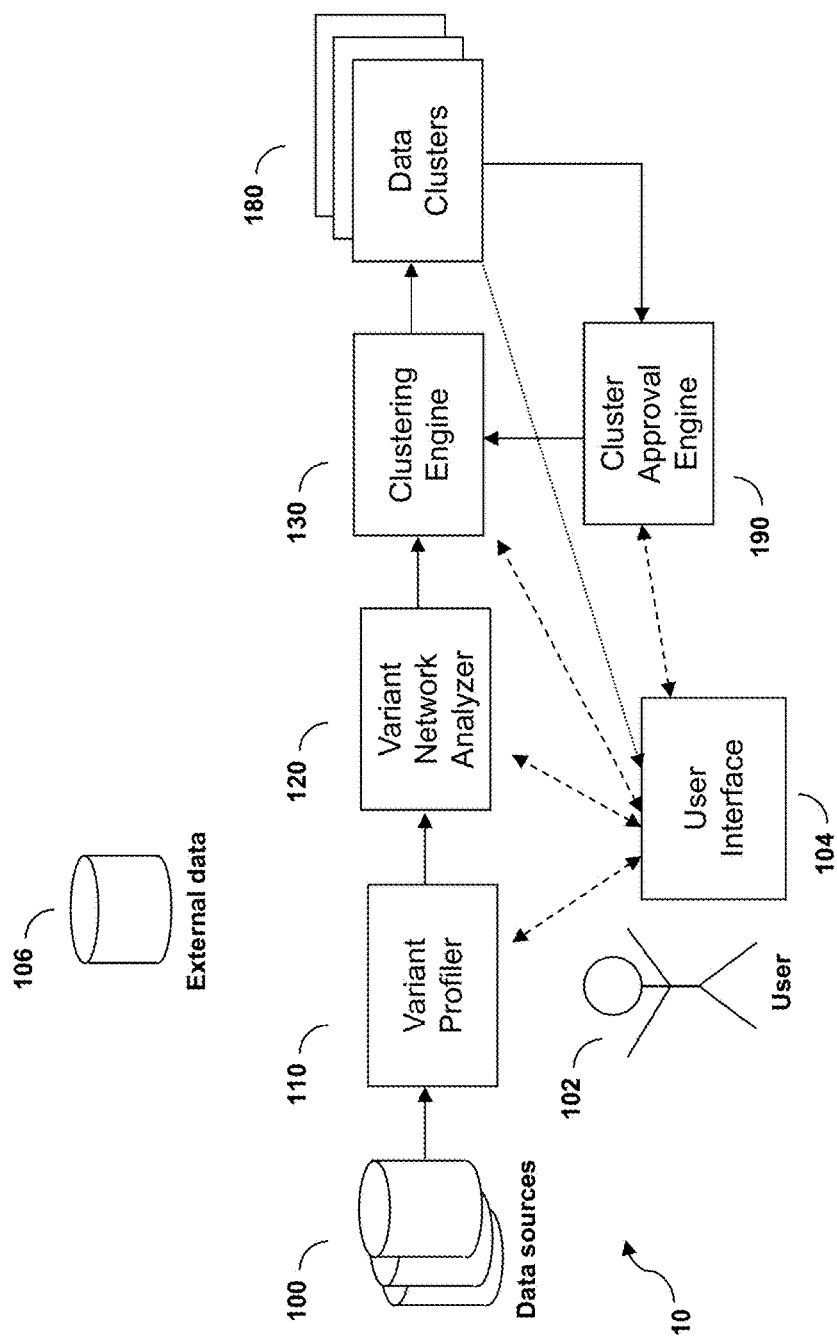
FIG. 1A is a block diagram illustrating a clustering process.

Referring to FIG. 1A, a data processing system 10 is used to cluster data from data sources 100. In some implementations, a clustering process executed by the data processing system 10 analyzes tokens that appear within data organized as records that have values for respective fields (also called "attributes" or "columns"), including possibly null values. A token is at least one value or fragment of a value in a field or a combination of fields. A user 102 uses a user interface 104 to monitor and control various aspects of the clustering process, including: receiving reports, possibly both tabular and graphical, on the collection of values, tokens, and their variants in selected fields (or combinations of fields) in the data sources 100 and the network of variant relations among them; creating and maintaining business rules to identify variant tokens, similar phrases (i.e., multi-token units) and similar records, to find and resolve ambiguous or false positive matches of tokens, phrases or records, and to make cluster membership decisions assigning each record to one or more clusters; and reviewing, modifying, and approving variant network connections and cluster membership decisions.

Data sources 100 in general include a variety of individual data sources, also called datasets, each of which may have unique storage formats and interfaces (for example, database tables, spreadsheet files, flat text files, or a native format used by a mainframe). The individual data sources may be local to the clustering system 10, for example, being hosted on the same computer system or may be remote to the clustering system 10, for example, being hosted on a remote computer that is accessed over a local or wide area network or that accesses, or is accessed by, the clustering system 10 through web services in the cloud.

Data in a data source may be organized as one or more records, each record including one or more fields containing values, each value consisting of a string of characters or binary values. The string characters may be single- or multi-byte characters, e.g., ASCII or Unicode. Binary data may include numbers, such as integers, and raw and/or compressed data, such as image data.

Data read from data sources 100 is processed by a variant profiler 110. The variant profiler 110 identifies tokens (e.g., based on predetermined rules) and counts occurrences of particular tokens in the data (e.g., the number of records in which a particular token appears), and in some implementations stores information identifying specific records in which particular tokens appear. The variant profiler 110 also identifies pairs of different identified tokens that are variants of each other (called a "variant token pair") on the basis of some similarity score, e.g. by edit distance, phonetic similarity, or measures based on sequences of shared characters (e.g., "eqty fhd" is similar to "equity fund" because all of the characters in the former occur in the latter in the same sequence). External data 106 may be used to enrich or modify the collection of tokens and variant token pairs identified by the variant profiler 110 using similarity scores by, for example, providing dictionaries of words, lists of synonyms and abbreviations, user-supplied variant pairings (e.g., company-specific synonyms, abbreviations or acronyms), or cultural variant pairings of names (e.g., nicknames, variant spellings, variant transliterations of foreign names, etc.). Such lists may add tokens not present in the original dataset or create variant pairings between tokens unrelated by similarity. External data 106 may also be used to modify scores associated with variant pairings (where scores are used to indicate closeness, this can be used to change the apparent distance between tokens), to break variant pairings (for example, between dictionary words only accidentally similar), or to remove tokens.

An example of a token is a word (a string of characters without spaces) in a field whose value consists of multiple words separated by spaces, for example, a personal first-name taken from a field containing a fullname or a word in a street address (perhaps formed by concatenating multiple fields). A token might contain spaces, like a city name "New York." A token may be a numeric value, possibly binary, like a government identifier (id) or an invoice number. A token may be a fragment of a string or numeric value, such as a string with one character deleted, a number with a digit removed, or an n-gram, consisting of a contiguous sequence of n characters taken from a string or number. A token might be a fragment of a binary field, like the data corresponding to a region in an image.

The pairing of variant tokens identified by the variant profiler 110 (into variant token pairs) defines a variant network, in which each token is represented by a node and a pairing between variant tokens corresponds to an edge between the nodes representing those tokens. This variant network may be analyzed by a variant network analyzer 120. A typical network may include a collection of multiple connected components, where the nodes of each connected component are all connected by an edge to another node in that component, but no nodes in different components are connected to each other. A connected component is the closure of the set of nodes connected by edges. By definition, different connected components are disjoint. The variant network analyzer 120 may identify the collection of connected components of the network and may associate one or more token-representatives with each token within a connected component of the variant network. Among the quantities characterizing nodes of a variant network is the count of instances of the associated token in a chosen field (or combination of fields) across all records in a dataset and separately the degree (or coordination number) of a token, corresponding to the number of variants paired with the token, that is, the number of edges connecting to the node representing that token.

A user 102 may view in a user interface 104 a graphical representation of the network of variant pairings for tokens, in particular those within a single connected component. Particular subsets of a connected component of the variant network may be of interest and may optionally be highlighted in a graphical representation. For example, consider those nodes that are not connected to a node with higher count. In some implementations, these may be selected as a collection of token-representatives for the connected component. The subnetwork consisting of the tree of nodes obtained by traversing edges that only connect to nodes of equal or lower count may be called the canonical neighborhood of the token-representative. All nodes in a canonical neighborhood may be represented by its token-representative. Canonical neighborhoods may overlap. As a consequence, a token may be associated with more than one token-representative if it is not itself a token-representative. It is useful for a user 102 to be able to visualize canonical neighborhoods and their overlaps through a graphical user interface 104.

The set of variant tokens paired with a chosen token is called its local neighborhood. The chosen token is called the primary for the local neighborhood. In a graphical display, the local neighborhood is the set of nodes connected to a chosen (primary) node by an edge. The degree of the token (or coordination number in the graphical sense) is the size of the local neighborhood (minus 1 to exclude the token itself). The significance of a chosen token is computed as the log of the ratio of the sum of the count of occurrences for each token in the local neighborhood of the chosen token divided by the number of records containing at least one token (in the given source and field or context from which the chosen token occurs). The significance allows the relative importance of different tokens to be compared: tokens with higher significance occur in fewer records and are therefore more distinguishing when used in search.

In some implementations, those tokens identified as distinctive by a statistical test, for example, those whose count exceeds the sum of the mean plus the standard deviation of counts of tokens in a local neighborhood, may be identified as "(local) positive tokens." (A similar identification may be made for tokens in a canonical neighborhood or indeed any neighborhood.) For tokens formed from individual words in a company or personal name, a positive token is statistically likely to be an "actual" word or name, as opposed say to being a typographical variant formed in error. That is, the frequency of occurrence of the token is high enough that, within the context of its neighborhood within the dataset, it is unlikely that the token occurred by accident.

Note that positive tokens are not necessarily expected to be found in a dictionary. There may be systematic reasons why a misspelled word is predominant in a dataset. In particular, a lot of made-up or deliberately misspelled words are used to form distinctive company names. Equally not all dictionary words will be recognized as positive tokens because the statistics of a dataset may not support their identification.

Many local neighborhoods will have one positive token. The positive tokens are in a statistical sense the "actual" tokens—the other tokens are comparatively rare variants.

Some local neighborhoods may have no positive tokens because the frequency of occurrence of all variant tokens is similar. This may happen especially for tokens that are rare in the dataset where there are insufficient statistics to distinguish the positive tokens. If the local neighborhood of a positive primary token has more than one positive token, the other positive tokens are considered "false positives." That is, they are statistically likely to be other "actual" tokens and not an accidental variant of the primary positive token. Identifying such false positives is useful as they represent tokens paired on the basis of similarity that should not be paired on the basis of semantic meaning. The accuracy of the variant network can be improved by breaking such variant pairings. Some care is required because some "false" positives, like plurals, should remain as variants.

In the context of token-representatives, identifying positive tokens for canonical neighborhoods may be useful. Some very common personal names are very similar. Consider, for example, "Hernandez" and "Fernandez." Differing by only one substitution makes them a variant pair. One of them will be more frequent than the other in a given dataset and that one is likely to be the most frequently occurring token in the canonical neighborhood containing both and therefore, in some implementations, is its token-representative. By breaking the link between "Hernandez" and "Fernandez," both become tokens unlikely to be linked to another token of higher count and are then token-representatives with their own (overlapping) canonical neighborhoods. Further pruning may be necessary to separate the canonical neighborhoods more completely, for instance, breaking a link between "Hernandes" and "Fernandes" and other similar pairs.

A user 102 may use a user interface 104 to manipulate the variant network by, for example, adding or deleting edges between nodes or adding or removing nodes. This corresponds to adding or breaking variant pairings or adding or removing tokens, as might have been done in a procedure performed by the variant profiler 110 by supplying appropriate external data 106. A graphical user interface 104 provides a useful way to do this. A graphical user interface 104 may also graphically distinguish positive tokens from other tokens and highlight edges connecting positive tokens. A view listing all variant pairs of connected positive tokens may be provided, together with a mechanism to select which edges to break and which to preserve.

A search-based clustering engine 130 processes "tokenized records" (which are records whose content has been tokenized), in some implementations divided into segments and/or partitioned among processors to be processed in parallel, to group records that have similar content (based on their corresponding tokens) to produce a collection of data clusters 180. The clustering engine 130 can run either in a "batch mode" (or "offline mode") in which all records within a batch of records in the data source 100 are collectively available for comparison at the outset or in an "incremental mode" (or "online mode") in which records are processed as they arrive against the collection of records that have previously been processed.

In some implementations, a batch mode is used to obtain an initial clustering and later records are added in incremental mode. Adding data does not then require reclustering the full set of accumulated data from scratch. In addition to the obvious performance advantage of only processing the additional records, this has the added benefit that previously determined assignments of records to clusters cannot change when new data arrives, as might happen if an entire dataset were reclustered from scratch. This is particularly important when clustering in a business context as clusters and their members have a business meaning, independent of the clustering process, and businesses are uncomfortable with the idea that cluster membership may change just because more data becomes available.

Cluster stores 170, including search stores 146 and representative records stores 178 (see FIGS. 1D and 1G), are maintained by the clustering engine 130 and participate in the cluster process. In some implementations, in addition to the cluster stores 170, results from the variant profiler 110 and the variant network analyzer 120 may be taken into account when comparing records for similarity during the clustering process.

A data cluster is a set of data records whose contents have been judged to be sufficiently similar. Data records that are included in a cluster are said to be members of that cluster. In some implementations, records in a cluster exhibit a high measure of similarity with other members of the cluster and a low measure of similarity with members of other clusters.

A segment is a set of data records that may be compared with each other for membership in a cluster. Records in different segments are not compared by the clustering engine 130 and will necessarily be assigned membership to distinct clusters. The placement of records of a dataset into segments is called segmentation. A record may be a member of more than one segment. In some scenarios, there is a natural segmentation based on a value expected to be common across a cluster, for example, a classifying characteristic that divides the collection of records into disjoint sets, like a product identifier or a geographic quantity like zip code or country of origin. In some implementations, data clusters can be segmented based on other criteria, for example, data may be segmented based on a fragment of a government assigned identifier. In some implementations, multiple levels of segmentation are possible. For example, data may be segmented first by country of origin, data clusters within each country of origin segment may be further segmented by a fragment of a government assigned identifier.

When processing in parallel, in some implementations, each segment may be passed to a separate processing partition because no comparisons are made between records in different segments. In other implementations, data records in the same segment may be partitioned to separate partitions to be processed in parallel, providing certain data, including search stores, used by the clustering engine 130 is shared by all partitions.

Figure 1B:
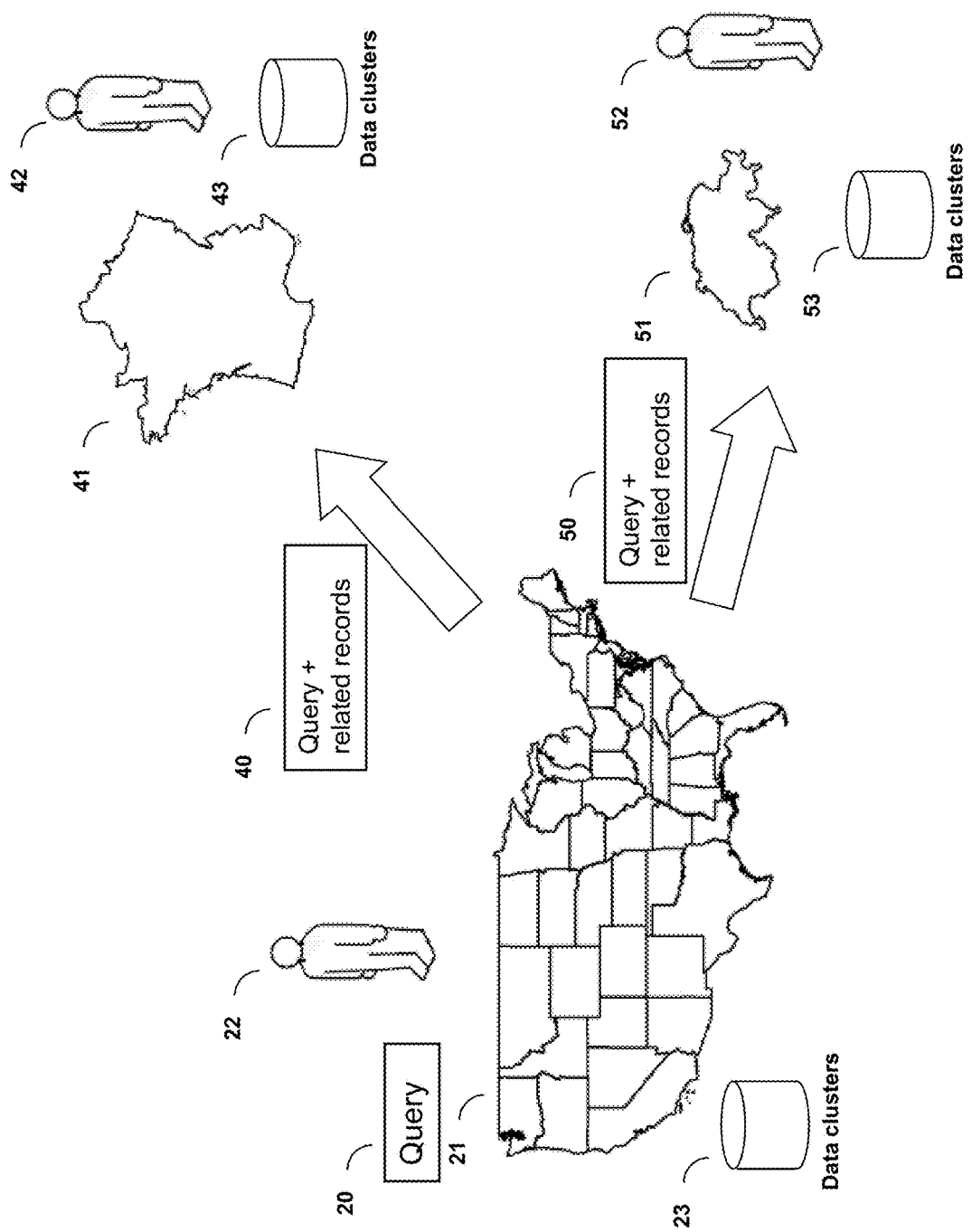
FIG. 1B is a diagram illustrating a clustering process involving restricted data export countries.

In some implementations involving restricted or one-way flow of information between remote processing systems, queries and shared information like search store entries may be passed one-way to the restricted remote processing system without harming the reliability of results as viewed in the restricted remote processing system. For example, some countries restrict the sharing of personal information across their borders: some prohibit data export to all other countries (for example, Switzerland) while others prohibit data export to selected other countries, including the US (for example, France). In FIG. 1B, a query 20 is originated in the US 21 by a user 22. The query might consist of a personal name, government assigned identifier and a date of birth, and the object of the query is to find all bank accounts owned by the named person. The query is applied to data clusters 23 held in the US 21, and certain records (called candidate records) are returned. Additional information, such as search-entries from the search store 146 or representative records from the representative records store 178, may be retrieved and held as a result of the query. The query, candidate records and possibly the additional information may be passed 40 to a selective data export country 41 to be clustered locally by a local user 42 against data clusters 43 held within the selective data export country 41. Similarly, the query, candidate records and possibly the additional information may be passed 50 to a prohibited data export country 51 to be clustered locally by a local user 52 against data clusters 53 held within the selective data export country 51. The results of the clustering will be available within the restricted data export countries for appropriate local action, for example, for fraud detection or law enforcement. The failure of a restricted data export country to export its data or its shared information (like search-entries or representative records) simply means that cluster members derived from data in the restricted data export country will not be visible outside of that country. The integrity of data clustered outside of the restricted country is unaffected.

Similarity of records is measured in some implementations by combining comparisons of tokens from one or more fields of data records into scores using scoring functions and business rules. Data pattern codes, such as search codes and match codes, summarize characteristics of a record and are useful both in formulating business rules for measuring similarity and when presenting results to the user 102. For example, a search code for a record may label those combinations of tokens shared between sets of records while a match code for a pair may encode the match quality and the state of population for each field or combination of fields being compared. For example, match quality states within a match code for a pair of compared field values might include "exact match" if the values were identical or "fuzzy match" if the similarity score were greater than a fuzzy match threshold. Population states within a match code might include "unpopulated 1" if the value in record 1 of the pair is null or blank (zero or more space characters) or "correlated population" if the values in record 1 and record 2 of the pair are either both populated or both null or blank. A search code or match code is assembled from collections of such coded states for different attributes characterizing a search or a match pair. Sample records having each search code, or sample records from matching pairs having each match code, can be displayed for the user. This may help the user to develop, refine and tune the similarity measures used to make cluster membership decisions.

A cluster approval engine 190 may be employed to improve cluster decisions iteratively through user interaction. A user 102 makes a series of cluster approval decisions through a user interface 104, for example, confirming a record as a member of a cluster or remapping a record to a new or existing cluster. Only selected records need be remapped by a user 102 to split or merge entire clusters. Records potentially affected by cluster approval decisions are identified, retrieved and reprocessed through the clustering engine 130 to produced modified data clusters 180. Remapping of individual records has a cascading effect on cluster membership causing existing clusters to split or merge when affected records are reclustered—those records closer to a remapped record than to an original primary record of a cluster will move with the remapped record to its new cluster. The user 102 may be shown a "before-and-after" representation of the data clusters in a user interface 104 to validate the changes provoked by the user's cluster approval choices. A user 102 may then iteratively continue to modify the clusters until satisfied with the result. Because of the cascade effect induced by remapping, a user is able to manipulate the disposition of many records with a few judicious changes without having to micromanage the placement of every individual record.

1.2 Clustering Engine

Figure 1C:
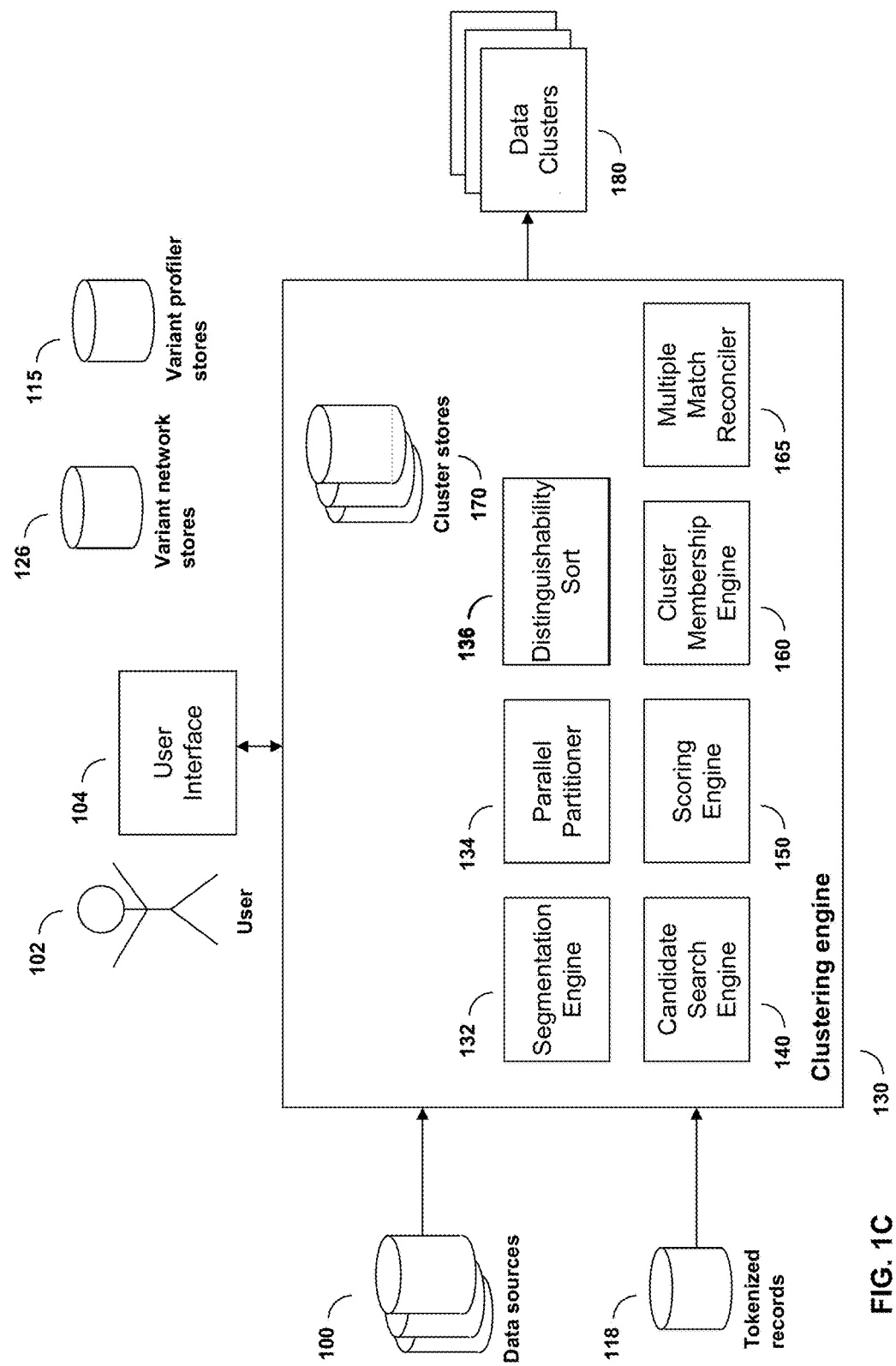
FIG. 1C is a block diagram illustrating a clustering engine.

FIG. 1C diagrams the elements of an example of a clustering engine 130. In some implementations, data source records 100 or tokenized records 118 are read and separated into segments by a segmentation engine 132 and/or partitioned among multiple processes by a parallel partitioner 134 for parallel processing.

In some implementations, the set of original or tokenized records may be sorted 136 (within each segment and/or process) to impose an ordering that reflects the distinguishability or richness of the records, with more distinguishable records first. This may improve the quality of clustering. Distinguishability is intended in the sense that a record having more fully populated fields, containing diverse values and multiple tokens, is intuitively more distinguishable from other records than would be a record, possibly incomplete, containing unpopulated fields and fields populated with default values or single tokens.

For example, one distinguishability criterion might be based on a characteristic population pattern of a record. A population pattern code may be used to encode the state of population of a record by, for example, concatenating a set of values for a selected set of one or more fields or combinations of fields in a record (relevant to cluster membership)—for example, the values "0" if the field is unpopulated (null, empty or blank), "1" if it contains a default value and "2" if the field is populated with a non-default value. Other higher values might be used to make further qualitative distinctions between the state of population of a field, for example, the number of tokens in a text field (making appropriate compensations in the representation of other code values if the numbers may exceed "9"). A distinguishability score may be computed as a weighted score of the different population values in the population pattern code. Higher scores would indicate more distinguishable records, and the sort 136 to organize records might be a descending sort on the distinguishability score. (In general, a sort order may be determined from a non-numeric distinguishability criterion, such as a population pattern code, without first converting to a score.) More formal measures of distinguishability may be constructed using data in the variant profiler stores 115 that include statistical measures like the significance of each token in a given source and field (or context).

The purpose for doing a distinguishability sort 136 is that it leads to better clustering results because the clustering membership decision process is incremental: records are assigned to clusters as they are processed. In particular, the number of clusters is unknown at the outset, and new clusters are discovered as records are processed. The distinguishability ordering is designed to work with the cluster membership decision process to produce the largest number of distinct clusters compatible with the cluster membership decision process. Experience shows that if records with low distinguishability scores, and often concomitant lower data quality, are processed first, they tend to provoke agglomeration of otherwise distinguishable clusters.

In some implementations, it may be preferable to perform clustering in a data quality cascade in which records with substantively different data quality are processed separately. For example, for bank records having a customer name, government id and date of birth, it is worth processing the set of records having all three fields populated (with non-default values) separately from those having two fields populated (with non-default values) from those having only one field populated. The reliability of clustering membership decisions is degraded as the completeness of the record declines, and making separate clustering passes may assist a user in understanding the impact of this. Equally records of different distinguishability scores could be marked in a graphical display in a user interface 104 for a user 102. For example, the records could be colored on a gradient scale ranging from high to low distinguishability so that a user may see at a glance which records are less reliable. The user interface 104 may also have a switch for turning on and off the display of tokens with different ranges of distinguishability, again enabling the user to concentrate on data of a given quality. Here, distinguishability is being used here as a proxy for data quality, but the graphical display could as well use direct measures of data quality derived independently of the distinguishability score used to drive clustering.

The clustering engine 130 contains a candidate search engine 140, which identifies candidate matches for each original or tokenized record, called the query record, from among the set of records available for comparison. If no records are retrieved by the candidate search engine, a new cluster id is generated and assigned to the query record. Appropriate information about the new cluster is stored in the cluster stores 170. If records are retrieved by the candidate search engine, they are scored in detail against the query record by a scoring engine 150 prior to making cluster membership decisions. The cluster membership engine 160 determines cluster membership of scored query records. Variant profiler stores 115 produced by the variant profiler 110 and variant network stores 126 produced by the variant network analyzer 120 and other cluster stores 170 may all be used by the candidate search engine 140 and the scoring engine 150 to assist in identifying and scoring candidate records.

In some implementations, a single record may be assigned to multiple clusters, for example in different segments or on separate clustering passes with different cluster strategies. A multiple match reconciler 165 may be used to reconcile the assignments to associate each record to a single cluster.

In some scenarios, ambiguous matches to multiple clusters may remain after multiple matches have been reconciled, for example, when there is insufficient information to distinguish between alternative matches, as when a record is close to membership in more than one cluster. For example, suppose there are two distinct clusters labeled by the names "Acme Industries Canada" and "Acme Industries Australia." A query record "Acme Industries" is an equal match to both names. In the absence of other information, to which cluster "Acme Industries" should be assigned is ambiguous and incapable of resolution. In such cases, ambiguous matches may be reported and displayed to the user 102 in the user interface 104, perhaps marking records involved in ambiguous matches with a distinctive color in a graphical display of the network of clustered (matched) records.

In some implementations, the cluster membership decision process may assign an ambiguous record to one cluster out of the set of possible alternative clusters. For each member of a cluster involved in the cluster membership decision paired with an ambiguous member, the user interface 104 may display in one color the edge from the ambiguous record to the paired member of the cluster where membership has been granted and in a different color each edge to a corresponding member of a cluster where membership has been denied. (For example, in FIG. 11D, the edge between the ambiguous record 1190 and the member 1193 of the matched cluster is shown in black while the edge between the ambiguous record and the member 1194 of the unmatched cluster is shown in gray.) This display may enable a user 102 to readily distinguish the decision made by the cluster membership engine from the alternatives immediately available before accepting or modifying the cluster membership engine's assignment.

A purpose of the candidate search engine 140 is to reduce the number of records that need to be compared in detail to the query record by performing a search that only retrieves records meeting a minimal standard of similarity. Essentially the set of records available for comparison (all records in a segment in the batch case) is indexed so that searching against the index may be used as a fast, computationally inexpensive filter to discard records that cannot possibly be a match. The performance of the clustering engine 130 may be dramatically affected by the success of the candidate search engine 140 in narrowing the set of records to be considered in detail.

1.3 Candidate Search Engine

Figure 1D:
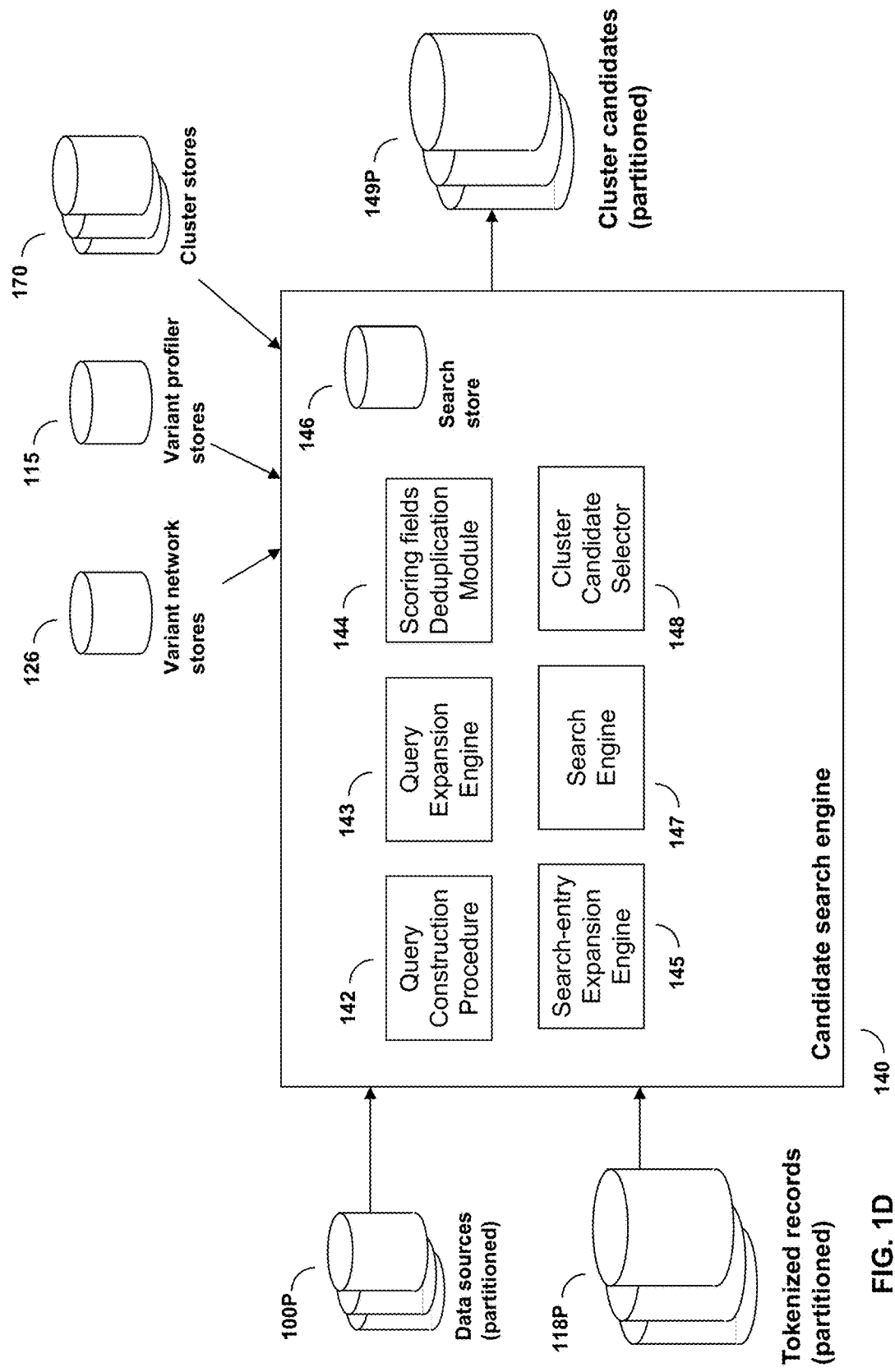
FIG. 1D is a block diagram illustrating a candidate search engine.

FIG. 1D outlines the elements of an example of the candidate search engine 140. A query record is read from the set of data source records 100P or tokenized records 118P. This query record may be in a segment and/or in a parallel partition if the original or tokenized records have been segmented and/or partitioned to be processed in parallel. A query is based on a predefined or user-specified procedure that selects one or more tokens from one or more fields or combinations of fields of the query record, and is generated from a selected token or combination of selected tokens by a query construction procedure 142. In some implementations, the generated query is expanded into an expanded query that includes one or more specific queries by a query expansion engine 143.

In some implementations, the collection of fields, called the scoring fields, involved in determining cluster membership by the scoring engine 150 may be found from scoring rules that are used by the scoring engine 150. Scoring rules are specified in a predefined or user-specified ruleset, in which one or more fields or combinations of fields are separately compared for similarity and then the collective set of intermediate field scores are combined to compute an overall record score. A ruleset is a collection of rules, each of which computes one or more intermediate values or output values, by combining input values, constants, parameters, other intermediate values, other output values, and values obtained by lookups to other datasets in a set of one or more case-based assignments, which may use a combination of built-in logical and mathematical operations, built-in functions and user-defined functions. Rulesets may produce one or more output values, some of which may be vectors. The scoring rules in a scoring ruleset will employ a selection of fields from the incoming data records, and collectively these fields are referred to as the scoring fields.

A set of records sharing identical values in the scoring fields will share the same cluster membership decision. The scoring field deduplication module 144 ensures that only the first record of such a set of records is passed to scoring and subsequent records simply inherit the cluster membership result.

A search-entry expansion engine 145 is applied to either records in the full incoming data source 100 or the set of existing data cluster records 180 to construct a search store 146.

A query record is passed to the core search engine 147 of the candidate search engine 140. The search engine 147 takes each expanded query and returns one or more lists of unique record identifiers of possible candidate matches between the query record and identified candidate match records. These lists are passed to a cluster candidate selector 148, which applies predefined rules and/or user-specified rules (e.g., a ruleset) to identify a list of candidate match records that meet the minimum criteria to be worth the investment of detailed scoring by the scoring engine 150. In some implementations, search codes that characterize the combination of tokens matched between the query records and the available records are used both to facilitate the selection process and to analyze the selection process retrospectively.

1.4 Variant Profiler

Figure 1E:
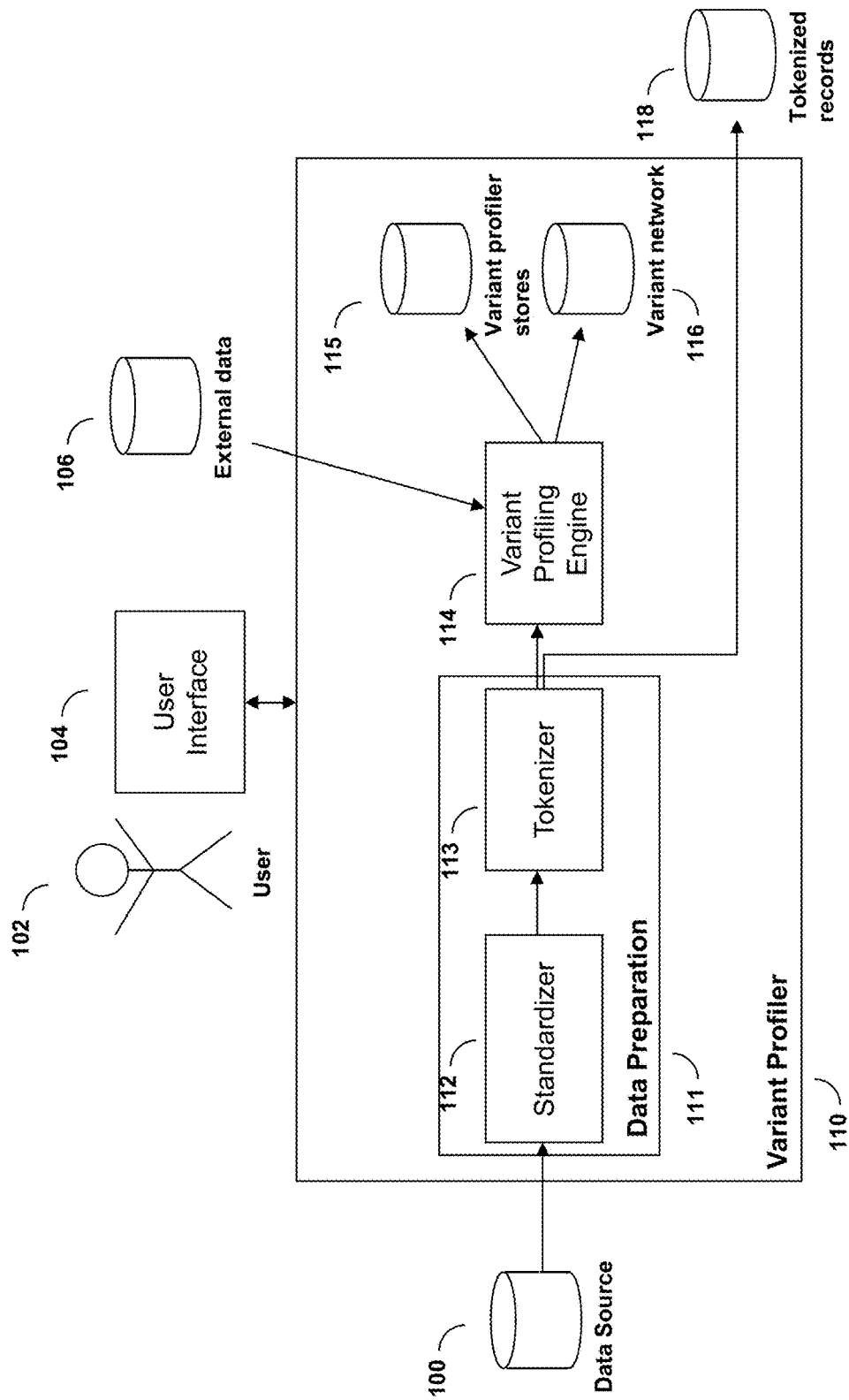
FIG. 1E is a block diagram illustrating a variant profiler.

FIG. 1E outlines the elements of an example of the variant profiler 110. The variant profiler 110 can use any of a variety of techniques for generating an archive that identifies pairings of variant tokens, including a process for producing an archive such as that described in U.S. Publication No. 2009/0182728, entitled "Managing an Archive for Approximate String Matching," incorporated herein by reference. Records are read from the data sources 100. They are prepared for profiling in a data preparation module 111, including being processed by a standardizer 112 and a tokenizer 113. The standardizer 112 applies predefined rules and/or user-specified rules to standardize incoming data based on the nature and meaning of the chosen fields (or designated combinations of fields). For example, string values may be lower-cased and particular punctuation characters may be either deleted, replaced with a space character or both (possibly resulting in multiple records). The tokenizer 113 identifies a list of tokens based on predefined rules and/or user-specified rules applied to a value in a field, according to the nature and meaning of the field. For example, a street line of an address may be split on the space character into a list of words, while the city field, possibly containing values representing a semantic unit like "New York," are not split into words. The tokenizer 113 produces a dataset or datastream of tokenized records 118 for further processing by the clustering engine 130.

The distinct tokens of the tokenized records are also profiled by a variant profiling engine 114, including counting the number of instances of each token (e.g., a number of records in which a token appears). In some implementations, a key identifying the data source, field, and/or context (logical grouping of fields) in which a token appeared may be associated with the token, and a corresponding count of the number of instances of the token may be maintained. This enables separate statistics to be compiled for the same token appearing in different sources, fields, or contexts. In some implementations, location information, identifying the records in which the token appears in the given field or context, is also associated with the token. This location information may be in the form of a bitvector, optionally compressed, in which a bit is set for each record in which the token appears. The order of the bits can be explicitly or implicitly mapped to locations of the records.

The variant profiling engine 116 proceeds to identify tokens that are variants of each other based on a token similarity measure. Many token similarity measures are possible. One is to compare tokens for similarity based on edit distance. The Levenshtein edit distance counts the number of insertions, deletions and substitutions required to turn one word into another. Two words are more similar the smaller their edit distance. Another measure is to compare words based on phonetic similarity, for example using the soundex encoding.

A third possibility is to compare sequences of shared characters. A base sequence similarity score can be computed by counting the number of shared characters and dividing by the length of the shorter string. A full sequence similarity score is then formed by subtracting weighted penalties from the base score for characters out of sequence and the difference in lengths of the strings. For example, "eqty fnd" and "equity fund" share 8 characters, including the space character, out of a possible 8 characters and 11 characters, respectively. The base similarity score is 1. There are no characters out of sequence, and the length difference is 3. So with a length mismatch weight of 0.05, the sequence similarity score is 1−0.5*3=0.85.

In some implementations, the variant profiling engine 114 produces variant profiler stores 115, including a score archive identifying variant pairs and their similarity scores and a variant archive containing every token in each of its source-field-context appearances, the associated count, location information, and list of variant tokens and their counts in the same source-field-context. A variant network 116 may be computed from the variant archive in which each node is a token and each edge is a pairing of variant tokens. The variant network 116 may be displayed graphically in a user interface 104 where the user 102 may manipulate it, perhaps adding edges to link tokens that were not identified as variant pairs by the variant profiling engine 114 or deleting edges that connect tokens that are only variants based on similarity, not semantics.

In some implementations, the variant profiler stores 115 and variant network 116 may be enriched by incorporating external data 106. External data 106 may include lists of synonyms and abbreviations supplied by the user or available from third parties. One example of an external data source is a list of cultural variants of names, including nicknames, alternative spellings, and alternative transliterations. For example, such data may be incorporated by adding all of the tokens in the external data and the variant pairs they entail to the variant profiler stores 115 and variant network 116, or by adding only the pairings between tokens that exist in the data. In the former case, the count associated with tokens not present in the data should be zero. If such a token should arise in future processing, its count can be increased, but any implied links to other tokens will already be present.

1.5 Variant Network Analyzer Overview

Figure 1F:
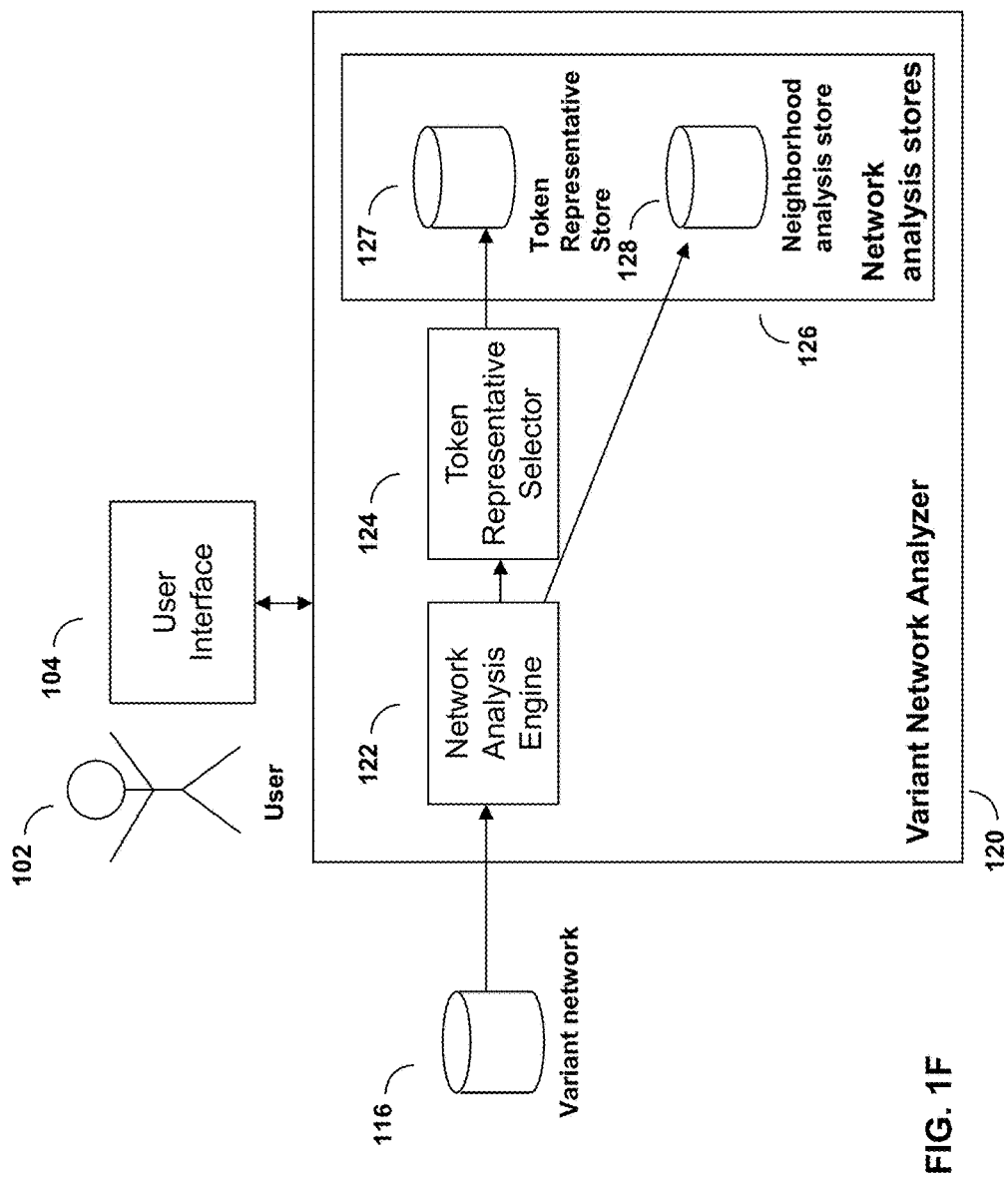
FIG. 1F is a block diagram illustrating a variant network analyzer.

FIG. 1F outlines the elements of an example of a variant network analyzer 120. The variant network 116 is read and a network analysis engine 122 conducts network analysis. In some implementations, the network analysis may identify sets of connected components of variant tokens within the variant network 116 and perform further analyses, some of which are described below. A user 102 may view a graphical display of the variant network 116 in a user interface 104, in which each token is displayed as a node and each variant pairing of tokens is indicated by an edge. The graphical display may be decorated with information characterizing the nodes and edges, such as the information in the examples enumerated below. The user 102 may modify the variant network 116 interactively using the user interface 104, adding or deleting nodes or edges or editing the decorated information.

The local neighborhood of a token may be displayed. Neighborhood analysis conducted by the network analyzer 122 may identify, and mark in the graphical display, positive tokens (those statistically distinguishable from other tokens in their local or other neighborhood), and edges connecting pairs of positive tokens.

The count of instances of each token may be shown in the display and in some implementations indicated graphically by the size of the icon used for the node. Tokens that are connected to no variants of higher count may be identified, along with their canonical neighborhoods (the tree of tokens formed by starting from a highest-count token and following all variant pairings to tokens of equal or lesser count), and displayed. A token representative is a token that is selected to represent every token in a chosen neighborhood. A token representative selector 124 may select one or more token representatives from each connected component, for example the highest-count token of a canonical neighborhood. Canonical or other neighborhoods associated with token representatives may be overlapping.

The significance of a token, taken from the variant profiler stores 115, indicates which tokens are relatively more distinguishing when used as search terms. The significance of a chosen token is computed from the count of variants in the local neighborhood of the chosen token and is associated with the chosen token. As variant-paired tokens may have different local neighborhoods, their significance may differ, hence the importance of associating the significance to each token. Significance is another property that may be displayed with a color gradient in a graphical display of a variant network.

The (Simpson's) diversity of a local neighborhood is another quantity associated with each token. When normalized, Simpson's diversity reflects the skew in the distribution of the count of variants of a designated token. The unnormalized magnitude of the diversity is the expected count that a variant of a token chosen at random will have. If the count of the $k^{th}$ variant of a designated token is $n_k$, then the total number of variants (not including the designated token) is the sum over k of $n_k$. The diversity is $$\text{diversity} = \langle n_k \rangle = \Sigma_{k \text{ in variants}} n_k p_k = \Sigma_{k \text{ in variants}} n_k^2 / N,$$

where $$N = \Sigma_{k \text{ in variants}} n_k$$

is the total count of variants and $$p_k = n_k / N$$

is the probability that an occurrence selected at random will be associated with the $k^{th}$ variant. To normalize the diversity shown, divide by $\Sigma_{k \text{ in variants}} n_k$ to get a quantity between 0 and 1. The diversity may be useful for identifying links between correlated tokens because correlation of tokens implies low diversity. This gives a similar but distinct measure to that used to identify positive tokens.

The results of the network analysis may be stored in a collection of network analysis stores 126, in some implementations including a token representative store 127 and a neighborhood analysis store 128. The tokens and their associated token representatives may be stored in a token representative store 127. A neighborhood analysis store 128 may contain information gleaned from network analysis, including positive tokens, variant pairs of positive tokens, and canonical neighborhoods.

1.6 Cluster Approval Process Overview

Figure 1G:
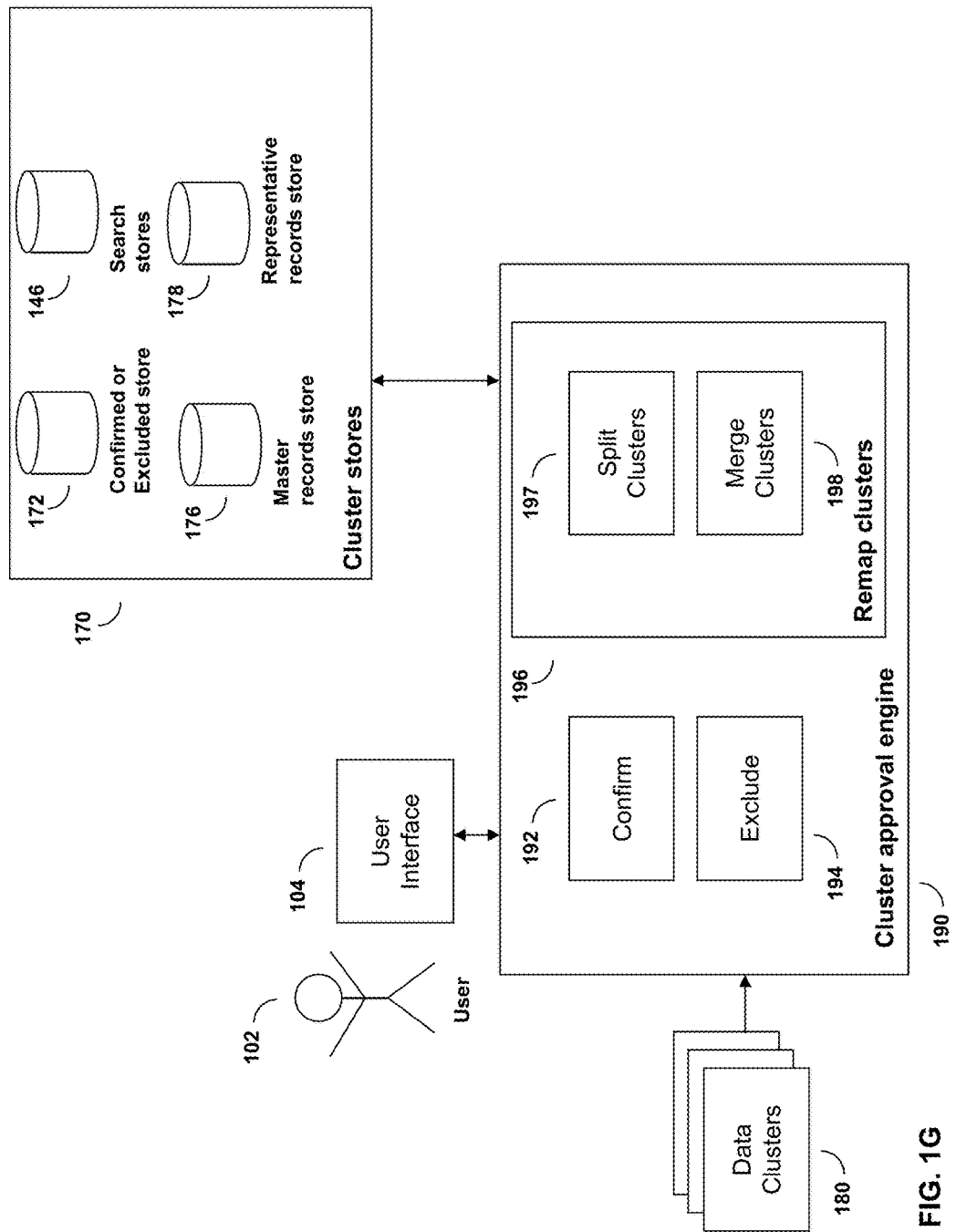
FIG. 1G is a block diagram illustrating a cluster approval engine.

FIG. 1G outlines the elements of an example of the cluster approval engine 190. Cluster membership decisions may be reviewed by a user 102 using a user interface 104. Ambiguous cluster membership decisions, in which one record is sufficiently close to more than one cluster to be a possible member, may be flagged by the clustering engine 130 and resolved by the user 102. The illustrated elements of the engine 190 correspond to actions that may be initiated by user input.

A record may be confirmed 192 as a member of a given cluster. The decision, pairing a unique record identifier of a record and the cluster id of the associated confirmed cluster, may be stored in a confirmed or excluded store 172 in the cluster stores 170. If a confirmed record is presented to the clustering engine 130, as evidenced by the presence of its unique record identifier (in the confirmed set) in a confirmed or excluded store 172, the cluster id of the confirmed cluster, will be reported without further processing.

A record may be excluded 194 from a given cluster. The decision may be stored in a confirmed or excluded store 172 in the cluster stores 170. If an excluded record is presented again to the clustering engine 130, it will be blocked from membership in the excluded cluster and will necessarily be assigned to a different, possibly new, cluster.

Records may be remapped 196 to other clusters. In particular, clusters may be split 197 into two or more parts by assigning one or more records to new clusters. In many cases, it is only necessary to remap a selection of distinctive records, as upon reprocessing, records more similar to those records than the original cluster primary record will follow the remapped record to its new cluster. Clusters may also be merged 198 into one cluster by remapping one or more records to an existing cluster. Again, in many cases, it is only necessary to remap a selection of distinctive records prior to reclustering.

2 Examples 2.1 Variant Profiler and the Deletion-Join Procedure

The variant profiler 110 identifies pairs of variants, measures their similarity, and stores the pair of variant tokens and their similarity score in the variant profiler stores 126. In some implementations, the variant profiler 110 computes the edit distance between all pairs of tokens and stores those pairs of tokens whose edit distance ("similarity score") is below a predetermined threshold. The Levenshtein edit distance counts the minimum number of insertions, deletions, and/or substitutions required to change one token into another and is a widely used measure of typographical similarity. Unfortunately, the approach of comparing all pairs of tokens is inefficient because the vast majority of token pairs have no similarity, so a lot of computational effort may be expended to little benefit.

A deletion-join procedure measures similarity of tokens based on typographical variation, much as the Levenshtein edit distance, but is designed to compare only tokens that are relatively close, thereby saving the computational cost of evaluating many unrelated tokens. This is described more fully in U.S. Publication No. 2009/0182728, entitled "Managing an Archive for Approximate String Matching."

In some implementations, the deletion-join procedure proceeds in the following way. For each token in a token dictionary (i.e., a catalog or list of tokens) or a portion of a token dictionary (e.g., for a given source, field, and/or context), every variant formed by deleting a single character from the token is made. This "deletion set" for a given token contains a list of entries each having a key identifying the original token ("token_key"), the original token ("original"), the deletion variant token ("deletion_var"), and the position of the character ("deletion_pos") that has been deleted from the original token. The collection of deletion sets may be stored in variant profiler stores 115 along with the token dictionary or may be discarded after being used by the variant profiling engine 114 to generate the variant pairs also stored in variant profiler stores 115.

The original token may be included in the deletion set, along with the deletion variants, with the deleted character position of 0. For example, the following is a deletion set for the token LONDON:

| token_key | deletion_pos | deletion_var | original |
|---|---|---|---|
| 1 | 0 | LONDON | LONDON |
| 1 | 1 | ONDON | LONDON |
| 1 | 2 | LNDON | LONDON |
| 1 | 3 | LODON | LONDON |
| 1 | 4 | LONDN | LONDON |
| 1 | 5 | LONDO | LONDON |

Note that {token_key, deletion_pos} is a unique "key" identifying a given deletion variant.

The deletion-join procedure may be extended to more than one deletion. In some implementations, the sequence of deletion positions may be recorded for use in scoring similarity. In other implementations, the deletion positions may not be retained, and scoring may be done using an alternative procedure.

A procedure similar to the deletion-join procedure can be used to determine variant matches between tokens in one or more dictionaries by performing a join (or lookup) operation on the deletion_var token. The join/lookup operation is fast and selective. Two tokens that share a deletion_var token may differ at most by one deletion in each token (for deletion-join 1 variants), so they are "close" in edit distance. This provides a potential advantage of the deletion-join procedure: reducing the number of pairs that require scoring by identifying only those close enough to merit scoring. In some implementations, a similarity score between tokens paired on deletion_var is computed directly between the associated original tokens using a predefined or user-specified similarity function. For example, two paired tokens could be compared by computing their edit distance using the Levenshtein edit distance or some other edit distance measure. This application of the deletion-join procedure has a potential advantage of reducing the number of pairs to score while enabling the user to employ any desired similarity scoring procedure.

In other implementations, the quality of the variant pairing is scored by comparing the positions of the deleted characters. This provides a fast computation of an edit distance-like measure that leverages information gleaned from the deletion-join procedure (whereas a Levenshtein edit distance calculation effectively starts over from scratch with the token pair) and allows customization of the score to emphasize features of the pairing. In one example of a procedure for computing a similarity score, points may be assigned for different types of changes as follows: 1 point for a deletion (or insertion), 1 point for changing the first letter, 1 point for changing the last letter, 1 point if the characters deleted are separated by more than one position. The weight associated with each type of change is adjustable. If the deletion position of one token is 0 and the other is not, this is a single insertion or deletion. If the deletion position is the same, it is a substitution. If the deletion position differs by 1, it is a transposition. Matches having the same token_key and deletion_pos are ignored since these are exact matches. Matches that indicate a deletion of a paired letter in the same token are also ignored as exact matches (e.g., MEET can be transformed to MET by deleting character 2 in one instance and character 3 in a second instance: the pairing simply returns the shared token MEET).

The following is an example of selected entries from respective deletion sets for the original tokens LONDON, LODON, LOMDON, LODNON, LODOON.

| word_key | deletion_pos | deletion_var | original |
|---|---|---|---|
| 1 | 0 | LONDON | LONDON |
| 1 | 3 | LODON | LONDON |
| 1 | 4 | LONON | LONDON |
| 2 | 0 | LODON | LODON |
| 3 | 0 | LOMDON | LOMDON |
| 3 | 3 | LODON | LOMDON |
| 4 | 0 | LODNON | LODNON |
| 4 | 3 | LONON | LODNON |
| 4 | 4 | LODON | LODNON |
| 5 | 4 | LODON | LODOON |

In this example, many of the deletion variant entries have been suppressed because they do not lead to interesting matches. The join operation pairs a first entry with a second entry when both have the same value of deletion_var. The resulting variant pairs of original tokens are:

| First entry | | | |
|---|---|---|---|
| 1 | 3 | LODON | LONDON |
| 1 | 3 | LODON | LONDON |
| 1 | 3 | LODON | LONDON |
| 1 | 4 | LONON | LONDON |
| 1 | 3 | LODON | LONDON |
| 2 | 0 | LODON | LODON |

| Second entry | | | |
|---|---|---|---|
| 2 | 0 | LODON | LODON |
| 3 | 3 | LODON | LOMDON |
| 4 | 4 | LODON | LODNON |
| 4 | 3 | LONON | LODNON |
| 5 | 4 | LODON | LODOON |
| 3 | 3 | LODON | LOMDON |

| Variant pairs | |
|---|---|
| LONDON | LODON |
| LONDON | LOMDON |
| LONDON | LODNON |
| LONDON | LODNON |
| LONDON | LODOON |
| LODON | LOMDON |

Respectively, the example variant matches above represent a token0-deletion, a substitution, a transposition, a transposition obtained by a different path, separated insertion and deletion, and a token0-insertion (or token1-deletion). Each pair of tokens in the archive representing a variant match has an associated similarity score indicating a quality of the match.

Using the scoring described above, the similarity scores for these pairs are as follows:

| Variant pair | | Similarity score |
|---|---|---|
| LONDON | LODON | 1 |
| LONDON | LOMDON | 1 |
| LONDON | LODNON | 2 |
| LONDON | LODNON | 2 |
| LONDON | LODOON | 3 |
| LODON | LOMDON | 1 |

In these cases, the similarity score effectively corresponds to the edit distance between the variant pairs. The deletion-join procedure based on single-character deletion finds all edit distance 1 variant pairs (insertion, deletion and substitution) and some edit distance 2 variant pairs (transposition). The score for a separated insertion-deletion has been customized by an additional penalty because the deletion_pos were separated by more than one.

After computing a similarity score for a pair, a match decision is made by applying a threshold to the similarity score or a condition on the nature of the pairing. For example, here a rule based on the similarity score might be that a variant pairing represents a variant match if the similarity score is 2 or less, thereby excluding the separated insertion-deletion pairing "LONDON LODOON" from being identified as a variant match.

As an example of applying a condition on the nature of a pairing, a code, called a match code, might be constructed which encodes the information whether the pairing involved an insertion, deletion, substitution, or whether a changed letter was a first or last letter, or whether the deletion_pos were separated by more than one position. In some implementations, such a match code may be constructed as a bitmap, with a bit or combination of bits set for each condition identified, while in others it is a string composed of a concatenation of substrings encoding each condition, or perhaps simply a record structure holding the information. A match code is a data pattern code that encodes the information that might contribute to a similarity score, without assigning specific weights or defining a function to compute an actual score. This allows general conditions that identify or disallow a match to be applied directly to the match code without having to pass through the step of computing a score. For example, here, a variant match might be any variant pairing that does not have a separated insertion-deletion indicated by the match code.

2.2 Variant-Search

Figure 2A:
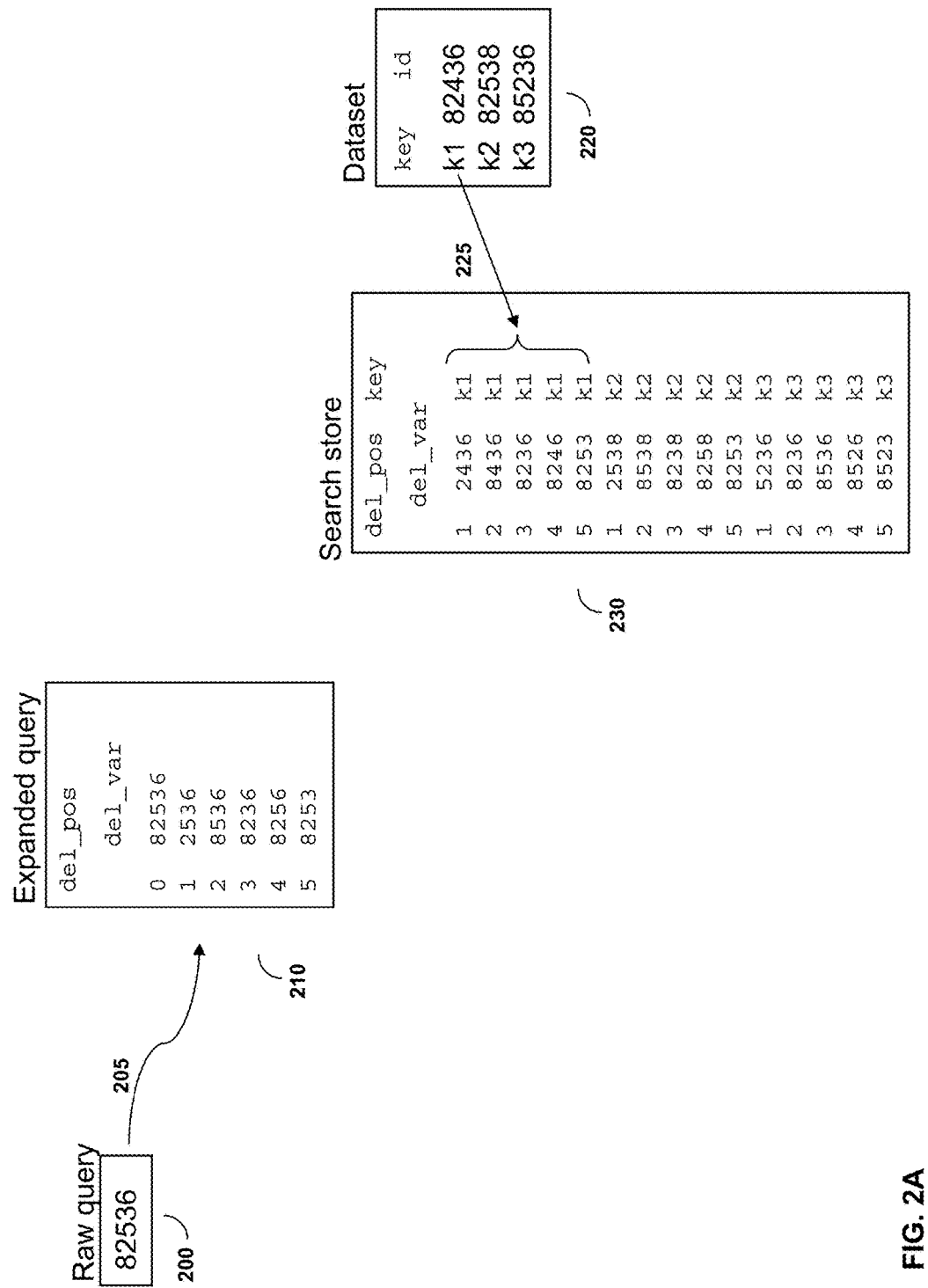
FIG. 2A-D illustrate examples of the variant-search procedure.

A variant-search operation underlies the operation of some implementations of the candidate search engine 140. FIGS. 2A-2D illustrate examples of the variant-search operation. Referring to FIG. 2A, a raw query 200 is read for processing. In the example, this is a numeric field, such as a government id, having value "82536." The requirement is to find variant matching government ids in a dataset 220 where the government id differs from the raw query by at most one substitution. This is equivalent to requiring that two matching government ids have hamming distance less than or equal to 1. The hamming distance counts the number of mismatched characters between two aligned character sequences of equal length (sometimes extended to aligned sequences of unequal length by adding the difference in lengths).

The dataset 220 may be a reference dataset held on disk or a temporary dataset held in memory, for example, during an in-memory join operation.

The first step of the deletion-join procedure is applied, as a query expansion procedure, to the raw query 200 to generate 205 a deletion set called the expanded query 210. The expanded query 210 includes entries that each include two values: a value of the deletion_pos (under the heading labeled "del_pos"), and the deletion_var token (under the heading labeled "del_var"). Similarly, a search-entry expansion procedure is applied to each entry in the dataset 220 to generate the deletion set 225, which is then written to a search store 230.

Figure 2B:
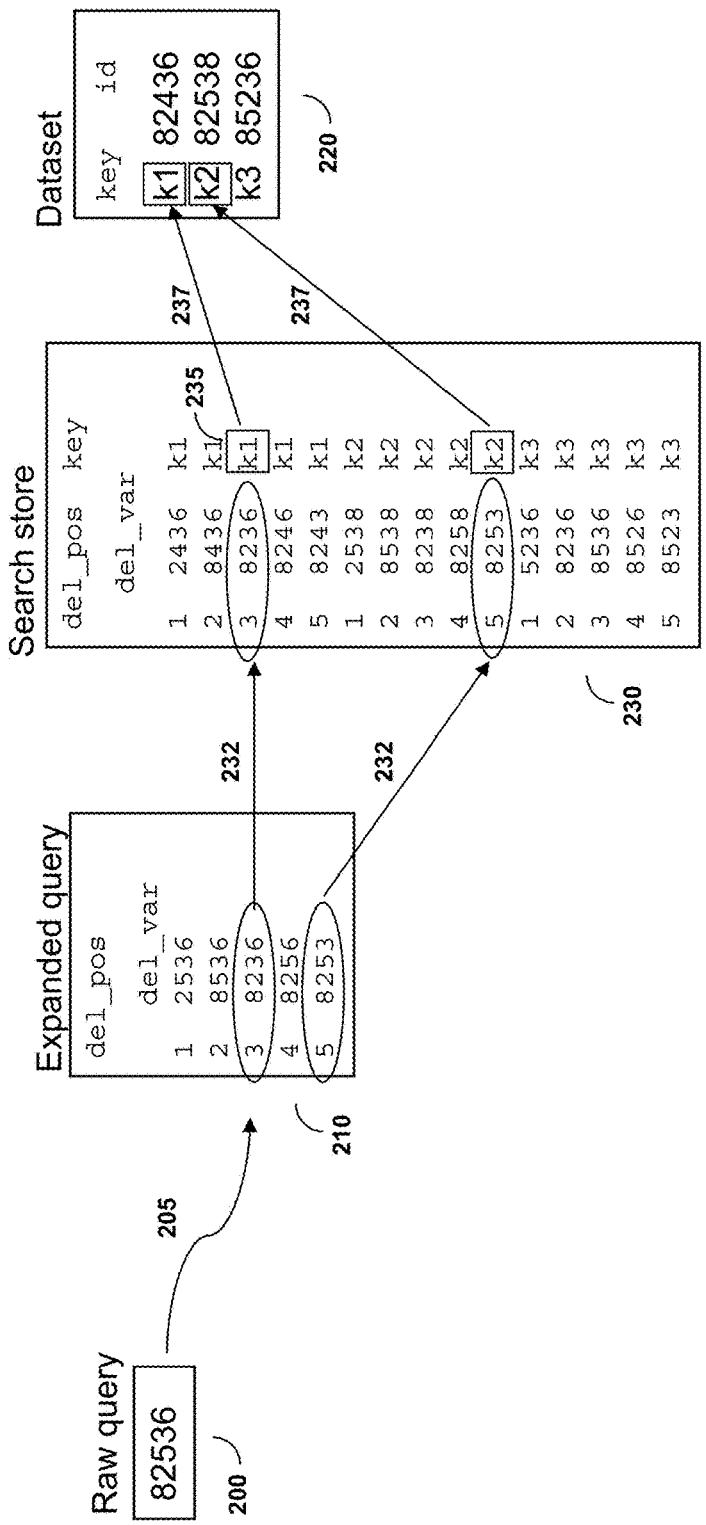

Referring to FIG. 2B, each entry in the expanded query 210 is looked up in the search store 230 to find a matching entry 232. The key 235 in the matching entry 232 is then looked up 237 in the dataset 220 to retrieve the dataset record for further processing. The collection of matching records in the dataset 220 are all variant matches meeting the requirement that the id field has hamming distance less than or equal to 1 with the raw query id 200. In the example, the raw query id "82536" is a hamming distance 1 match to both "82436" and "82538" but not to "85236" (hamming distance 2).

Figure 2C:
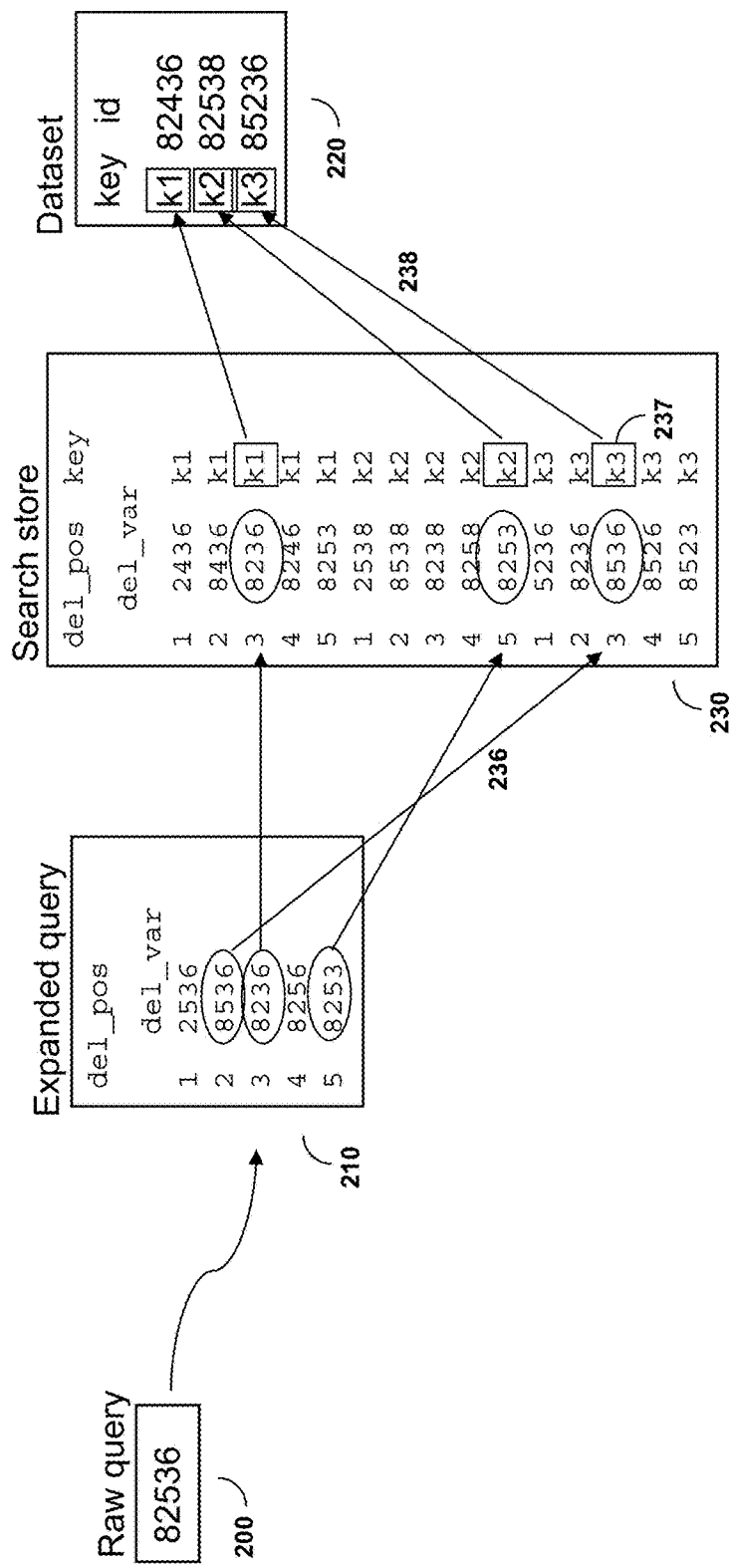

Referring to FIG. 2C, the matching requirement on the id is relaxed to allow deletion-join 1 matches. As described above, this includes all edit distance 1 matches, as well as transpositions and separated insertion-deletion. The raw query 200 and dataset 220 are as before, and both the expanded query 210 and search store 230 are constructed as before by forming the deletion set from the raw query 200 and each id in the dataset 220. In this example, the lookup from the expanded query uses only the del_var. This finds both the previous hamming distance 1 matches and also the new match 236. The key 237 in the match entry 236 is looked up 238 in the dataset 220 to retrieve the dataset record for further processing. In the example, the raw query id "82536" is a deletion-join 1 match to the dataset id "85236," involving a transposition.

Figure 2D:
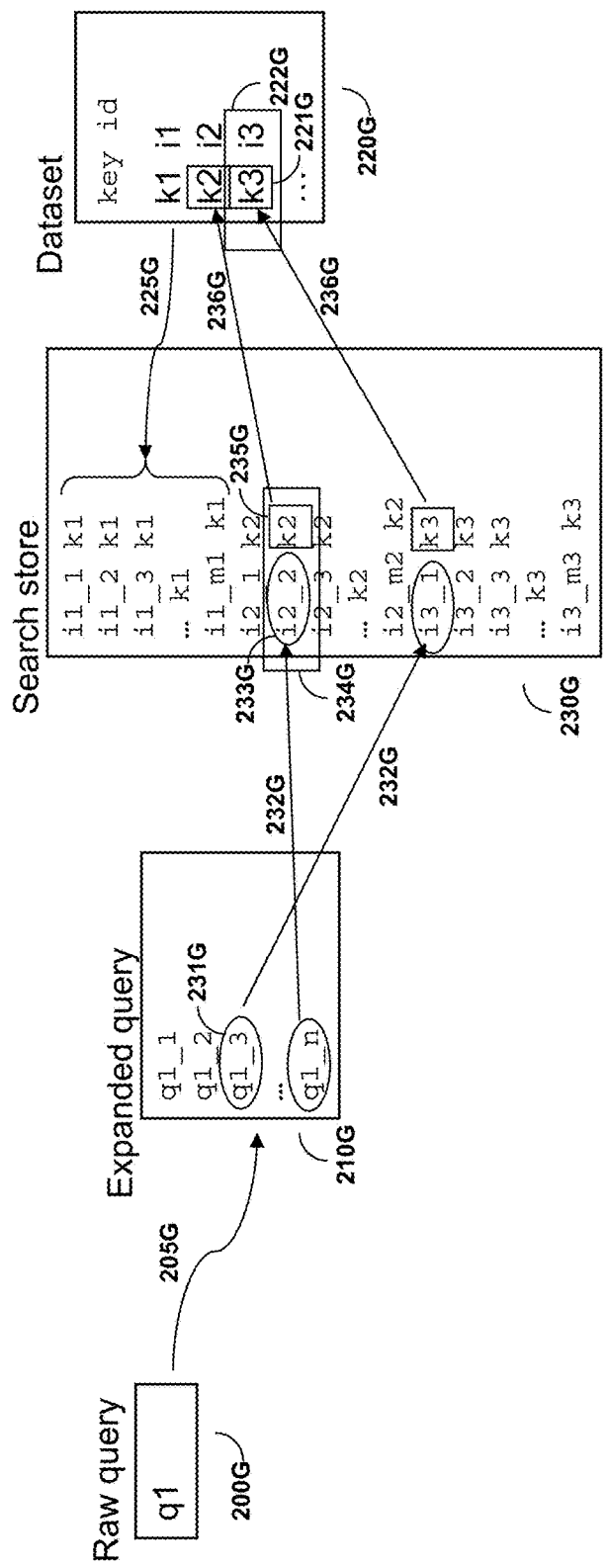

FIG. 2D diagrams a general example. A raw query 200G passes through query expansion 205G to give an expanded query 210G. Query expansion 205G produces two or more entries, consisting of one or more search keys and optionally the original raw query or additional information from the query record from which the raw query was derived. Each entry in a dataset 220G is expanded 225G by a search-entry expansion procedure to two or more entries in a search store 230G. Search-entry expansion 225G produces two or more entries, consisting of one or more search keys and optionally additional information from the dataset record. Search-entry expansion 225G need not produce distinct search-entries for each entry in the dataset 220G, as there may be duplicate keys in the dataset 220. The search-entry expansion procedure 225G need not be the same expansion procedure as the query expansion procedure 205G.

Each expanded query search key(s) 231G is looked up using a variant-lookup procedure 232G in the search store 230G to find a matching entry 233G. The lookup procedure 232G may perform computations on the query search key 231G, so it need not be identical to the search-entry search key 233G. The dataset key 235G, corresponding to the matched search-entry search key 233G, is then used to lookup 236G and to retrieve all records in dataset 220G having dataset key 235G.

2.3 Variant Network Analysis 2.3.1 Variant Neighborhoods

A variant neighborhood is a set of tokens that are related by a sequence of variant pairings (also called variant relations), possibly including variant pairings specified by external data 106, such as synonyms, abbreviations, cultural variants, etc. In one implementation, the variant profiler 110 profiles the data source 100 to be clustered using the deletion-join procedure to detect and identify typographical variants that differ at most by one insertion and one deletion. This covers single insertion, deletion, and substitution, as well as transposition and separated insertion/deletion (e.g. "hello" and "hllio" are deletion-join 1 variants). In the variant profiler stores 115, every token has an associated list of one or more variants, which can be updated online as more records are processed. Every variant however is also a token with its own variants. The set of tokens obtained by following a sequence of variant pairings formed by the deletion-join procedure, or other similarity measure, defines a neighborhood. The closure of this set is called the closure neighborhood and forms a connected component in the graphical variant network, in which tokens are nodes and variant pairings are edges. Supplementing similarity variant pairs with variant token pairs obtained from external data 106 or user-supplied input, for example, synonyms, alternative spellings, cultural variants, etc., leads to larger neighborhoods of related tokens.

Figure 3A:
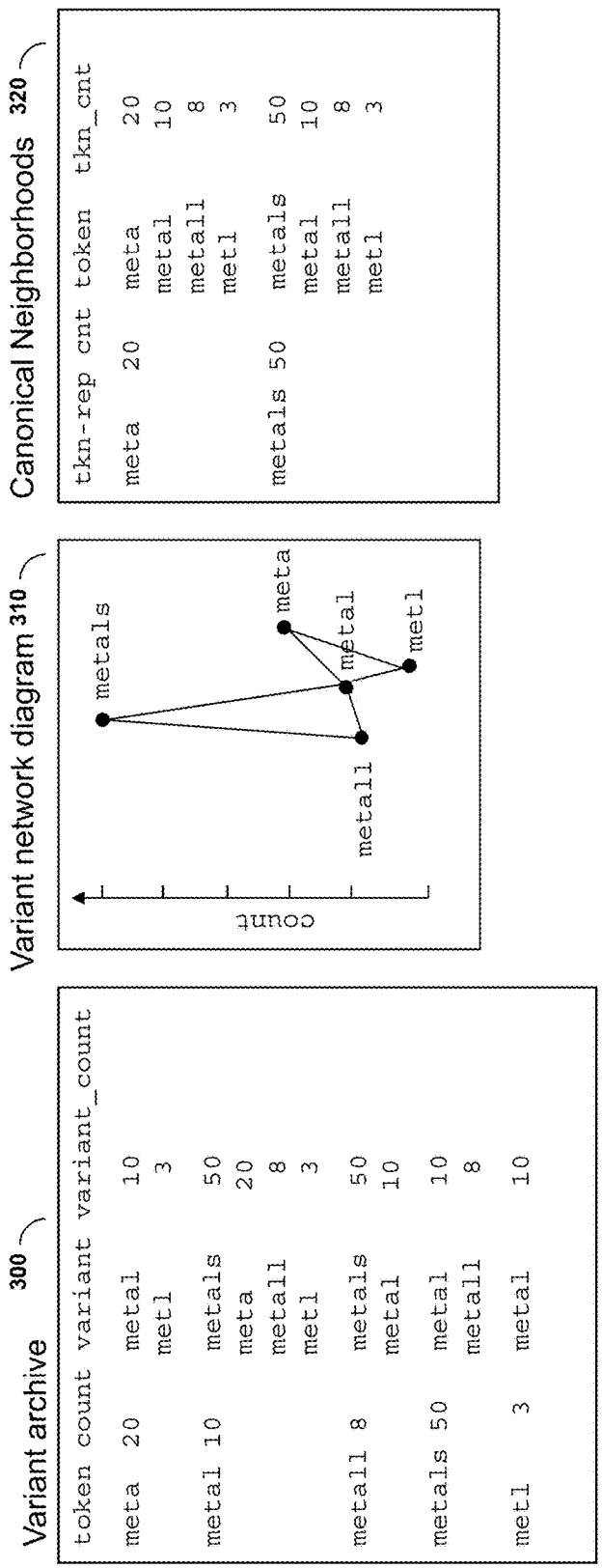
FIG. 3A illustrates an example of a variant network.

In FIG. 3A, a variant archive 300 contains a list of tokens appearing in records of a dataset; each token (labeled as "token") has an associated count (labeled as "count") of the number of times it occurs in a field (or context) of a dataset (e.g., the number of records in which it occurs in a field), and a list (labeled "variant") of each of that tokens variant tokens, and the number of times they occur in the same field (or context) of the dataset (labeled "variant_count"). A variant neighborhood network diagram 310 corresponding to the content of the variant archive 300 can be constructed by taking every token as a node and connecting every token with each of its variants. Each node is associated with its count. In some implementations, arranging the nodes so that tokens with higher counts are higher on the display (e.g., according to a vertical axis, labeled "count") provides a useful graphic view allowing common and rare words to be easily distinguished. A connected component of the variant neighborhood network is a directed acyclic graph and is the transitive closure of the similarity relation for tokens in that connected set. The full network diagram for a dataset may include many disconnected graphs of this kind 2.3.2 Token Representatives A token representative is a selected token of a connected neighborhood. In some implementations, every token in a neighborhood may be replaced by a token representative for that neighborhood. This has the effect that a search for the token representative will return all records associated with any variant in the neighborhood. This is desirable because it reduces the workload during variant searching of iterating over variants. A simple variant search is to search for each token and then to search for each of its variants. The iteration over variants has to be done every time the token is encountered. If all variant tokens in a neighborhood are replaced with a token representative, each time any of the variant tokens is encountered, a single lookup on the token representative suffices to return all variant matches.

In addition, working with neighborhoods of variant tokens may supply a measure of transitivity to variant searching. The variant-pair relation is not transitive because if B is a variant-pairing with A and C is a variant-pairing with B, C need not be a variant-pairing with A. For example, consider a deletion-join 1 variant pairing. The token "chicago" is a variant of "chicago#", and "chicag0" is a variant of "chicago," but "chicag0" is not a deletion-join 1 variant of "chicago#."

For the purposes of variant search however, it is desirable that set of records found when searching on A or on B are the same. This is because if A is a rare variant of B, then more of the records associated with the "actual" token intended by A are those found by a search on B. For example, a search on "chicago#" and its deletion-join 1 variants will find the "chicago" matches, but it will miss other matches of "chicago" like "chicag0".

Since variant-pairing isn't transitive, the only way to achieve more transitivity is to enlarge the neighborhood of tokens included when searching on either A or B. A search on the token representative for a neighborhood then ensures that all tokens within the neighborhood return the same records. Of course, since the search has been expanded beyond the local neighborhood of individual tokens, some pairs of retrieved tokens may fail to match because the tokens are too dissimilar. This is acceptable because the associated records may still match on the basis of strong scoring from other fields. Such matches could not be found were not a suitable candidate returned by a search.

The closure neighborhood is the neighborhood found by the transitive closure of the variant relation for a chosen token, that is, it is the set of all tokens that can be reached by a chain of variant pairings. Any token in the closure neighborhood may be chosen as the token representative, so long as it is used as the token representative for all tokens in the neighborhood. However, closure neighborhoods can grow unusably large as datasets grow larger and more diverse because more variants arise that fill in the gaps between otherwise disconnected closure neighborhoods, causing them to coalesce. This makes looking at other kinds of neighborhood important.

In some implementations, a token representative is a token that does not have a variant with a higher count. In FIG. 3A, a canonical neighborhood 320 includes all tokens that can be reached by starting from a token representative and following links connecting one token to another of equal or lesser count. A token may belong to more than one canonical neighborhood. The token is the representative token of the canonical neighborhood.

Figure 3B:
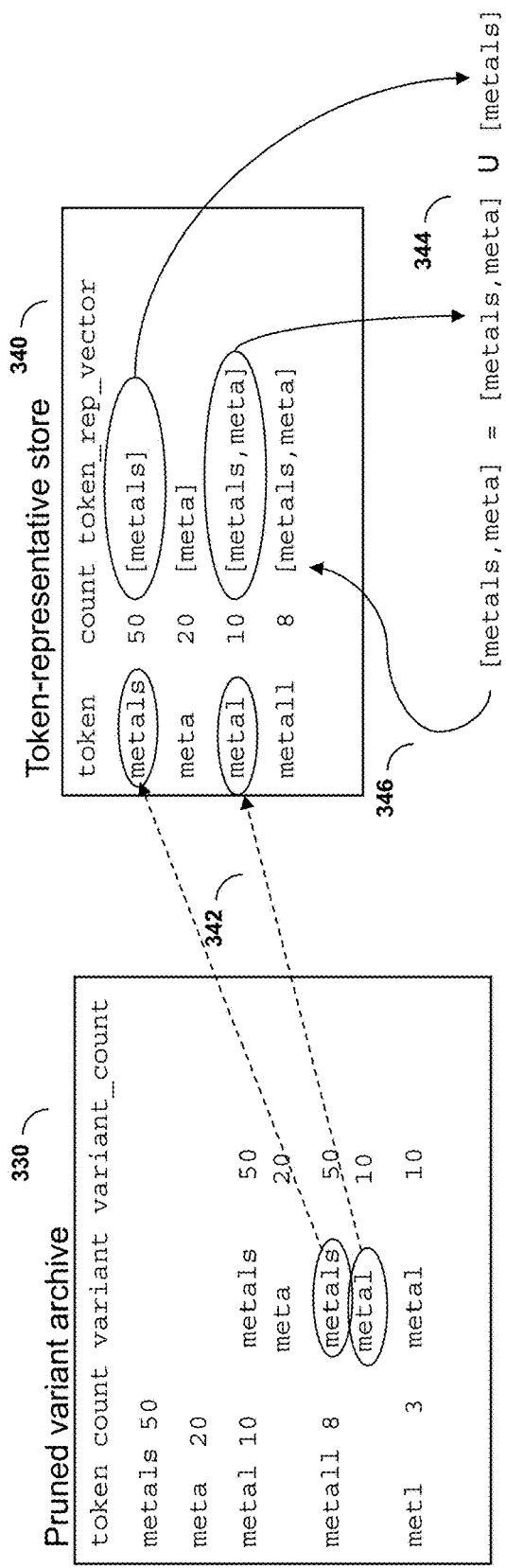
FIG. 3B illustrates an example of the process to populate the token-representative store.

In one implementation, diagrammed in FIG. 3B, token representatives and canonical neighborhoods can be computed by first sorting the variant archive 300 in descending order by count and discarding all variants where variant_count<count to obtain the pruned variant archive 330. Entries with no variants are token representatives and are immediately added to the token-representative vector store 340. As records in the sorted variant archive are processed, each token is written to a token-representative vector as a token and a token vector consisting of itself. For each non-token-representative, the token-representative vector associated with each of its variants is looked up 342 in the token file. The union of these token vectors is computed to find the set of distinct token-representatives 344 and the resulting token-representative vector is written to the token file along with the token 346.

In another implementation, token representatives may be identified as all tokens having a count larger than some token threshold, except when the tokens are related by stemming (e.g. plurals) in which case the stem-related tokens may be kept as variants in the same canonical neighborhood, and the stem-related token with the highest count is the token representative. This serves to break links between common tokens and reduces the size of canonical neighborhoods. To find tokens and canonical neighborhoods, the previous algorithm may be applied with the modification that for all pairings of tokens where each token has a count above the token threshold, the variant pairings are broken, and the formerly paired tokens are added to the token-vector file as token representatives, i.e. as tokens with no variants of higher count.

A variation of this implementation is to define as token representatives all tokens belonging to a specified dictionary or token list (again with the caveat about stem-related tokens). Tokens then do not need to be common; they simply need to be recognized as distinct tokens by some authority.

In some implementations, variant tokens paired on the basis of external data 106, such as synonyms, abbreviations, cultural variants, etc., may be considered members of the same canonical neighborhood as the tokens they are paired with, though there are circumstances when it is valuable to be able to exclude them from the canonical neighborhood (effectively, turning off the pairing). Labeling tokens with their origin, say from external data 106 or from particular similarity measures used in the variant profiler 110, provides an effective means to control the treatment of paired variant tokens from any source.

2.4 Segmentation

In the example of FIG. 1B, data records read from the data sources 100 or from tokenized records 118 are provided to the clustering engine 130 for processing. In some implementations, data records may be sent to a segmentation engine 132. A segmentation engine assigns a segment identifier to a data record based on a value, called the segment value. Records may then be partitioned by a parallel partitioner 134 based on the segment identifiers to be sent to different recipient processing entities, where every record having the same segment identifier is sent to the same processing entity. A processing entity may include, for example, a processing node such as a CPU (e.g., a core in a multicore processor) or computer, or a computational process or thread executing on a CPU.

In some implementations, the segment value can be derived from a user-specified expression, perhaps using functions defined in a user-specified ruleset, applied to the original record 100 or tokenized record 118 and/or information supplied at runtime (for example, the location of the data center processing the data or the name of dataset). Records with identical segment values receive the same segment identifier (if they are derived using the same expression), but records with different segment values may receive different segment identifiers or may also receive the same segment identifier, depending on the segmentation scheme. For example, the segment value may signify the country of origin of the data record (which may be implicit, say based on the location of the data center processing the record, or explicit as a field in the record). In some implementations, a strategy identifier is used to distinguish sets of segment identifiers. For example, the country of origin of the data record may have one strategy identifier while the country of birth of the individual named in the record has a different one. This allows segment values and segment identifiers to run over overlapping ranges, without requiring the correspondence between them to be preserved.

One use of segmentation is to isolate a single segment of records from a larger set of records to reduce the number of records that must be compared to find a match (during clustering or other matching operation)—only records having exactly matching segment identifiers (and strategy identifier, if present) are candidates for matching. In this example, segmentation is followed by partitioning segments of records into multiple processing entities for parallelization of a clustering algorithm. The clustering algorithm described herein may allow the number of records to be increased during segmentation because there is a performance benefit to parallel execution of the clustering algorithm based on the segmentation. As a result, the set of records sharing a segment identifier (i.e., in the same segment) may be much larger than when segmentation is used for isolating records. To achieve the performance benefit, the number of distinct segment values only have to be large enough to give a roughly balanced distribution among the processing entities after partitioning. Balanced distribution may be more critical for some parallel processing systems than others. Also, some kinds of skew in distribution (more records assigned to some processing entities than others) may be dealt with by overpartitioning: using many more partitions than processing entities. With overpartitioning, each processing node will likely receive a similar amount of work, even if the partitions are of widely different sizes. A partitioner may also partition by a multipart key consisting of one or more approximately matched fields (or a hash function applied to them) along with one or more exactly matched fields, to reduce potential skew. In some implementations, the choice of segment value is based on exact criterion, which form part of the cluster membership criterion. For example, when clustering account records, in addition to personal identity fields, a bank may be interested in clusters of records for accounts of particular types. In particular, records for current accounts (e.g., checking accounts) may be clustered together while records for savings accounts may be clustered separately. This kind of segmentation is sometimes implicit—the current account and savings account records may come from different sources and are already segregated. In some cases, there may be an account type identifier in the data record that can be used as a segment value but must be trusted to report accurately the nature of the account.

In some implementations, corroborating checks are made at the point of segmentation or later during membership determination to validate the segment value is faithful. For example, it may be that account numbers of savings accounts always start with digits from a particular set of possibilities. If this set is known at runtime, whether an account is truly a savings account may be confirmed before segmentation. If the set is known to exist but the valid values are not known, the prefix digits may be made part of the cluster membership criterion, or indeed of the segment value, and consistency among the account numbers present in a cluster may be established as part of the cluster membership determination.

After a record is determined to be a member of a particular cluster, the record may be augmented to include a cluster_id identifying that particular cluster. In some implementations, the segment value (or sometimes the segment identifier itself) may be set to the cluster_id from a previous clustering. This enables hierarchical clustering. For example, if data records were originally clustered by name, a subsequent clustering by government assigned identifier to find clusters of records sharing a similar name but having distinct government assigned identifiers could use the name cluster_id as a segment value. Records having dissimilar names do not need to be compared because they cannot be members of the same cluster.

In some implementations, the data records may be hash-partitioned by segment identifier across multiple processing entities, so all records having a common segment identifier are placed together in a single processing entity. This enables parallel processing because communication between segments is not required.

2.4.1 Parallelism Through Replicated Segmentation

Figure 4:
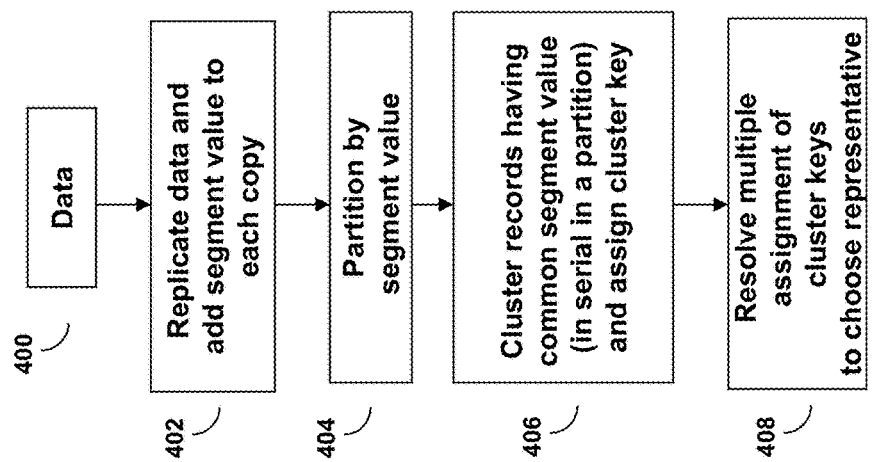
FIG. 4 is a flow chart of an example of a process for parallelizing clustering uses replicated segmentation.

Parallelization in the absence of a disjoint segmentation of a data source may be achieved by replicating a data source 100 and employing a suitable choice of segmentation that ensures any two variant pair records must share at least one segment value. A segment value may be composed of one or more fragments of a field value or combination of field values. A set of segment values is said to be exhaustive if at least one segment value will be shared by two records for every allowed variation between the two records. In FIG. 4 the process of exhaustive replicated segmentation is diagrammed. Data source 400 is read and a unique record key is assigned to every data record 401, if one is not already present. Every data record is replicated enough times that each segment value from an exhaustive set of segment values is assigned to one replicant data record 402. (The number of replicated records may depend on the data in each record.) The resulting data records are partitioned by the segment value associated with the replicant 404. Surrogate cluster keys are generated in each processing entity for sets of linked pairs of replicants 406. By construction, every allowable variant will be detected in the partition of some segment key because the segment keys are exhaustive. The superset of cluster keys is resolved to a unique cluster_key for each cluster following a multiple match reconciliation procedure 408.

Consider the case of matching two government ids which can differ at most by one substitution. An exhaustive set of segment values is given by taking the digits (or more generally characters) from first the odd-numbered positions in the government id and then from the even-numbered positions. That this set is exhaustive is easily seen because any single character substitution must be in either an odd-numbered or even-numbered position, but not both. Hence the segment value of the other type must agree for two records differing by only a single substitution. For example, 123456 and 124456 have the segment keys (135, 246) and (146, 246). They differ on the first segment value but agree on the second.

Figure 5A:
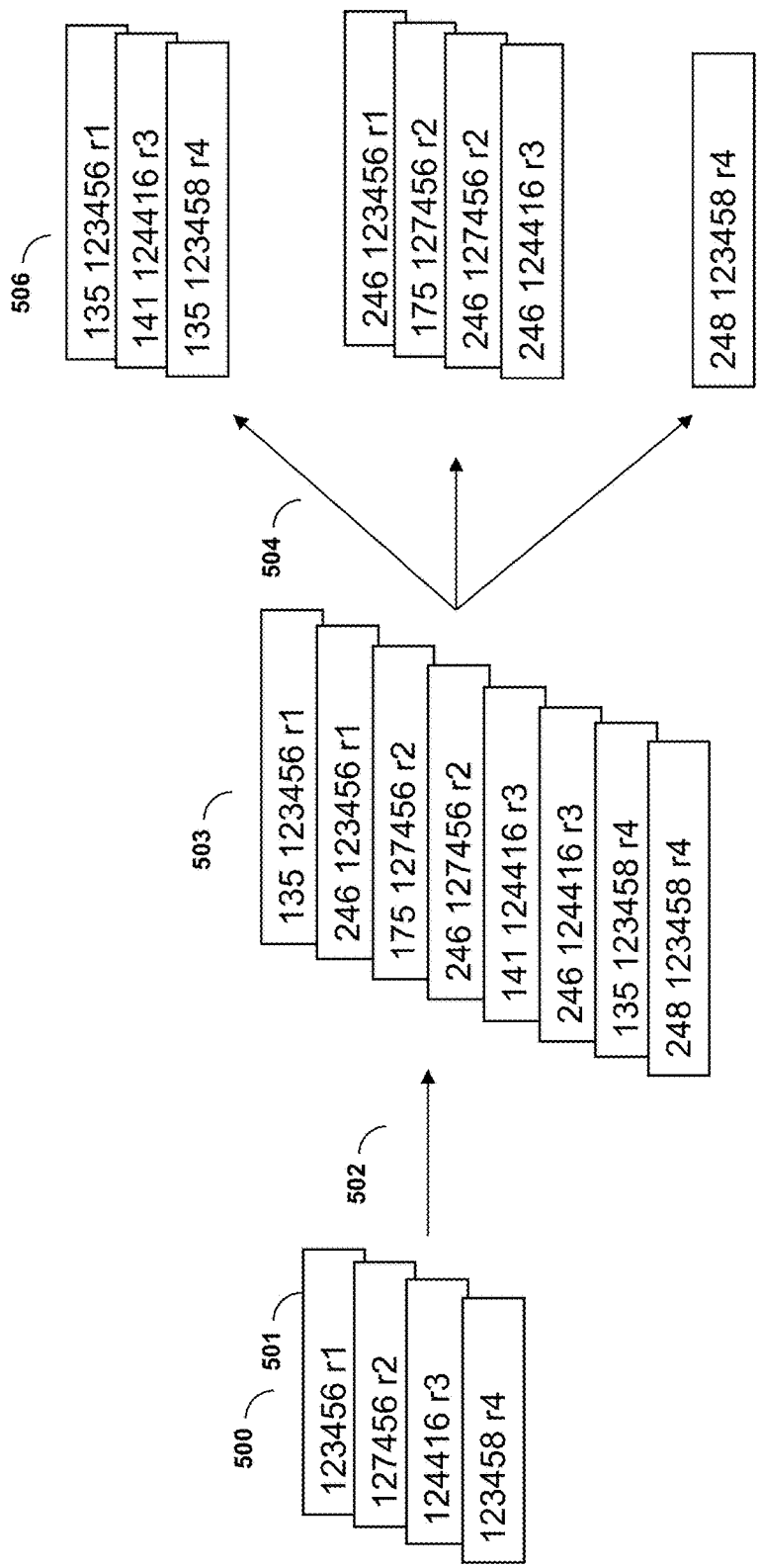
FIG. 5A-C illustrates an example of parallel clustering using replicated segmentation.
Figure 5B:
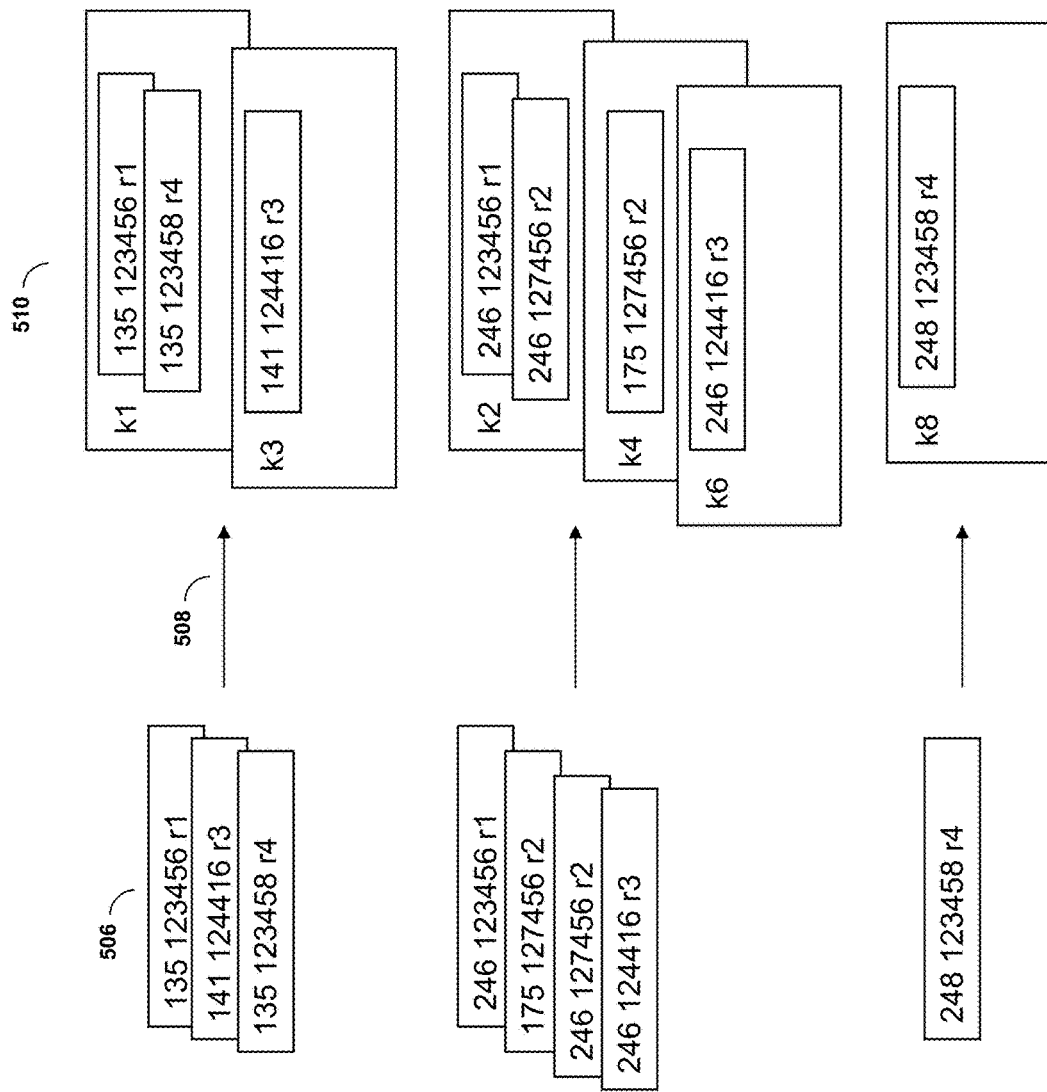
Figure 5C:
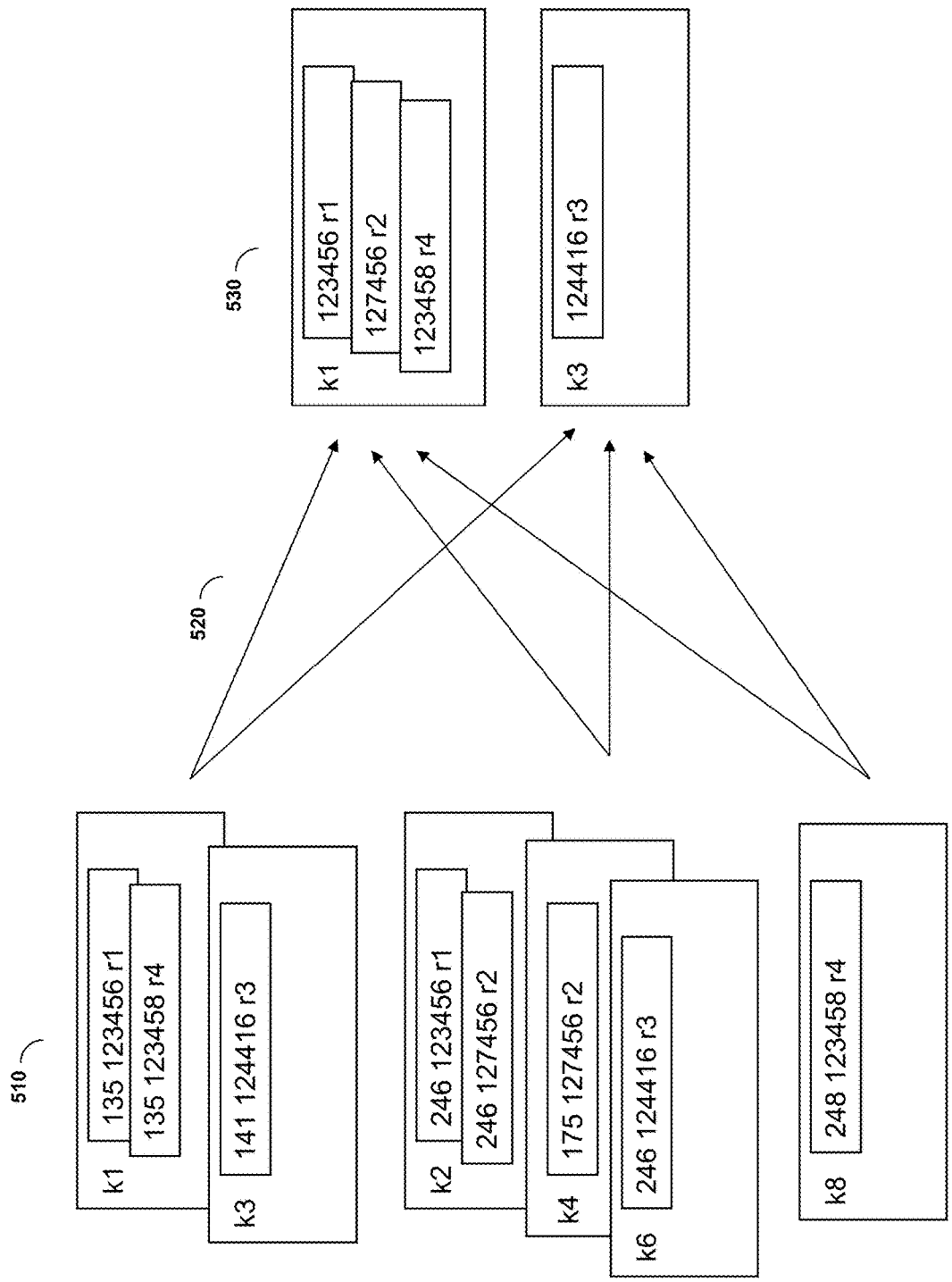

FIGS. 5A-C diagrams the overall process in this case. In FIG. 5A, data records 700 are read. The first record 501 has numeric id "123456" and a unique record key "r1." The records are replicated twice 502 and assigned segment keys 503 consisting of the characters from the odd-numbered positions, e.g. "135," and from the even-numbered positions, e.g. "246." Data is partitioned by the segment key value 504. Records having the same segment key will be in the same partition, but records with the same record key need not be in the same partition 506. For example, note the segment key value "135" is in the first partition, but records having record key "r1" occur in both the first and second partitions.

In FIG. 5B, the records 506 are clustered within their partitions 508 and cluster keys are assigned, resulting in data clusters 510. Note that some record keys are assigned to multiple clusters. For example, the record having record key "r1" occurs in both cluster "k1" and cluster "k2."

In FIG. 5C, this multiple match is reconciled. The data clusters 510 are read, the multiple assignment of cluster keys are resolved 520, and a final assignment of cluster key to record is made 530. The details of this resolution are described below.

2.4.2 Parallelization without Segmentation

Surrogate key generation is the pairing of a generated value with the value of a natural key composed of one or more fields. Each distinct value of the natural key has a unique surrogate key value. One method for generating surrogate keys is to maintain a store of surrogate key/natural key pairs, sometimes called a key cross-reference file (key xref store, for short). As each new data record is processed, the natural key value is looked up in the store: if it is found, the surrogate key is returned; if it is not found, a new surrogate key is generated. The key xref store may be partly created in memory to hold a record of surrogate keys that have been generated in the current run and partly landed on disk (and read into memory at the start of processing) to hold previously generated values. After keys are generated, key pairs containing newly generated surrogate keys are added to the landed key xref store. Sometimes the maximum generated surrogate key value is stored separately for convenience so that on the next run the highest previously generated key is available as a starting point for generating further keys without duplication.

To apply this key generation method in parallel, data records may be partitioned by the natural key, or some fragment of the natural key called a partition key, so that all data records sharing a value of the partition key are sent to the same processing entity. This ensures that all records sharing a natural key are handled by the same processing entity. In particular, the recent in-memory store of newly generated keys is accessible to the processing entity, so all records with the same natural key will get the same surrogate key value. In a shared-nothing parallel architecture, i.e. with no interprocess communication, the store of newly generated keys is available only to records handled by the current processing entity, so were records with the same natural key to be handled in different process entities during the same parallel run, they would get different surrogate keys.

In some situations, the distribution of natural key values might be uneven with many more records having certain values than the average number of records having other values. In this case, partitioning by the natural key (even a fragment) may lead to data skew across the data partitions, that is, some partitions will contain many more records than others. This degrades the efficiency of the parallelization because processing time is proportional to data volume for tasks of equal complexity (like surrogate key generation). In this case, it might be worth partitioning by round-robin (simply passing records successively to each of the processes) to get a uniform data distribution. Surrogate keys may then be generated within each process by the method described above, and after surrogate key generation is completed, the resulting multiple surrogate key assignments to the same natural key can be deduplicated in a post-processing step. One method to perform this deduplication is to rollup the records in each partition to the natural key to find the surrogate key/natural key pairs within that partition and then repartition on the natural key (now there are only number of partition copies of the natural key). A second rollup over the natural key can select one of the multiplicity of generated surrogate keys, say the smallest, for each natural key. Finally, in a second pass over the records (in the original round-robin partitioning), the surrogate keys can be updated to the single selected value. Despite requiring two passes over the data, this can be more performant than generation with skew. (There are other ways to handle large keygroups involving different orders of operations, for example, one could perform the double rollup to deduplicate the natural keys before generating surrogate keys or apply some other method to detect and divert large key groups for separate processing.)

A second situation in which partitioning by the natural key may be an ineffective strategy for parallelization is when surrogate keys are generated for approximate (or equivalent) but not necessarily exactly matching natural keys. In this case, there may be no partition key that is guaranteed to send every candidate matching record to the same process. (A process is an instance of execution running within a processing entity.) This is because the matching decision typically involves a comparison of records and cannot be made on the basis of the data solely within the record. The multipass solution just described is ineffective in this case because the deduplication process relies on the natural key to identify when multiple surrogate keys have been assigned. Identifying which records contain approximately matching natural keys across partitions is equivalent to the original problem.

A solution to both situations is described by the following example of surrogate key generation. A different implementation of the key xref store may be used for recently generated surrogate keys than the in-memory store described above. Stores are available with the following features: 1)

they are held on disk and may be updated (by appending) by one process, 2) they may be read (and may be updated as changes are made) from multiple processes. The surrogate key generation procedure is as follows. A partitioner partitions the data to get even distribution across processes, for example, by round-robin. Within each partition, the process takes each natural key and performs a lookup against the key xref stores of all partitions: if the natural key is found in one or more key xref stores, the process takes the surrogate key having the lowest value (and marks whether the natural key appeared in more than one key xref store); if the natural key is not found in any key xref store, the process generates a new surrogate key and updates the key xref store associated with this partition. As new surrogate keys are generated in a process, they are persisted to disk in the associated key xref store for that process. This removes the need to update the key xref store after all of the keys are generated. Moreover, since all processes reading that store are updated with the change once it is persisted, if a natural key first appearing in one process should later appear in another, it will be assigned the original surrogate key first assigned in the other process.

There is a potential race condition: if two records with the same natural key should arrive at different processes at the same time, the lookup against the key xref stores may show no match in both processes, and two new yet different surrogate keys will be generated for that natural key. This only happens for records processed before the local key xref stores are updated with the new surrogate keys, and the updates are read by the other processes. All subsequent natural keys will be assigned with the surrogate key of the lowest value. By also marking these later records with the fact that more than one natural key was seen, a marker is placed which can be used to correct the key collision after the fact. A filter on this marker will find natural keys that had more than one surrogate key assignment, the alternate surrogate keys can then be identified and replaced. It is still possible to miss a collision if the natural key is only presented when the initial collision(s) occurs. To reliably detect and correct this, the data (hence natural keys) may be passed through the key generation process a second time to correct the assignment—on the second pass the ambiguous assignment will be evident. Note this second pass fix is reliable even if the natural keys are only required to be approximate, so long as the matching decision is deterministic, that is, makes the same decision if the same data is rerun. This works because by the start of the second pass all local key xref stores will have been written and read by all processes.

This parallelization method may be applied to clustering, and other fuzzy data operations, as well. Clustering may be considered a form of surrogate key generation in which keys are not exact but only equivalent. The detailed form of the local stores may differ by data operation, but similar techniques may be used.

Figure 6:
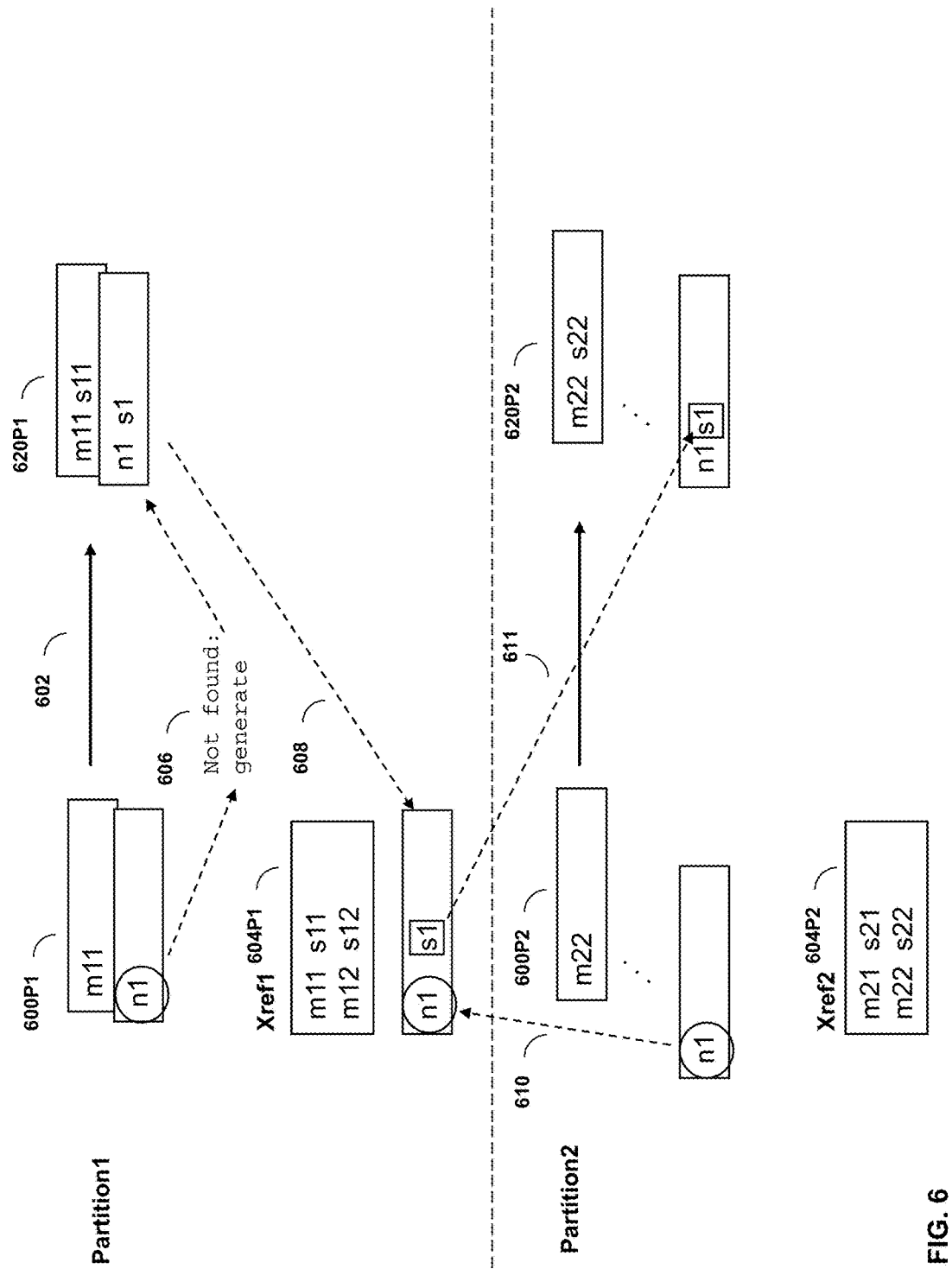
FIG. 6 illustrates an example of parallel surrogate key generation with partitioning by the natural key.

FIG. 6 diagrams an example of the surrogate key generation procedure running in parallel without partitioning on the natural key. A record with natural key "n1" originally appears in data source 600P1 in partition Partition1. The key xref stores Xref1 604P1 of partition Partition1 and Xref2 604P2 of partition Partition2 are consulted, "n1" is not found 606, and so surrogate key "s1" is generated and written to the output 620P1. Meanwhile the key xref record "n1 s1" is persisted 608 to the local key xref store Xref1 604P1. Later a record with natural key "n1" appears in data source 600P2 in partition Partition2 (not in Partition1 as it would have had the data been partitioned by the natural key). Again the key xref stores Xref1 604P1 and Xref2 604P2 are consulted, "n1" is not in Xref2 604P2 but is found 610 in Xref1 604P1. The surrogate key "s1" is retrieved, assigned to the record 611 and written to the output 620P2.

2.5 Scoring Field Deduplication

After segmentation (and parallelization), in some implementations, a record from the data source 100 or the set of the tokenized data records 118P is passed to the scoring field deduplication engine 144. In some implementations, as previously described, the fields used in scoring to determine cluster membership, the so-called scoring fields, may be determined at runtime. The scoring field deduplication engine 144 selects one record from the set of records having identical values on the scoring fields to continue the clustering process and arranges that the resulting cluster id be shared among the other records in the set. Since the records are identical from the perspective of the cluster membership decision process, the same clustering decision must necessarily be reached for all of them.

2.6 Candidate Search 2.6.1 Two Modes

Two slightly different approaches to a search-based clustering process are possible depending on whether all of the records in a dataset are processed together or whether records are processed as they arrive against previously clustered records. The former describes a batch mode while the latter is an incremental mode that may be used as an online mode but may also be applied when all of the data is available at the outset. One difference between the two modes is that the various stores, including the variant profiler stores 115, the variant network stores 126, and the search store 146, used by the clustering engine in a batch mode are computed during a preprocessing step whereas in the incremental mode some stores may be populated incrementally as data arrives. In particular, one incremental mode approach is to precompute on the full set of data the variant profiler stores 115 and variant network stores 126, while the search store 146 is populated incrementally. In an incremental mode, clustering results may depend on the order in which records are processed.

2.6.2 Cluster Discovery in Incremental Mode

In an incremental clustering process, incoming records, called query records, may be compared with records in existing clusters to determine to which cluster the query record should belong. In a direct approach, each query record may be compared against every previous record to find the closest match. If there is no close match, the query record becomes the first member of a new cluster, otherwise it is added to the cluster containing the record it most closely matched. While straightforward, this is potentially computationally expensive. Most comparisons result in a negative conclusion ("not this cluster"), and the worst case is when the query record is a member of a new cluster. This approach can be improved by choosing a representative member from each cluster and comparing the query record to the cluster representative. This leverages the observation that variant similarity of records is at least partially transitive: if a query record is not sufficiently similar to the cluster representative, then it is unlikely to be sufficiently similar to any other members of the cluster either (since they are all similar to the cluster representative).

Because variant similarity is not actually transitive ("A similar to B" and "B similar to C" does not imply "A similar to C"), a lower threshold of similarity, sometimes called a candidate threshold, may be applied when comparing a query record to the cluster representative than is applied to determine cluster membership. The intent is to have an accurate lower bound on the expected similarity of the query record with the members of the cluster. This lower bound successfully excludes clusters to which the query record cannot belong, but it does not answer the question, to which cluster the query record does belong. The reason is that more than one cluster representative may have a similarity score with the query record above the candidate threshold. These are collectively called candidate records. After candidate records are identified, the query record may be compared to every member of each cluster associated with some candidate record to find the cluster with which the query record has the closest affinity. If this affinity is above a match threshold, the query record is made a member of the corresponding cluster, otherwise it is assigned to a new cluster. Steps may be taken to improve the performance of cluster membership determination after candidate records have been found, and some are discussed below.

Even with the improvement of comparing query records to cluster representatives, the case of identifying new clusters is still bad: a query record belonging to a new cluster must be compared to a representative of every existing cluster to confirm it is new. As the number of clusters grows, the time to identify a new cluster increases, and the clustering process slows down, because the number of comparisons required to recognize a new cluster is proportional to the number of existing clusters. The computational challenge is to find a better way to cluster records than to compare each query record to every cluster representative.

The search-based clustering approach tackles this challenge by attempting to change the worst case of identifying a new cluster into a best case. In its simplified form, this is done by performing a search against a search store populated from existing cluster members or their cluster representatives. Query records are looked up in the search store. If they are not found, the query record must belong to a new cluster. This process is conducted by a candidate search engine 140, shown in FIG. 1A and FIG. 1C. The approach is advantageous if the time to populate the search store 146 and to lookup queries in the search store 146 is less than the time to compare each query record with every cluster representative directly against the growing store of cluster representatives. The subtlety behind the approach lies in defining the process used by the candidate search engine 140, including selecting a search-entry expansion engine 145 to populate the search store 146, a query expansion engine 143 to construct queries for it, and a search engine 147 (or variant-lookup procedure) to conduct the search.

FIG. 2D can be used to illustrate an example of this process. In some implementations, a search store 230G is populated with entries computed from a dataset 220G, consisting of cluster members. Applying the variant-lookup procedure 232G to expanded query entries 210G against the search store 230G may be used to compute a proxy of some necessary component of the cluster membership criterion. A proxy is a good one if a record cannot be a member of a cluster unless it reaches at least a minimum score against the proxy. This minimum score (candidate threshold) defines a candidate match 232G. Those cluster records 236G for which the query reaches the required minimum are candidate records.

An example of a proxy score is the number of words shared in common by two multiword fields (or combinations of fields), like two personal names. The scoring algorithm used in cluster membership determination to compare two names might take into consideration more than the set of words in each name, in particular it might take into account word order and position. However, two names cannot be a match if they have no words in common, and they are unlikely to have a high score if they only have a small fraction of words in common. Counting the number of words two names have in common is a proxy for the name score—not as accurate but reliable nevertheless. The proxy becomes more accurate if the number of words in common is known relative to the number of words in each name. This length can be stored in the search store 146 so that it is available to compute the proxy score without fetching any cluster records.

In some implementations, the initial choice of query may be guided by the cluster membership criterion. Better performance may often be achieved if that component of the cluster membership criterion which gives the most granular or most distinguishing decomposition of the original data records is used as the basis for constructing the raw query. This reduces the number of records that meet the search criterion.

Multiple searches involving queries with values from multiple fields may also be made and may lead to narrower sets of candidates. These are discussed below. Here the focus is on queries taken from a single field because the details are simpler.

Consider an example in which a company wishes to identify customers from a customer database based on personal name, government assigned identifier, and date of birth, allowing some measure of variability in each. Here, the government assigned identifier might be preferred over personal name for an initial query. Typically the government assigned identifier is more specific than a personal name, even allowing for possible ambiguity, so it makes a better query—expected to narrow the set of candidate matches more rapidly.

However, the granularity associated with a field (or combination of fields) may not be constant across an entire dataset. There may be default values populating some of the government assigned identifiers (for example, blank or all zeroes or all nines) with large numbers of associated records. This represents a breakdown of the choice of query for a subset of records. If too many records are retrieved by a search, the primary objective of the search to narrow the set of records to be scored has not been achieved. To handle this, a cutoff limit may be imposed on the number of candidates returned from a given query search: if the number of candidate records exceeds a threshold, the query is rejected.

In some scenarios, a raw query may continue until all queries from an expanded query are rejected, after which the query record must be reprocessed using an alternative search strategy. For example, when the raw query is a multiword string, an expanded query might consist of the individual words in the string. A very common word in the string might be rejected as returning too many candidates while the remaining rarer query words are adequate to find the desired matching records. The decision on whether to reject the raw query may be based on whether potentially satisfactory matching records will be missed by failing to include records from the rejected query. When multiple queries are embedded within the expanded query, it may be okay for some to fail while others continue. In the absence of multiple independent queries, rejection of one query from an expanded query set may be sufficient to reject the entire set.

In many cases, it may be independently useful to identify the sets of records where a search strategy breaks down as this may indicate a data quality issue in the data, say an incomplete record or an unexpected default value in a scoring field. Separating such sets of records from the main body of records classifies the data into sets that indicate the general reliability of a final match decision. A record with no, or only a default, government assigned identifier may be expected to lead to a less confident match than would be found between records both with government assigned identifiers.

2.6.3 Multiple Searches and Search Codes

The search store 330G may be improved by deduplicating search entries 334G on their pairing key 333G and rolling up the location key 335G to location information holding all location keys for data records having the particular search key 333G. In some implementations, the location information might be a simple vector of keys if the number of associated records is small. In other implementations, the location information might be a bitvector, in which each bit set indicates explicitly or implicitly a data record in the dataset 320G. Optionally the bitvector may be compressed.

Using a bitvector implementation of the location information may reduce the size of the search store and may eliminate iterating the lookup 332G over identical values of the pairing key 333G but the real benefit comes when combining the results from multiple searches. In an example of a raw query consisting of a multiword string whose expanded query consists of separate queries for each word of the raw query, the results of the separate expanded queries may be combined by taking the logical AND of the location bitvectors. An AND of two location bitvectors will find the bits that are set in the same positions in both location bitvectors. In this case, these will be the records that contain both words associated with the location bitvectors. By forming all combinations of ANDs between the location bitvectors, all combinations of words from the raw query 300G that are present in records 322G in a dataset 320G may be found.

To facilitate organizing these combinations, the concept of a search code may be introduced. A search code is a data pattern code that encodes which search queries contribute to a final location information result. In some implementations, a bit may be set in a bitvector for each portion of a raw or expanded query contributing to a location result. Multiple bits set correspond to logical ANDs of each location information result associated with each bit set. If there were two searches, a first bit would be set for results returned from the first set, a second bit would be set for results returned for the second set and both bits would be set for results returned from both searches (the logical AND of the results of each search).

The concept of making multiple searches on more than one token from a single field and logically combining the location information retrieved by the searches may be generalized to making multiple searches on tokens from multiple fields (or contexts) and logically combining the location information retrieved by the searches.

Figure 7A:
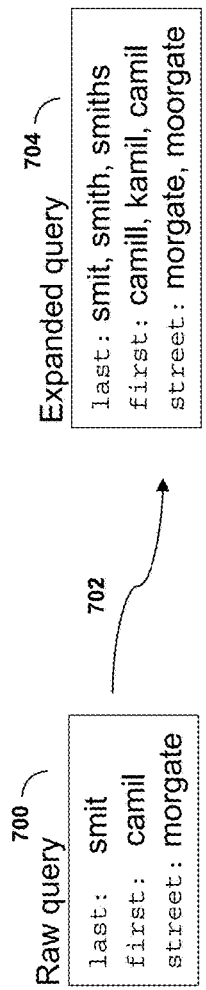
FIG. 7A-D illustrates an example of searching on queries from multiple fields.

FIG. 7A-D illustrate the construction and use of search codes in an example. In FIG. 7A, a raw query 700 is constructed of tokens from three fields of a data record, first (name), last (name) and street. For example, the query for last is "smit." The raw query is expanded by a query expansion procedure 702 to give an expanded query 704. The expanded query in this case consists of variant tokens for each portion of the raw query, possibly obtained from the variant profiler stores 115. For example, the variant tokens associated with "smit" include "smith" and "smiths."

Figure 7B:
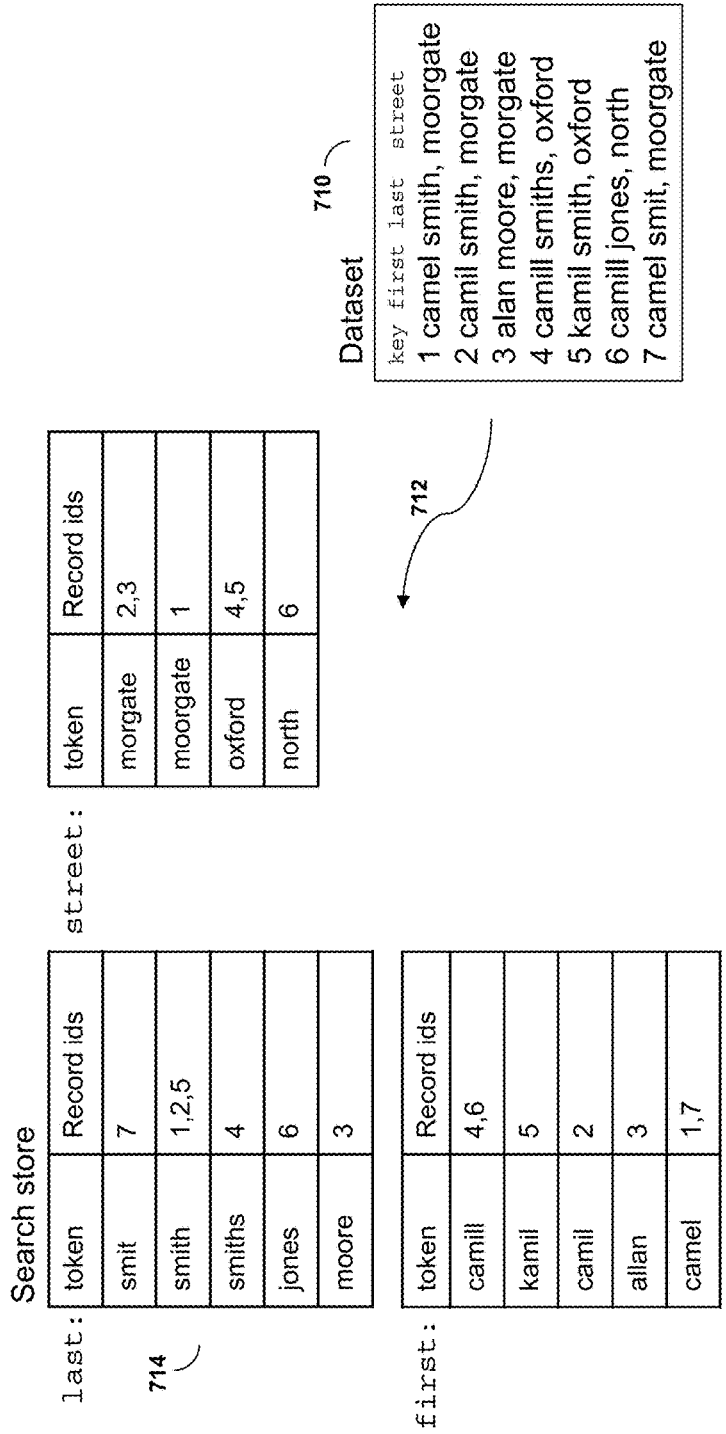

In FIG. 7B, the data source 710 consists of four fields, "key", "first", "last" and "street." A search-entry expansion procedure 712 is used to populate the search stores 714 for each of the three query fields.

Figure 7C:
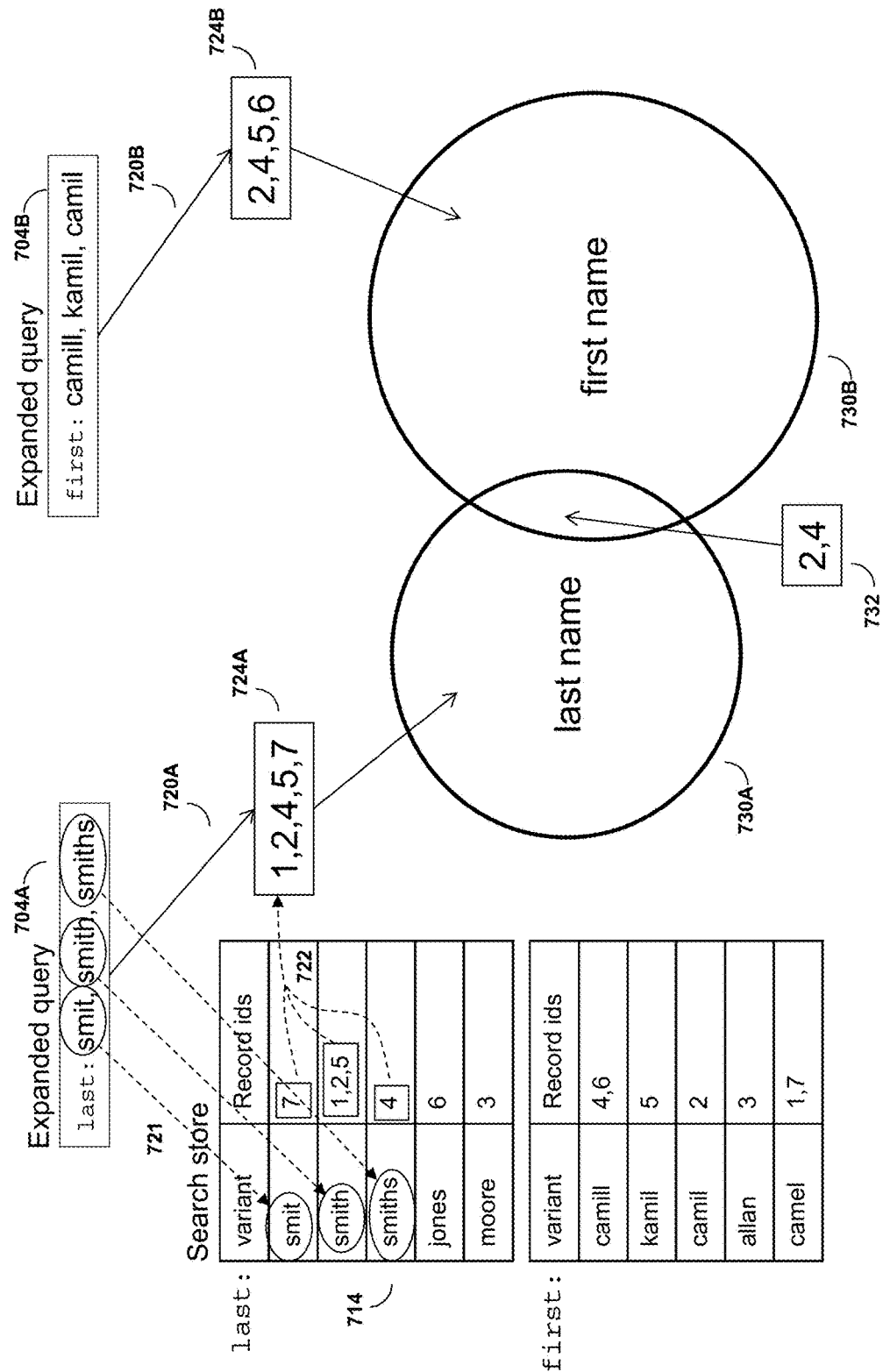

In FIG. 7C, the expanded query 704A is processed by a variant-lookup procedure 720A to give the location result 724A. In this case, the variant-lookup procedure is implemented starting with a lookup 721 in the search stores 714 for each expanded query. Then the location information results from each expanded query are combined (union of vectors or logical OR of bitvectors) to give the location information result 724A for the "last" portion of the raw query. This is represented graphically as a circle 730A labeled "last name."

A second expanded query 704B for the "first" field is processed by the variant-lookup procedure 720B to obtain the location information result 724B. This is represented graphically as the circle 730B labeled "first name." The intersection of the "last name" circle 730A and the "first name" circle 730B contains the records "[2, 4]" 732.

Figure 7D:
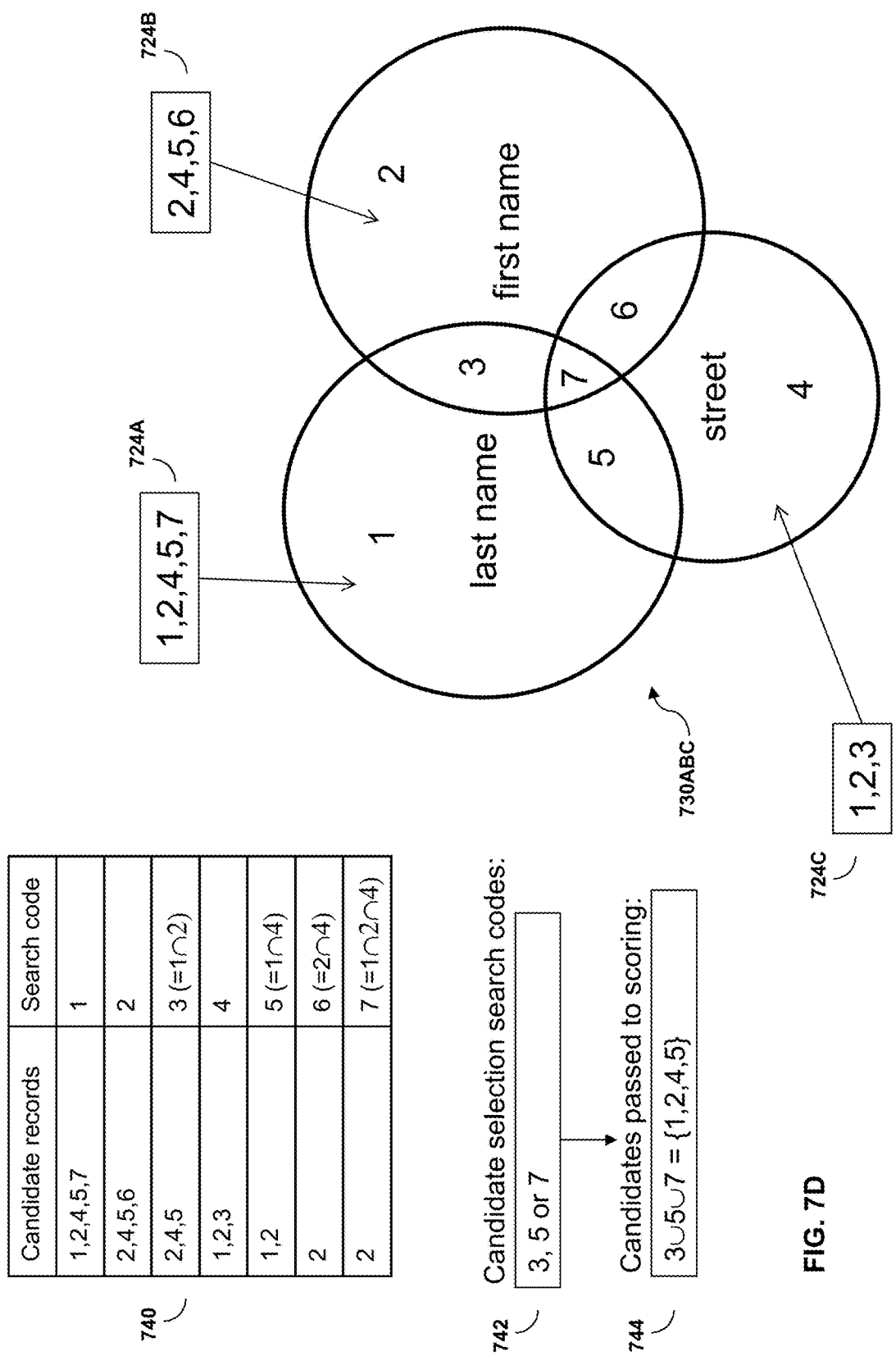

In FIG. 7D, the results of all three raw queries are shown. Each circle 730ABC contains the respective collection of records 724A, 724B, 724C. For example, the "last name" circle contains the records 724A, "11, 2, 4, 5, 71." This circle is assigned the search code 1, and this is recorded in the search-code table 740. Similarly, the "first name" circle is assigned search code 2 and the "street" circle is assigned search code 4. It should be emphasized that the search code 1, respectively, 2 and 4, refers to the entire corresponding circular region and not just to the region excluding intersection. The records associated with more than one raw query being simultaneously satisfied are found by intersecting the sets of records associated to the corresponding circular regions. The result is recorded in the search-code table 740 and is paired with a search code formed by the sum of the search codes of the individual regions contribution to the result. The search code here may be recognized as a bitmap representation in which each bit set indicates which circular region is present.

The final step is to specify which search codes correspond to sufficient response to the query to merit closer scoring for cluster membership. Here, the candidate selection criterion 742 is that the search code must be 3, 5 or 7. This means that a successful query candidate must have a variant matching last name, and either a variant matching first name or street or both. A variant matching first name and street is insufficient, as are any single variant matching piece of information. The candidates returned for scoring 744 are given by the union of the records associated with these three search codes 742.

2.6.4 Query Construction

In the query construction procedure 142, the user provides a query construction expression, perhaps involving a query construction ruleset, to construct a raw query from contents chosen from fragments or the whole of one or more fields or runtime parameters in records read either from the data sources 100 or from tokenized records 118. A raw query may consist of the values for one or more query fields, some of which may be vectors. For example, a user may wish to use a personal name as a query and specifies a rule to construct it by concatenating the contents of first, middle and last name fields with spaces or commas and spaces between each field value. If one or more name fields are null or unpopulated, additional assignments ("cases") may be provided to specify construction of the name. Alternatively, perhaps only the initials of the first and middle names are kept and concatenated with the last name. A raw query may be a structured record formed of multiple parts, for example, the raw query for a personal name might consist of separate first, middle and last name query fields. If only a single full_name field were present on the data record, the user query construction expression might specify how to parse the full_name value to populate the constituent fields of the raw query. The query construction expression might populate one or more data pattern codes, characterizing the data in the query record, for example, a population pattern code which indicates the state of population (e.g., populated, blank or null) of each field used to construct other elements of the raw query.

In some implementations, a standardizer, like the standardizer 112 in the data preparation module 111 of the variant profiler 110, may be applied to a raw query, using operations which the user indicates are required but need not specify in full detail (as they may be available as predefined operations), like deleting punctuation characters or other specified characters or replacing them with alternative characters, padding numbers on the left with zeroes or spaces, lower casing alphabetic characters, etc. In some implementations, multiple independent standardizations may be applied, leading to a vector of standardized raw queries. For example, some punctuation characters like "&" may need to be handled in multiple ways to cover the range of natural usage: the character may be independently deleted, replaced with a space character, left in place, or expanded to the word "and," each with useful effect.

One challenge facing the query approach is that some fields (or combinations of fields), like personal or business names, have a freeform nature: two names may be an acceptable match even if they differ by missing words or word order (i.e., similarity scoring functions or rules used to compare tokens during cluster membership processing may penalize missing words or changes in word order but tolerate them nevertheless). This implies, for example, that generally a full name cannot itself be the query—too many acceptable matches might be missed. That is, a search directly on a full name presumes a word order and a number of names present that may not be satisfied by all interesting candidates. Instead it may be better if a full name were treated as a raw query, and actual queries were produced from the raw query by expanding it.

2.6.5 Query Expansion

A raw query may be processed by the query expansion engine 143 to produce an expanded query. In some implementations, a tokenizer, like the tokenizer 113 in the data preparation module 111 of the variant profiler 110, may be applied to elements of the raw query during query expansion to divide the query into tokens, called query terms.

In some implementations, the query terms may be expanded further to include, for example, typographical variants, alternative spellings, and cultural variations. For example, a query term "civilization" may be expanded to include the terms "civilisation" and "civilizatin." A query for "Weber" may be expanded to include the term "Webber." Other expansions are also possible, for example, names in one alphabet may have multiple spellings in another alphabet (e.g., translations from Chinese characters to Roman characters). The set of typographical variants to use in expansion may be computed in a variant profile 110. After preprocessing establishes a base set of variant profile stores, further variants may be detected online and added to the lists of variants in the variant profile stores as new records are processed.

In some implementations, each query term may be replaced by its token-representative(s) using a token-representative store 127 with the variant network stores 126. This facilitates comparison of variant tokens as variant tokens within the same neighborhood (e.g. a canonical neighborhood) will be replaced by the same token-representative, so identifying related variant tokens simply requires finding exact token-representative matches. A variant token may be a member of more than one neighborhood and therefore have more than one token-representative. Every token-representative corresponding to a token may be used as a replacement, thereby increasing the number of (replaced) query terms.

In some implementations, the query expansion engine 143 may form token-pair query terms by combining two (or more) query terms, possibly after token-representative replacement. The purpose of this pairing is to narrow the set of records returned from a search based on a query term. In some implementations, the (token-representative-replaced) token-pair query terms are sorted in alphabetical order. This makes localized changes in word order detectable when searching with token-pair query terms. If the original word order is stored when forming each pair of adjacent words, the set of such pairs may be used to reconstruct the original phrase, up to block rearrangements. This means that the original word order is captured in word pairs in a way it is not by the set of words themselves.

Creating token-pair query terms from query terms that have one intervening query term improves searching because words (or other tokens) may be missing from a field (or combination of fields) without categorically ruling out the chance of a match, and the field scoring algorithms are designed to tolerate this. For example, middle names are frequently truncated or omitted from records, as are articles like "of" from business names. Many other less obvious examples of missing words occur in real data. Triples and higher sets of query terms may be used to form still narrower queries.

For example, the query expansion engine 143 receives the raw query "John Jacob Jinglehiemer Schmidt." The token-representative store 127 returns the list of token-representatives "John", "Jacob", "Jingleheimer", "Schmidt". Note that "Jinglehiemer" in the raw query has been replaced by its more frequent variant "Jingleheimer", the token-representative in the canonical neighborhood of variants containing "Jinglehiemer." The query expansion engine 143 creates alphabetized (token-representative-replaced) token-pair query terms using adjacent query terms, in this example, "Jacob John," "Jacob Jingleheimer," and "Jingleheimer Schmidt." The query expansion procedure also creates alphabetized (token-representative-replaced) token-pair query terms for query terms with one intervening query term "Jingleheimer John" and "Jacob Schmidt."

Figure 8:
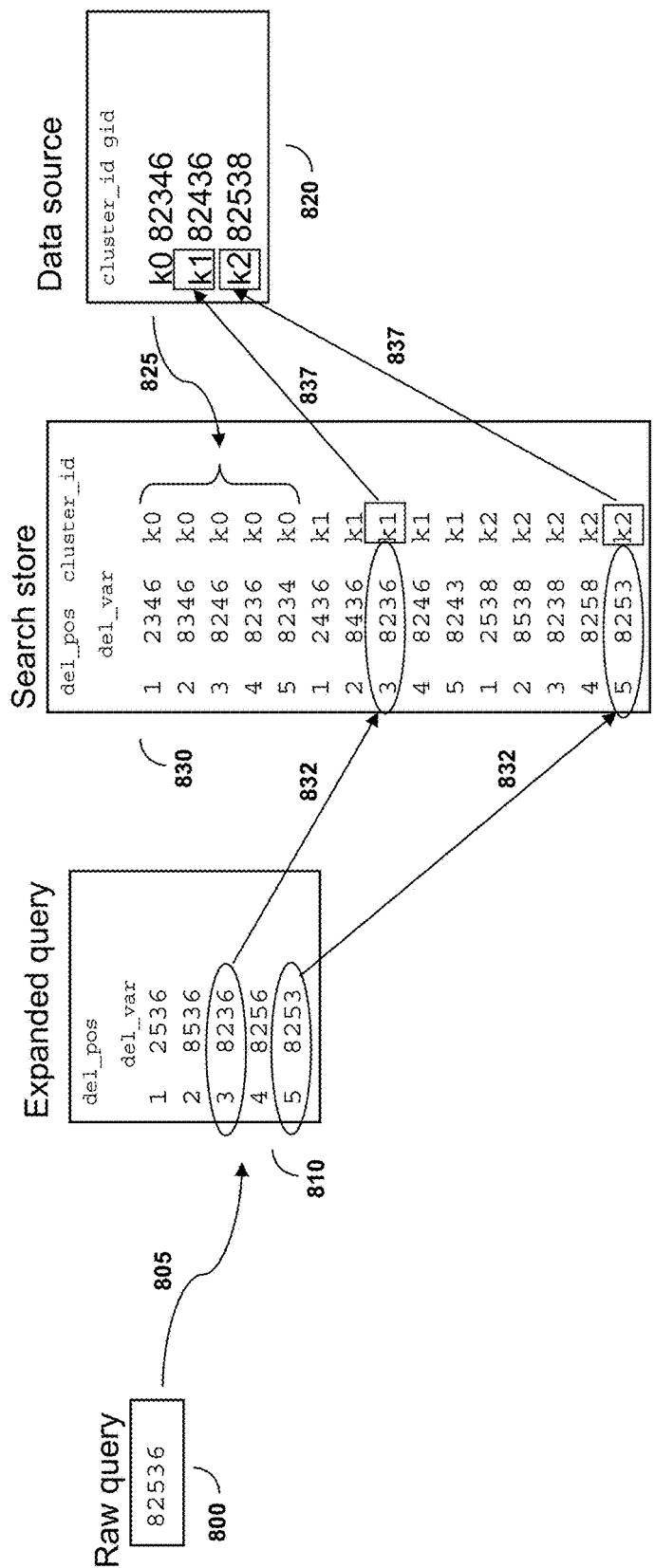
FIG. 8 illustrates an example of using the deletion-join procedure to implement a variant-lookup procedure.

In some implementations, raw queries may be expanded by applying a query expansion procedure which modifies the raw query systematically to produce a set of variant queries designed to be queries in a variant-lookup procedure as part of a variant-search as described above. As an example, suppose two government assigned identifiers ("gids") are considered a match if and only if they differ at most by a change in one character, that is, if they have a hamming distance of at most one. The deletion-join procedure can be used to implement this through an exact lookup, as shown in FIG. 8. Each gid in the data source 820 is expanded 825 by forming its deletion set and writing each deletion entry to a search store 830, including the deletion position, deletion variant and the associated key. A raw query 800 consists of a gid. The raw query 800 is expanded 805 to its deletion set 810, using the same deletion-join procedure used to expand 825 the entries of the search store 830. The expanded queries are sought 832 in the search store 830 using both the deletion position and deletion variant as keys. This produces a set of variant matches, which may then be used to retrieve matching records 837.

A variant of this procedure is to include the original unmodified gid as an entry in the search store 830 with deletion position zero and to change the key of the search lookup to just the deletion variant (ignoring the deletion position). This will find all deletion-join 1 variant matches, including single character insertions, deletions and substitutions, and two character transpositions and non-adjacent insertion/deletion—these comprise all edit distance one changes and most of the edit distance two changes which are not length-changing (double-substitution is not covered).

2.6.6 Scoring Engine

A measure of similarity between a query data record and data records in existing data clusters (in incremental mode) or other data records in the data source (in batch mode) may be represented as a score calculated by a scoring engine 150. The scoring engine 150 may compare two records by comparing the whole or partial contents of one or more fields or combination of fields, for example, the fields that individually and collectively constitute name and/or address. These contents may be referred to as "field-values," as they are derived from the values of fields of a record.

In some implementations, scores between a chosen pair of field-values may be based on a similarity criterion such as equality of the values or the edit distance between the values (other similarity criteria include other forms of similarity for various types of data, such as phonetic similarity, or graphical similarity for image data (e.g., for facial recognition)). Short field-values consisting of one or two characters may often only be compared for equality as there may be no basis for distinguishing error from intent. Separately, some field-values have semantic meaning only as units that happen to contain space characters, for example, a city field containing "New York". With such values, the edit distance counting the number of insertions, deletions and substitutions required to change one value into another may be a good measure of similarity.

In some implementations, scores between a chosen pair of field-values, whose contents are ordered sets of tokens separated by some separator (generally but not exclusively the space character), may take into consideration the number of tokens that match exactly, those that are variant matches (not identical but recognized as equivalent or similar), and the correspondence in token order and position. For example, personal names may be constructed as the concatenation of first, middle and last name fields with either a space or a comma separator. Data quality issues include: one or more fields being unpopulated, and changes in name order (e.g. swapping first and last names).

In some implementations, a score between a pair of records may be computed based on predefined or user-specified scoring rules (e.g., specified by a ruleset or by a function) by combining sets of scores, called score-elements, between pairs of field-values, according to a hierarchy of conditional rules, to give weighted emphasis to the presence, absence or degree of similarity of different pieces of information. For example, when comparing address records, two records that have identical house number, street, city and zipcode would ordinarily be given a higher score than another pair of records in which one record is missing the zipcode or where there is some discrepancy, like mismatched zip codes. Score elements need not be restricted to a single scalar value but may take more complex forms, including records containing multiple fields and vectors.

Scores may include match codes, which are data pattern codes that encode a set of qualitative scoring measures for individual field-value pairs (e.g., "exact match" if a score is 1, "fuzzy match" if a score is less than 1 but greater than a fuzzy match threshold, etc.) and/or record characteristics like the state of population of field-values. Match codes serve a purpose much like the search codes described above: they organize a set of scoring measures and facilitate the specification of qualitative matching conditions without requiring the computation of a numeric score.

Score elements should have at least a partial ordering, so they may be combined and compared to determine a "highest" or "best" score. The partial ordering of score elements and associated comparisons of score elements to determine a best score may take the form of a predefined or user-specified ruleset, involving an ordered case-based set of rules.

2.6.7 Cluster Membership Determination in Incremental Mode

Figure 9:
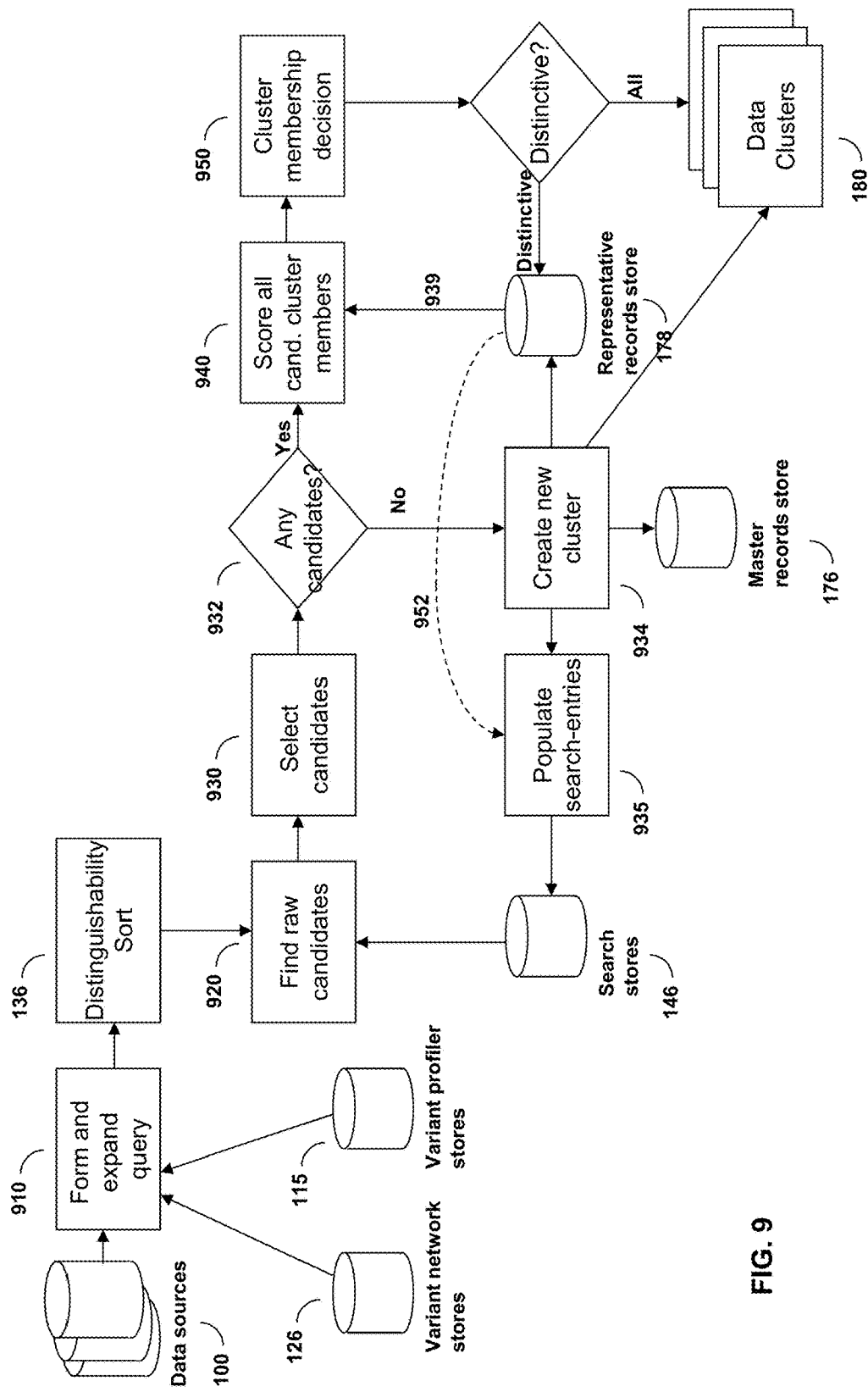
FIG. 9 is a flow-chart of an example of a process for clustering in incremental mode.

The whole clustering process comes together in cluster membership determination. FIG. 9 outlines an example of a process for determining cluster membership. Data sources 100 are read. The records are segmented and partitioned in parallel (not shown) before a raw query is formed and expanded 910. In some implementations, the query construction and query expansion procedures, discussed above, read from the variant profiler stores 115 and the variant network stores 126. In some implementations, the query records may be sorted by a distinguishability criterion 136 to put more distinguishable records first. Raw candidate records are found 920 using the candidate search engine described above by accessing the search stores 146. A candidate selection procedure 930, involving predefined or user-specified conditions, is applied to the raw candidate records to produce a set of candidate records.

The candidate records found after selection 930 are members of existing clusters and are in fact candidate cluster records, that is, they are approximate matches to members of one or more clusters. The selection conditions 930 are specified to determine whether a query record is sufficiently close to a cluster to merit closer investigation.

If a query record returns no candidate cluster records 932 after candidate selection 930, then the query record is not close to any members of existing clusters, and a new cluster is created 934. The query record is written to the master records store 176 as a master record. The new cluster record is also written to a representative records store 178 and to the data clusters 180. The new cluster record is used to populate search-entries using a search-entry expansion procedure 935 that are added to the search stores 146. In some implementations, the search stores 146 used by the candidate search engine to find raw candidate cluster records 920 are only populated 935 from master records. In other implementations, in addition to the master records, records in the representative records store 148 may also be added to the search store 952.

A master record is a special representative member of a cluster that characterizes the cluster in some way, for example, the first member of a cluster. In some implementations, data is sorted before clustering begins, so the first member of a new cluster will be first in the sort order, relative to that cluster. For example, in a dataset of bank loan counterparties, data might be sorted by descending number of words in the company name, making the master record the member of the cluster having the longest company name. Records with long company names may be chosen to seed clusters because long names may be more easily distinguished by some similarity scoring procedures than shorter names because they contain more tokens and also a greater diversity of tokens.

A cluster may have more than one master record. This feature will be used below in the cluster approval process when merging clusters and when overriding cluster membership decisions made by an algorithm with decisions made by a person.

If the candidate selection procedure 930 returns one or more candidate records, the members of every data cluster associated with the candidate records are retrieved to be scored against the query record. The associated data clusters are called the candidate data clusters. In some implementations, not every cluster member is retrieved 939 but only those members stored in a representative records store 178. The scoring engine 150 is used to determine a similarity score between the query record and every retrieved cluster member. If the best score is above a match threshold, the query record is added to the corresponding cluster. If a query record is above the match threshold for more than one cluster, then it is added to the cluster for which it has the highest score. In some implementations, if a query record has the same best score for more than one cluster, it is added to the first cluster. In other implementations, if a query record has the same highest score for more than one cluster, it may be added to all such clusters with a weight reflecting likelihood of membership.

In some implementations, after a query record is associated with a data cluster, the best score responsible for determining cluster membership may be compared to a threshold. If the best score is below this threshold, then the query record is considered sufficiently distinct from the other members of the cluster and is added to a representative records store 178. The intent here is to leverage partial transitivity of similarity scores. If A is highly similar to B and C is similar to A, then B will be at least reasonably similar to C. As such, it may not be necessary to score C against B as the score against A will be sufficiently accurate. Such a threshold may be called a "near-duplicate" threshold and may be set quite high. The purpose is to reduce redundant scoring especially against cluster members that are nearly identical.

In one implementation, the number of matching token-pair query terms between a query and a raw candidate record may be counted and if the number exceeds a candidate threshold, the raw candidate record is a candidate record, and the associated data cluster is considered a candidate cluster. After all candidate data clusters are identified, the query record is scored against the members of the candidate clusters to find the best score, and the process continues as before.

Figure 10A:
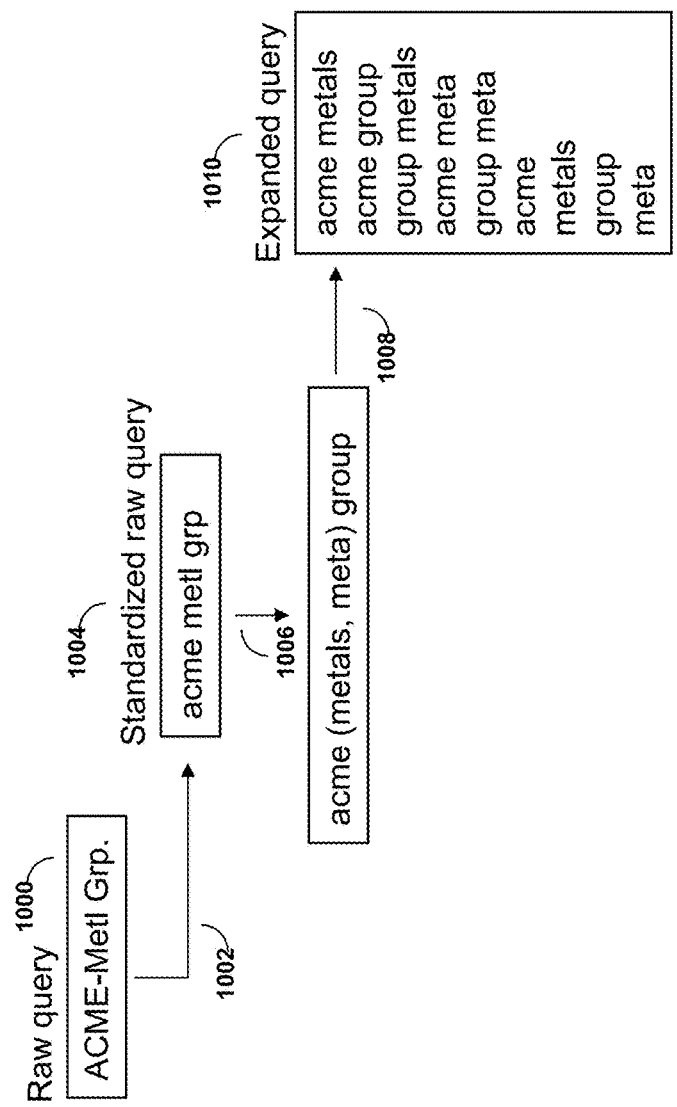
FIG. 10A-D illustrates an example of clustering in incremental mode.

FIGS. 10A-D are diagrams illustrating an implementation of the clustering process for a multi-token query field. In FIG. 10A, a raw query 1000 is formed from a company name, "ACME-Met1 Grp.". It is standardized 1002 by lower-casing and replacing punctuation to give the standardized raw query 1004 "acme met1 grp". Each token is replaced by its token-representative vector 1006 as in FIGS. 3A-B. The word "met1" belongs to two canonical neighborhoods and so has two tokens "metal" and "meta"; both are used in the resulting token-replaced raw query. This token-replaced raw query is expanded 1008 to produce the expanded query 1010, consisting of a list of alphabetized token word pairs and single-word tokens, e.g. "acme metal", "group metal", "group meta", etc.

Figure 10B:
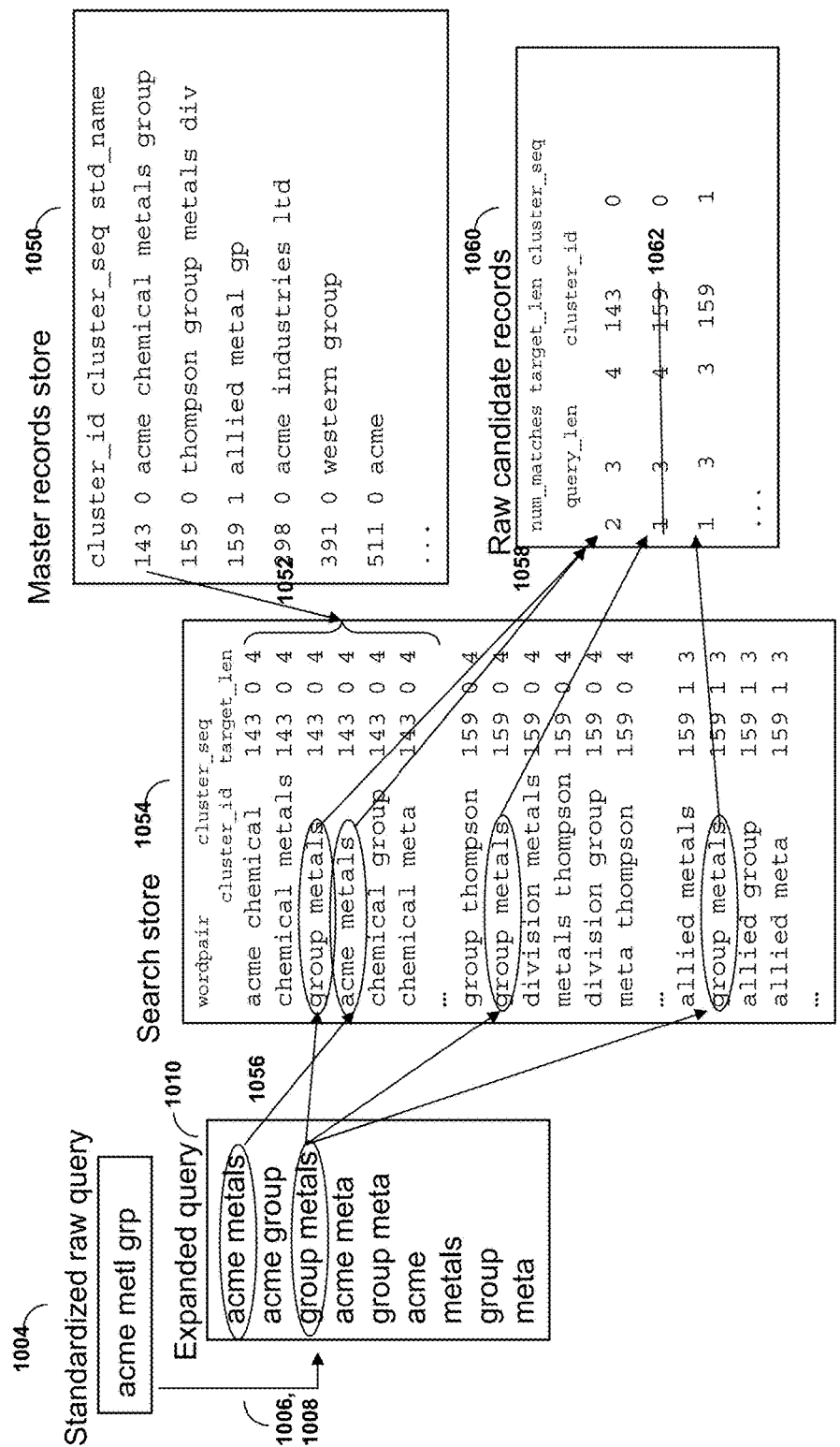

In FIG. 10B, the process continues. The standardized raw query 1004 has been token-replaced 1006 and expanded 1008 to give the expanded query 1010. Separately, the entries of the master records store 1050 have been expanded 1052 to populate a search store 1054. The variant-lookup in the search store 1054 works in this case by taking each token pair from the expanded query 1010 and looking it up 1056 in the search store 1054. The number of token pairs matching to a common cluster id are counted 1058 and the result stored in a list of raw candidate records 1060. In this example, the number of matching token pairs is a proxy for the score of two company names. A threshold is applied to remove candidates 1062 having too few matching pairs for the number of tokens in the query and the master record (the length in tokens of the name in the master record was stored in the search store 1054 for this purpose).

Figure 10C:
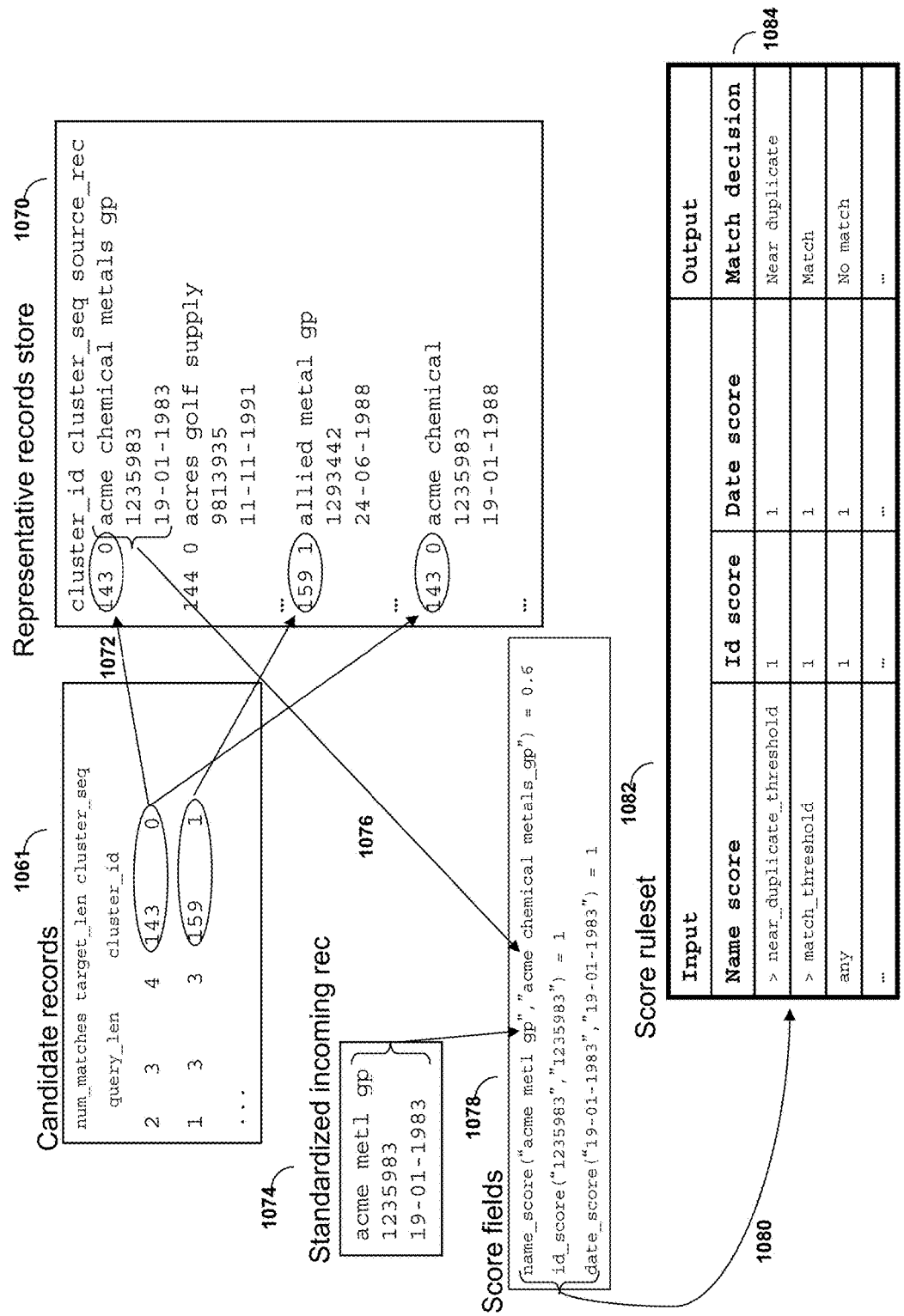

In FIG. 10C, the candidate records 1061 are read to fetch representative records from the representative record store 1070 for candidate cluster ids (including cluster seq) 1072. The scoring fields present in the standardized incoming record 1074 are scored individually 1078 against the retrieved fields from each representative record 1076. These field-level scores 1080 are combined in a case-based score ruleset 1082 to compute a score for the compared records. Here, the score is encoded in logical terms as a match decision 1084. The rules here are read by "and-ing" input conditions across and "or-ing" cases down. For example, if the name score is greater than a near_duplicate_threshold and the id score is 1 and the date score is 1, then the match decision is "Near duplicate". If the name score were lower than the near_duplicate_threshold, then the next row would be tried, and so forth until a matching condition were found, if any. In some implementation, this ruleset can be encoded using a Business Rules Environment, such as the environment described in U.S. Pat. No. 8,069,129, incorporated herein by reference. The score elements shown in the columns of the scoring ruleset 1082 may be encoded in a match code, for example, the second row might have a match code of "311" where "3" in the first position indicates a name score above the match threshold (but below the near-duplicate threshold) and "1" in the other two positions indicate exact matches for id score and date score.

Figure 10D:
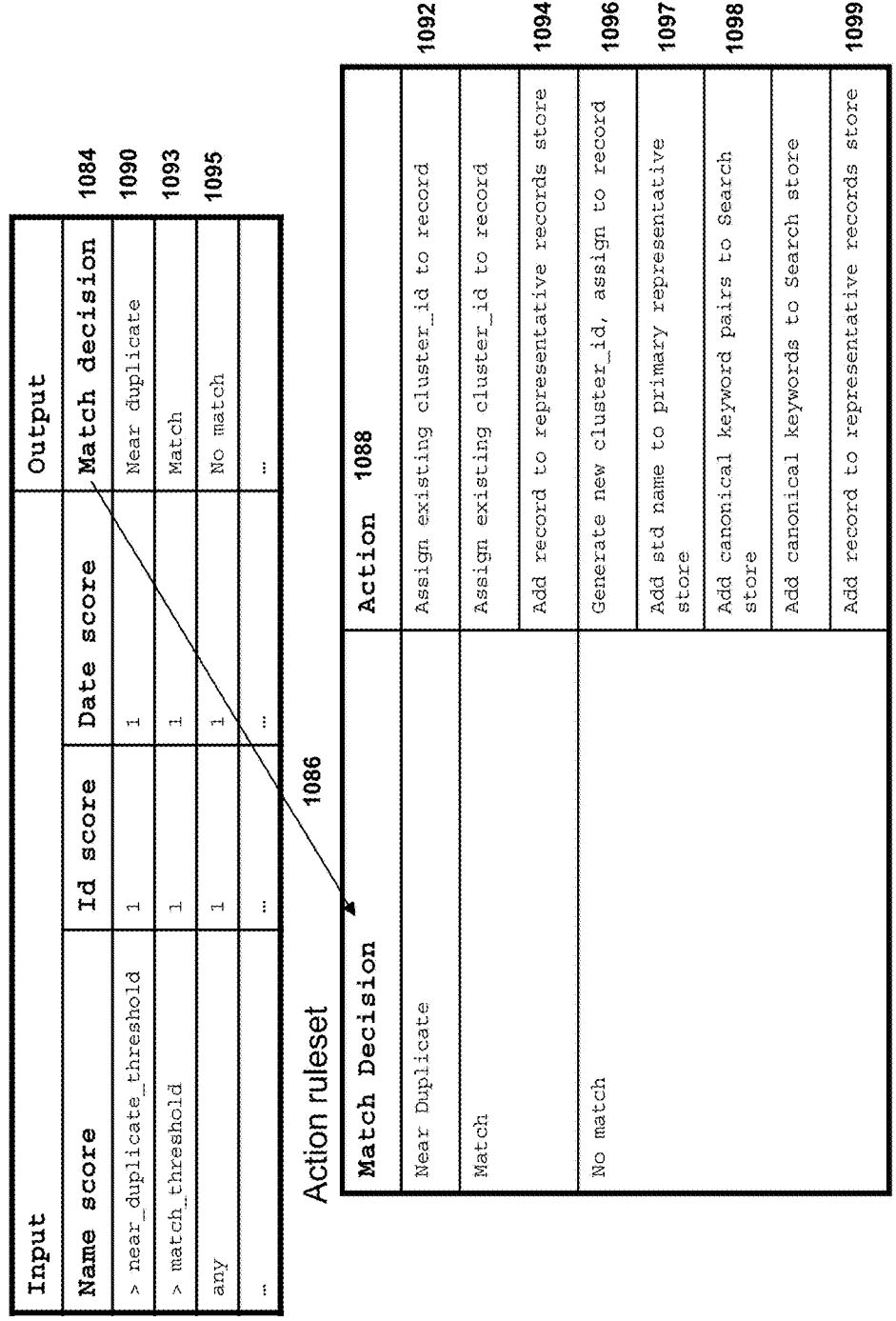

In FIG. 10D, in the score ruleset 1082, the match decision for compared records 1084 is translated 1086 to an action 1088 in another case-based ruleset. Different actions occur for different match decisions. The match decision 1090 "Near duplicate" is assigned if the name score is above a near_duplicate_threshold (which by implication is larger than a match_score) and the other scores are 1. The resulting action 1092 is to assign the existing cluster id to the incoming record. On the other hand, if the match decision 1093 were "Match" (and not "Near duplicate"), then in addition to assigning the existing match threshold, the action 1094 would be to add the record to the representative records store 1070. If the match decision 1095 were "No match", then the actions 1096-1099 would be to generate a new cluster id and assign it to the record, to add the record to the master records store 1050, to apply the search-entry expansion procedure 1052 to the record and add the results to the search index 1054, and to add the record to the representative records store 1070.

2.6.8 Cluster Membership Determination in Batch Mode

Figure 11A:
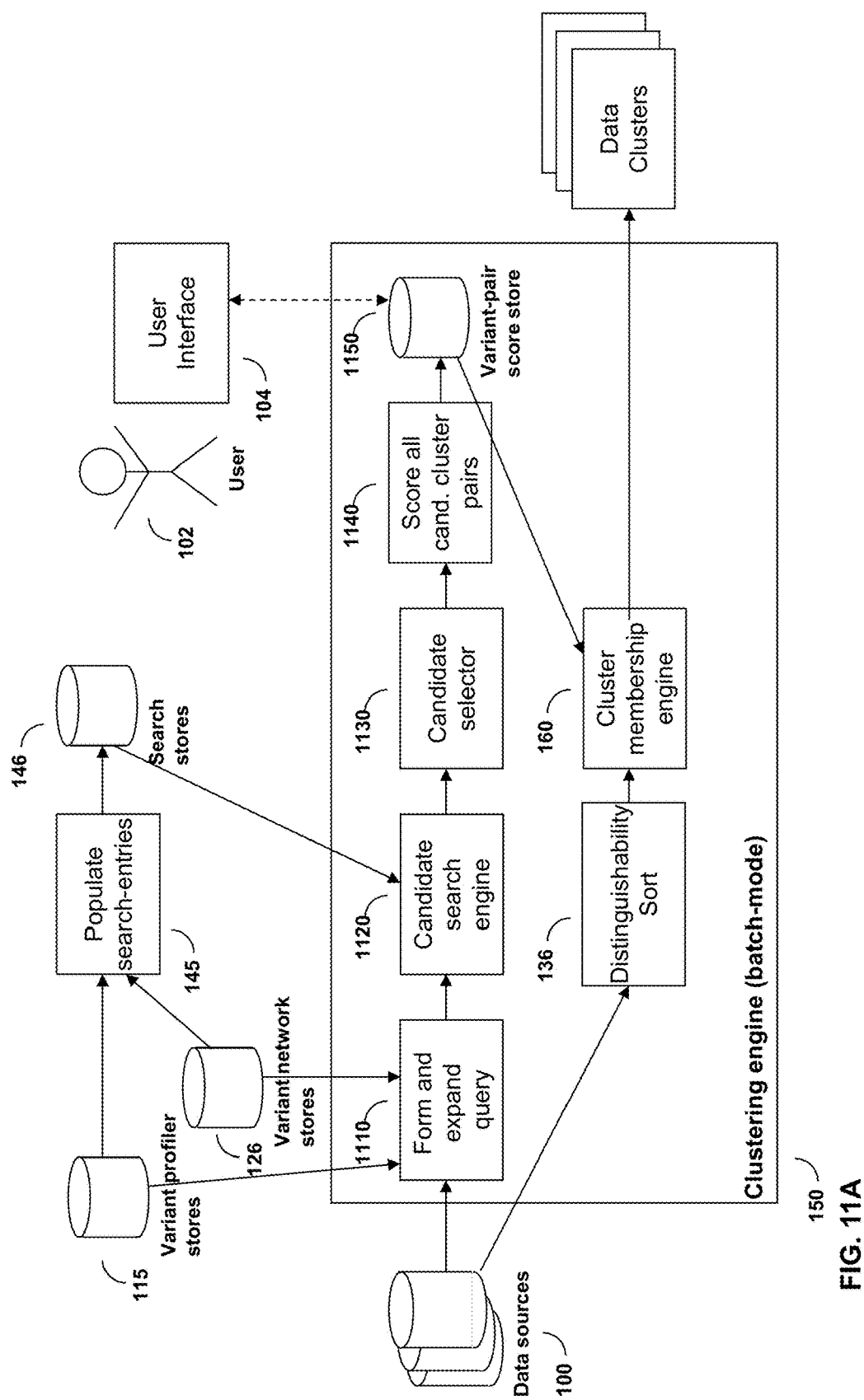
FIG. 11A-B is a flow-chart of an example of a process for clustering in batch mode.

The clustering process proceeds somewhat differently in a batch mode than in an incremental mode. FIG. 11A-D diagram the clustering process. In FIG. 11A, a high-level overview of the clustering process is given. The variant profiler stores 115 and variant network stores 126 may be read and processed through a search-entry expansion procedure to populate search-entries 145 in search stores 146.

This happens as a preprocessing step. The data source 100 is read. Raw queries are generated and expanded for each record 1110, in some implementations using data in the variant profiler stores 115 and variant network stores 126. The expanded queries may be formulated to approximate the cluster membership criteria in such a way as to exclude records which could not satisfy the cluster membership criteria. Expanded queries may be passed to the candidate search engine 1120 which retrieves raw candidate records from the search stores 146. The raw candidate records may be filtered by a candidate selector 1130 to select those which meet a proxy match criterion. In some implementations, the proxy match criterion may be realized in part using search codes, which encode the result of multiple searches made for each record. All candidate records meeting the proxy match criterion may be subjected to detailed scoring against the query record 1140 and their resulting scores may be saved in a variant-pair score store 1150.

In some implementations, a match code may be assigned to each pair to encode details behind the scoring decision, including the quality of score decisions for elements of the score (such as the quality of a name math or a post-code match) and encodings of the state of population of fields or combinations of fields in the records of the pair.

After all records in the data source 100 have been processed, and the variant-pair score store 1150 is complete, the data source records 100 are read again. Data source records may be processed by a cluster membership engine 1150 to determine to which cluster each data source record belongs, including creating new clusters and indicating when a cluster membership decision is ambiguous or marginal. A user 102 using a user interface 104 may review the variant-pair score store 1150. In some implementations, the user interface may graphically display the network of variant-pair scores, in which each record is a node and a variant-pair of candidate records is an edge. The user interface may record the overall score, score details (including constituent scores contributing to the overall score), search codes and match codes associated with the pair of candidate records. In some implementations, the user 102 may manipulate the variant-pair score store 1150 to add, remove or modify details of variant pairings.

Since the variant-pair score store is complete 1150 for the dataset 100, a batch mode cluster membership decision has a complete set of records available to make cluster membership decisions, rather than only records that have been previously processed, as in an incremental mode.

Figure 11B:
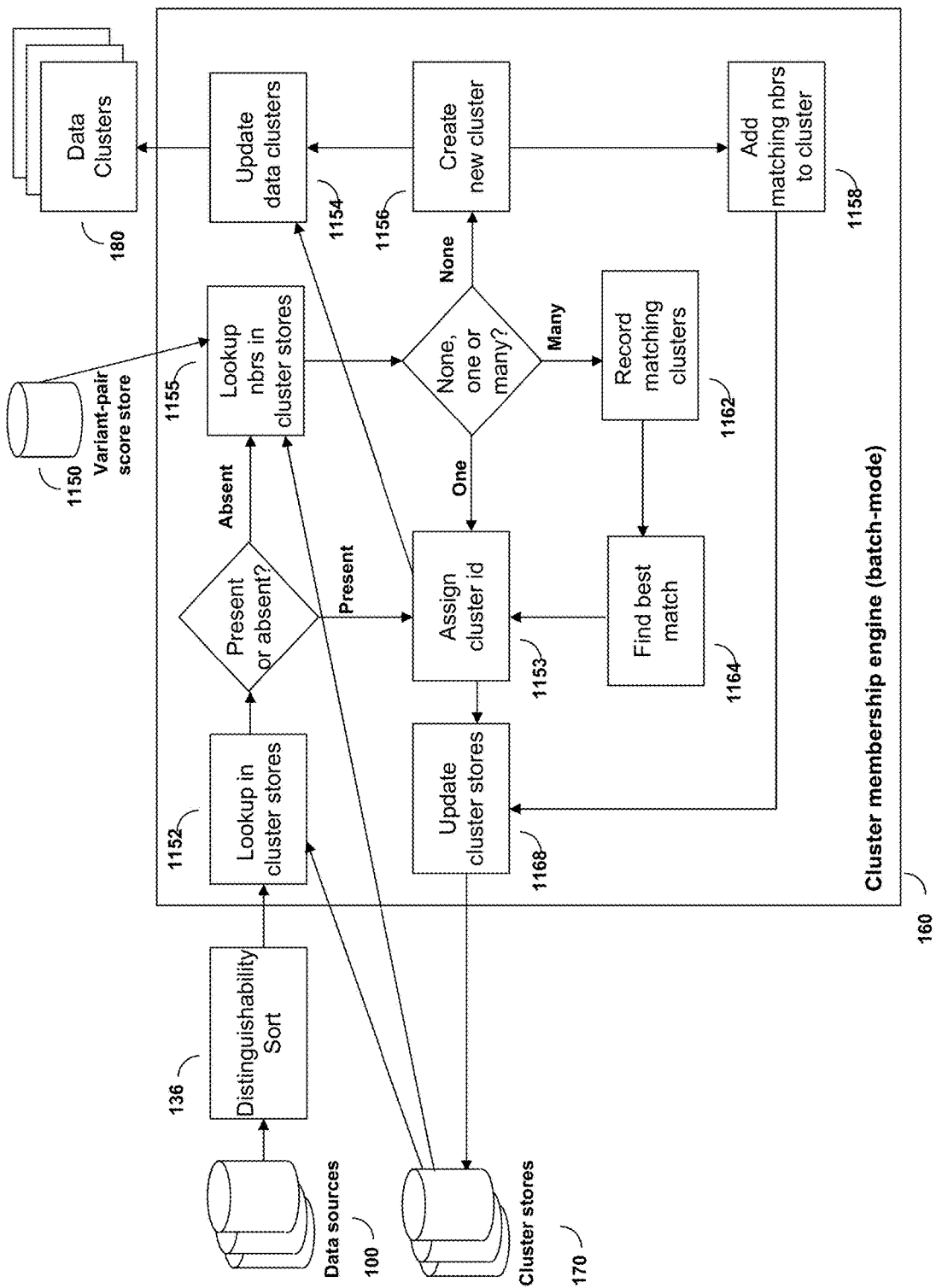

In FIG. 11B, one batch-mode implementation of the cluster membership engine is diagrammed. Data records are read from the same data source 100 processed to obtain the variant-pair score store 1150. In some implementations, the records may be sorted according to a distinguishability criterion 1151 to put more distinguishable records first. Population of cluster stores 170 and the data clusters 180 is incremental. Each query record is looked up 1152 in the cluster stores 170 on its unique record identifier (it is presumed one has already been attached) to determine if it is already a member of a cluster and if so, to retrieve the associated cluster id(s).

If the unique record identifier of the query record is already present in the cluster stores 170, then the query record must have been added to the cluster stores during processing of a previous data record. Assign the cluster id 1153, and update 1154 the data clusters 180.

If the unique record identifier is not present in the cluster stores, its variant paired records may be found 1155 from the variant-pair score store 1150 and those whose score is over a match threshold are retrieved. The match threshold indicates the records that would be similar enough to be in the same cluster were the original record a master record of a cluster. In the current setting, a master record may be considered to be the first member of a cluster. Most records are not therefore master records themselves, and this match threshold is used to identify records similar enough to support membership in the same cluster as the variant-paired record. Each variant-paired record may then be looked up in the cluster stores 1355 to determine if one or more of them has already been assigned to a cluster. There are three cases to consider: none of the variant-paired records is in the cluster stores, one is, or many are.

If none of the variant-paired records is already present in the cluster stores, then the current record is sufficiently distinct from existing clusters to be the first member of a new cluster. A new cluster is created 1156 based on the current record, and the data clusters are updated 1154 with the new cluster. In addition, each of the variant-paired records above the match threshold are added to the cluster, including the unique record identifier of each variant-paired record and the associated scoring information from the variant-pair score stores 1150. As mentioned above, records whose scores exceed the match threshold are similar enough to be in the same cluster as the current record were it the master record of a cluster, which it is as the first member of a new cluster. These records cannot be used to update the data clusters 180 because the information about the records is incomplete. Each record will be added to the data clusters 180 once it is read from the data source 100 and its unique record identifier is found in the cluster stores 170.

If one variant-pair record is found to be a member of an existing cluster, the current record is within the match threshold of a member of a cluster and is taken to be a member of that cluster. The current record is assigned the associated cluster id 1153. The data clusters 180 are then updated 1154 with the current record. The cluster search stores 170 may be updated 1168 with cluster information associated with the current record.

Figure 11C:
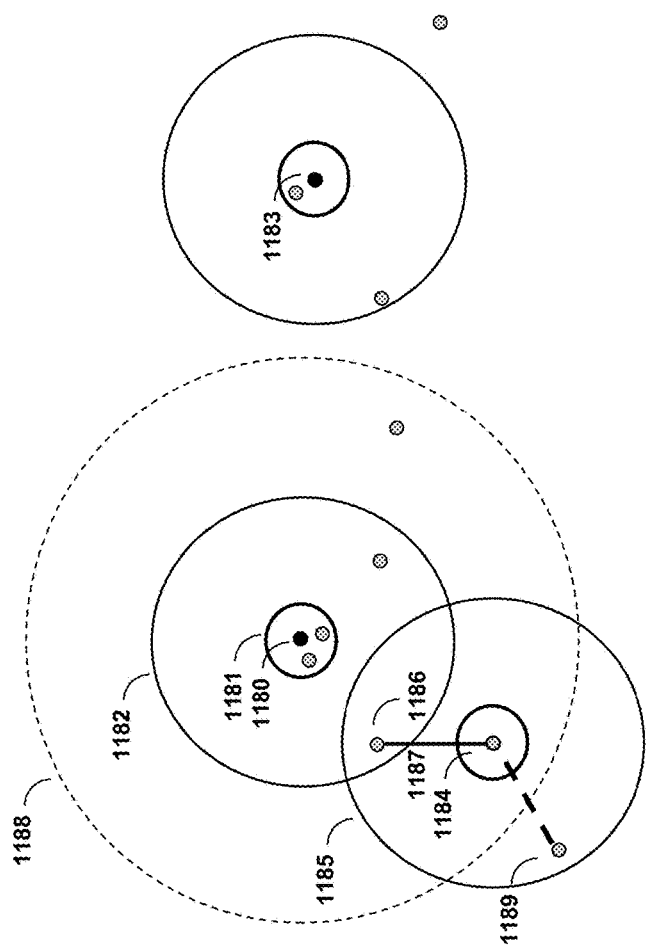
FIG. 11C illustrates an example of the cluster membership decision process for a query record matching one member of an existing cluster.

FIG. 11C provides an example in which one variant-pair record is a member of an existing cluster. A master record 1180 of an existing cluster is marked by a black filled-in circle. Non-master records are indicated by gray filled-in circles. A near-duplicate threshold 1181 encircles records that are very similar to the master record and might, for example, not be added to a representative records store 178 (one of the cluster stores 180). A match threshold 1182 encircles all records sufficiently similar to the master record to be a member of the cluster by direct association. A master record 1183 of a second disjoint cluster is shown, together with its near-duplicate and match threshold boundaries.

A current record 1184 is not a member of an existing cluster as it falls outside of the match threshold boundaries of the two clusters shown. Its own match threshold boundary 1185 encircles one data record 1186. This data record 1186 will be a variant-pair data record for the data record 1184 because it is within the match threshold (and hence would be a member of the cluster associated with data record 1184 were data record 1184 a master record, which here it is not). The data record 1186 is already a member of the cluster associated with master record 1180, and therefore the current data record 1184 is added to this cluster. Since the current data record is outside of the match threshold 1182, an edge 1187 is drawn to show the connection to the data record from which it derives cluster membership.

In some implementations, to limit the growth of clusters through chains of associations, an outer suspect threshold boundary 1188 may be drawn around the master record 1180 to limit the region in which a cluster member may be found. Data record 1189 is within a match threshold of data record 1184, now a member of the cluster, but it is outside of the suspect threshold boundary 1188 and therefore excluded from membership in the cluster of the master record 1180. Such marginal variant-pairings may also be distinguished in the graphical network diagram, as here with a dashed line.

Return to FIG. 11B. If many variant-pair records are found to be members of existing clusters, the set of clusters is deduplicated. If there is only one distinct cluster, the previous case applies. If there are several distinct clusters containing one or more variant-pair records of the current record, in one implementation, the best scores within each cluster and the corresponding matching variant pair record is recorded 1162 as evidence of the ambiguity or uncertainty of the cluster membership decision. The best match may be found 1164 by comparing the best score records from each distinct cluster. In the event of a tie, the current record is assigned to the cluster with lowest cluster id. In some implementations, the current record may be made a partial member of more than one cluster with weight determined by the relative scores with each cluster.

The associated cluster id is assigned 1153 to the current record. The data clusters 180 are updated 1154 with the current record. The cluster stores 170 are also updated 1168 with the cluster information associated with the current record, including the assigned cluster id and the list of alternative cluster membership pairings with their scores.

Figure 11D:
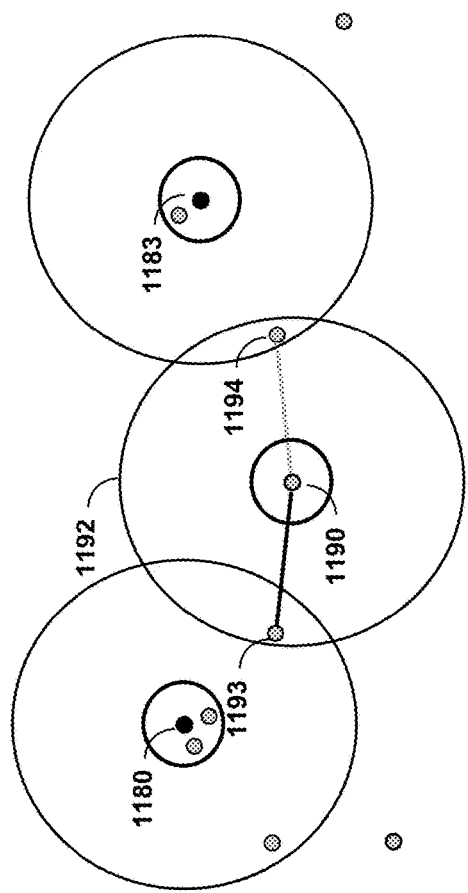
FIG. 11D illustrates an example of the cluster membership decision process for a query matching members of more than one existing cluster.

FIG. 11D illustrates an example in which a current data record is within the match threshold of two distinct clusters. As before, data records 1180 and 1183 are master records of distinct clusters with their respective near-duplicate and match threshold boundaries shown. A current data record 1190 is under consideration for cluster membership. It has two variant-pair records inside of its match threshold, data records 1193 and 1194. Each is respectively a member of the cluster associated with master records 1180 and 1183. Both clusters and these variant-paired records may be recorded in the cluster stores 180. Suppose the best score between the two is the score between current data record 1190 and the variant-pair data record 1193. The current data record 1190 will be assigned to the cluster of master record 1180, and its pairing with data record 1193 will be marked with a black edge. The alternative association with variant-pair data record 1194, and its associated cluster with master record 1183, will be recorded and marked by a gray edge.

In a graphical user interface 104, the network of clusters may be displayed with each data record as a node. Data records that are master records may be distinguished. Boundaries of the cluster circumscribing the collection of data records within a cluster may be drawn. Data records outside of the match boundary that are members of a cluster by virtue of a variant-pairing with a cluster member may be indicated by an edge. Those data records which are potentially members of more than one cluster may be highlighted. These are data records whose disposition may be subject to review by a user during the cluster approval process and distinguishing them and indicating their linkage to multiple clusters may assist the user in reaching a final decision on membership. The user 102 may use a user interface 104 to make such decisions as part of a review of the cluster network or as part of a cluster approval process, discussed below.

2.6.9 Variant-Lookup Procedure for Token-Pair Query Terms

Candidate records may be ranked based on the number of different queries for which the cluster id appears referenced by a search result. For example, cluster 1 may referenced by search results for three queries; cluster 10 may referenced by search results for two queries; cluster 15 may be referenced by search results for four queries, etc. . . . In some implementations, candidate records are given a score based on a ratio of the number of token-pair query terms that generated search results that reference the candidate record to the number of token-pair query terms. The score can be determined using the formula:

$$score_{candidate} = QueryPairs_{candidate}/QueryPairs$$

where $score_{candidate}$ is the score of the cluster. $QueryPairs_{candidate}$ is the number of queries that include any search result that identifies the cluster. And QueryPairs are the number of token-pair query terms looked up from the expanded query in the search store.

Candidate records may be identified by comparing the score to a candidate threshold. For example, matching half of the query pairs might be a good score.

In some implementations, supplementary information may be used in determining which candidates to keep. For example, the number of token-pair query terms (including adjacent query terms and query terms with an intervening query term) can be expressed in terms of the number of tokens in the query N as 2N−3. The candidate record has M tokens and therefore 2M−3 token-pair query terms. An example criterion which gives a good set of candidates is to require the number of matched query pairs be greater than or equal to 2*minimum(M,N)−5. The key feature of this expression is that it is aware that the candidate record might have fewer token-pairs than the query and consequently fewer matching pairs are required to have a possible match. Other expressions are possible.

2.6.10 Query Reject Handling

In some implementations, search results that reference too many distinct records may be discarded as not being sufficiently distinguishing. For example, a threshold for the maximum number of records returned by a token-pair query term might be 100, which allows a reasonable number of distinct records to be scored without wasting time if the token-pair query term were unhelpful. Cluster membership is typically determined by more than one field similarity score. If a token-pair query term returns a large number of clusters, this may mean that some other value is varying significantly across the set of candidates while the token-pair query term is not. After the number of retrieved records reaches the threshold, the token-pair query term may as well be dropped because it may not be as effective as other distinguishing information might be.

For single-token query terms, the threshold may be set lower, perhaps less than 10. The reasoning is that individual single-token query terms are in general not very distinguishing; in fact they may be most useful to detect matches with records containing tokens of only one word where a pair cannot be formed. If a single-token query term is not successful in finding a distinct match, it may be more productive to use some other piece of information that is more discriminating.

In some scenarios, a raw query may not produce any candidate queries, for example, it might be blank or null. Or, the query terms may all be rejected as too common, in which case no query can be made. In both cases, the record is rejected from the query process. An alternate query construction expression involving a different field (or combination of fields) may be used to formulate a useful query to drive the clustering. A cluster strategy identifier may be used to mark records to indicate under which query expression they were clustered.

For example, suppose a first clustering were based on government assigned identifier and a large number of records have a default value of, say, all zeroes. After 100 clusters are formed with government assigned identifier all zeroes (differing on other fields like name and date of birth), subsequent records will be rejected. In some implementations, all records, or a reduced set of representative records, sharing the too-common query term are extracted, including those already clustered and the other members of their clusters. This collection of records are reclustered using a new cluster strategy. The original cluster id under the old strategy may be saved for each record for later use. In this example, a new cluster strategy using a query based on name is likely to be more discriminating on this set of records and may be used to cluster the records where the government assigned identifier cluster strategy has failed. Generally, fields to use in constructing a query are selected from the most discriminating to the least discriminating. Incomplete records are less discriminating and lead to potentially ambiguous cluster membership decisions, so it is useful for them to be clustered separately from fully populated records.

When clustering under the second cluster strategy, it may be useful to use the too-common query as the segment value. This will restrict clustering to the records from the set sharing the common query value. After the second clustering, multiple match reconciliation of the old and new cluster ids may be used. The first and second clusterings may assign different sets of records to clusters because the choice of cluster strategy may affect cluster membership decisions. Multiple match reconciliation will attempt to merge clusters under the different strategies. The details of multiple match reconciliation are described below in a different but related context.

In some implementations, the search store 146 may contain search entries for multiple search-expansion procedures corresponding to queries using different fields (or combinations of fields). For example, the search store 146 may contain entries for clusters based on government assigned identifier queries. The search-store entries can be reexpanded, retaining the same cluster id keys, for name-based queries. That is, using the data clusters derived by clustering using a government assigned identifier query as a data source, search entries for a name-based query expression can be expanded. This amounts to reindexing the search store. If the set of existing clusters have been reindexed for a new query strategy, then processing rejected records does not require extracting and reprocessing related records but can proceed as a fresh clustering run using the reindexed search store for the new query.

2.6.11 Multiple Match Reconciliation

Figure 12:
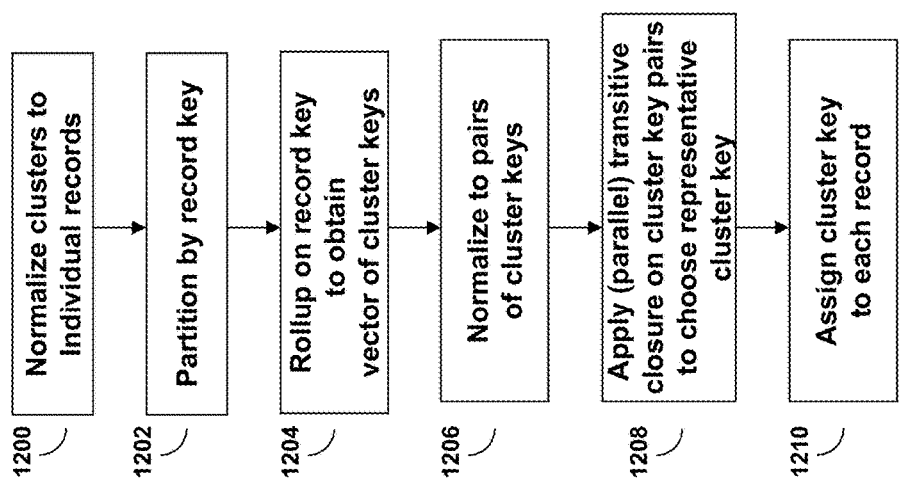
FIG. 12 is a flow-chart of an example of a process to reconcile multiple matches.

In FIG. 12, the multiple match reconciliation step procedure is diagrammed. If clusters are held in vectorized form, that is, if multiple cluster members are held together in a single record, the cluster members are normalized into individual records 1200. These records are partitioned by the unique record key 1202. This ensures that all replicants of each original data record are in the same partition. The data records are rolled up on record key to obtain a vector of distinct cluster keys associated with the record 1204. One cluster key, say the smallest, is selected as preferred. The vector is then normalized into cluster key pairs, pairing the preferred (here, the smallest) cluster key with each other distinct cluster key 1206. Transitive closure is then applied to set of all cluster key pairs. This results in an assignment of one cluster key to each network of connected cluster key pairs 1208, that is, to each cluster, and this cluster key is then assigned to each unique data record 1210.

Figure 13A:
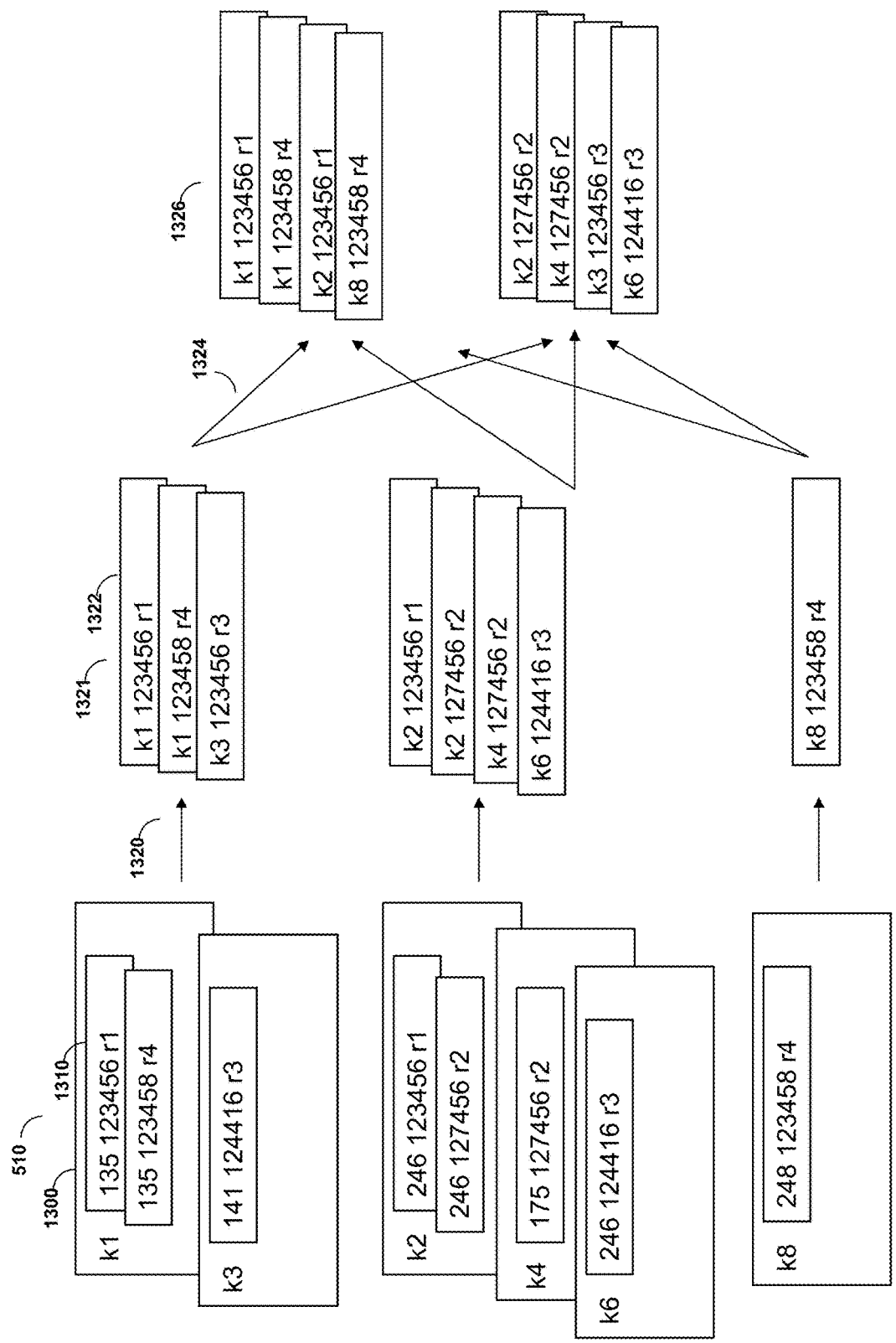
FIG. 13A-C illustrates an example of reconciling multiple matches.
Figure 13B:
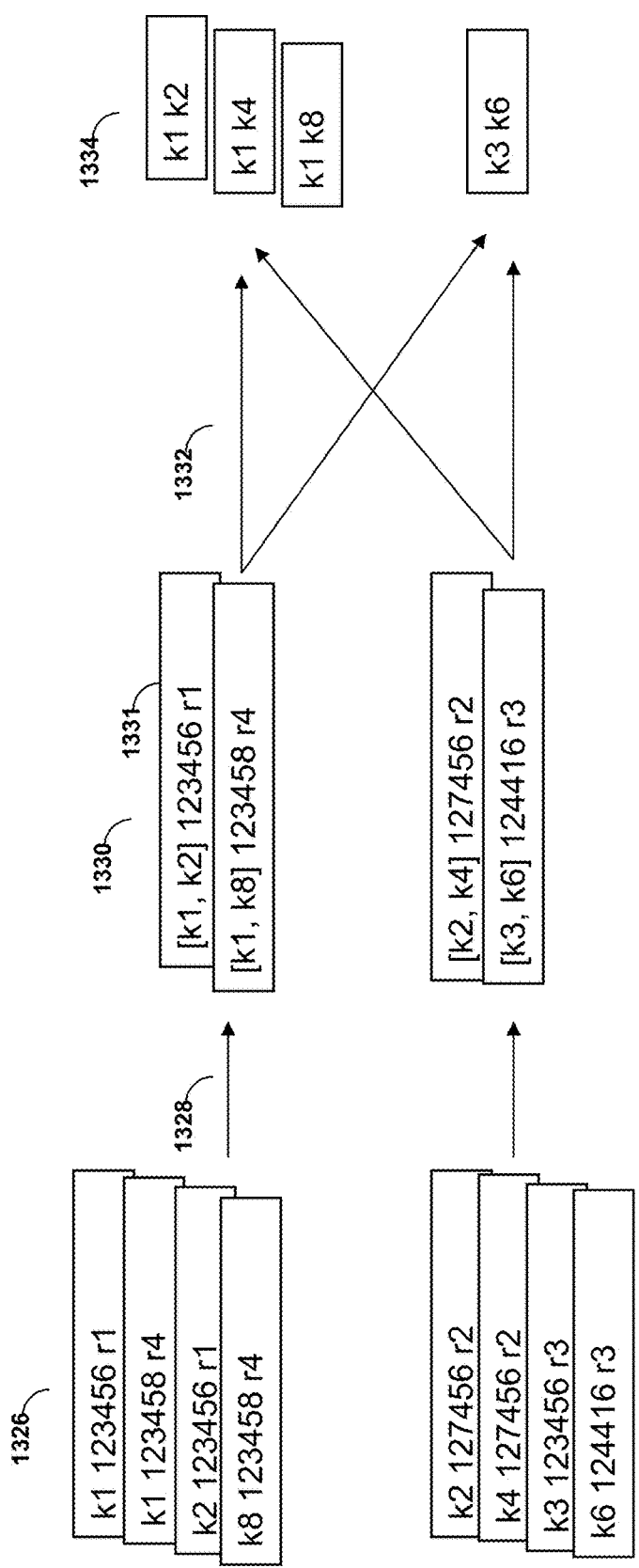
Figure 13C:
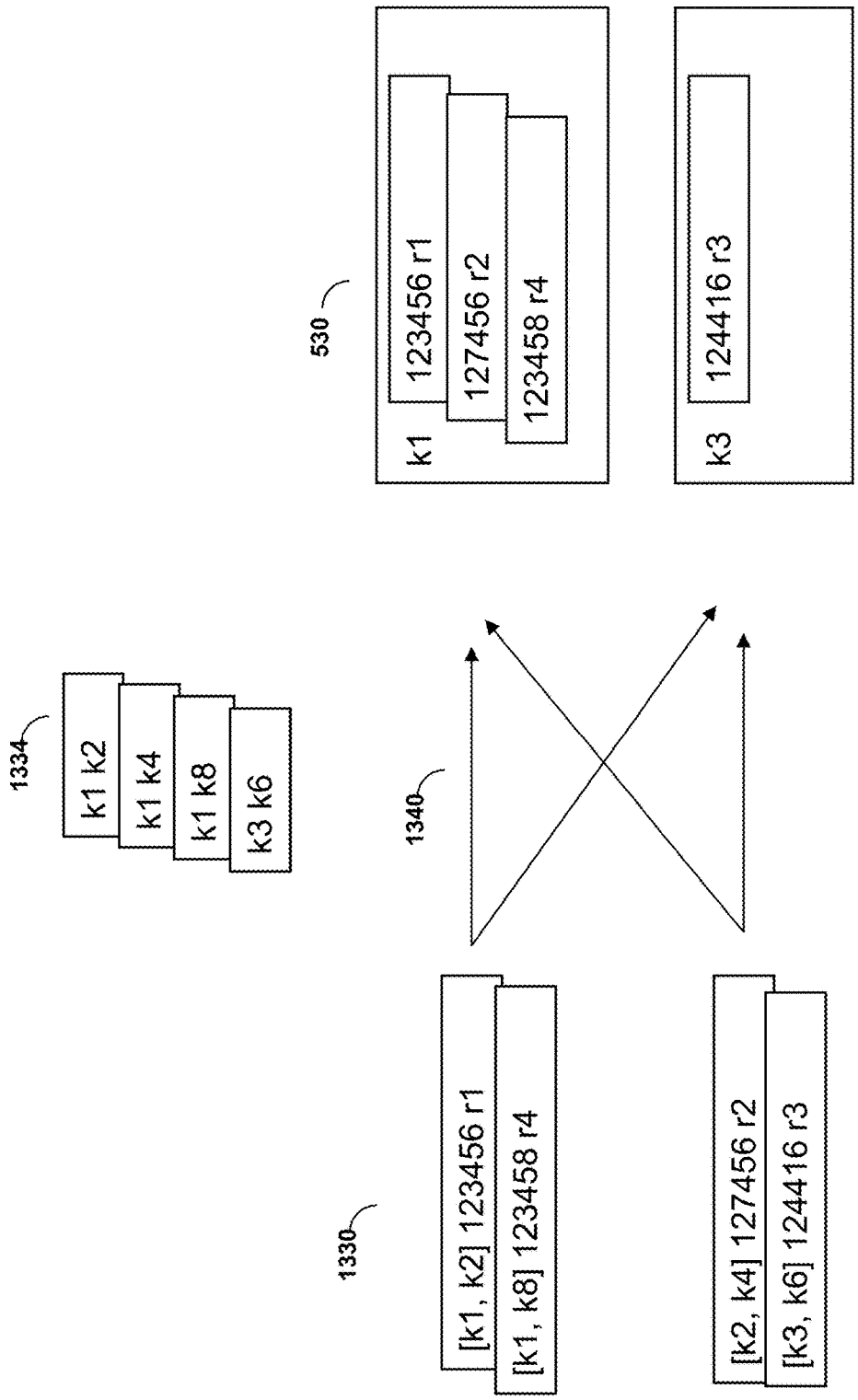

One implementation of the multiple match reconciler 165 is diagrammed in FIGS. 13A-C. In FIG. 13A, clusters of records 510 on multiple partitions are normalized 1320 into individual records 1321. In the first cluster 1300, k1 is the cluster id for a cluster containing two records. The first of these records 1310 has segment key "135," an id "123456," and a record key "r1." After normalization, the cluster key k1 is added to the record 1310 and the segment key is dropped, giving the record 1322. The normalized records 1321 are then repartitioned by the record key 1324. The result 1326 is that all records sharing a record key are present in the same partition.

In FIG. 13B, the records 1326 are rolled up on record key 1328 to produce records with unique record key, each containing vectors of cluster keys 1330. For example, record 1331 is the unique record with record key "r1." It has id "123456" and a vector of two cluster ids "[k1, k2]." Pairs of cluster keys are formed. Here they are already pairs. If the vectors were longer, for example, "[k1, k2, k5]," then pairs would be formed from adjacent elements in the vector: "[k1, k2]", "[k2, k5]". Transitive closure 1332 is applied to choose a unique representative cluster key for each set of connected pairs, giving the resulting pairing 1334.

In FIG. 13C, the records 1330 are assigned unique cluster keys using the mapping 1334 obtained from transitive closure 1332. The records are repartitioned on the cluster key 1340 and rolled up over cluster key into data clusters 530.

2.6.12 Cluster Approval Process

In some implementations, the master record may be designated by a user from among the members of a cluster as part of a cluster approval process that takes place after clustering. A cluster may have more than one master record. Multiple master records having the same cluster id are distinguished by a cluster sequence number.

The cluster approval process provides the user an opportunity to review the grouping of records into clusters through a UI and to make changes as desired. For example, the user may want to change which record or records in a cluster are designated as master records. The master record(s) serve as special representatives of the cluster, in particular they may sometimes be used for display and sometimes as the master record from which search store entries are formed. The user may feel some record other than the first member or centroid of the cluster is a better representative, perhaps because it has better values (to the user) in some of its fields. In some implementations, when the master record is changed, the master record store may be modified by adding the new master record and disabling or removing the previous master record. If the search store is based on the master record, it is modified to add entries corresponding to the new master record and to disable or remove those entries relating to the old master record.

The user may also choose to merge two clusters by manually indicating that the cluster id of one cluster should be remapped to the value of the cluster id of another cluster. For example, for a clustering based on a company name, the user may recognize that the company names on two clusters represent the same legal entity and should be held together in the same cluster. Cluster id 125 might hold records for "HSBC" while cluster id 192 holds records for "Midland Bank". These names are not matches under the similarity scoring rules, but the user knows that Midland Bank was acquired by HSBC and wants to cluster them together. The user may indicate that the cluster id 192 is to be remapped to cluster id 125. When the cluster approval changes are processed, in some implementations, the master record store may be modified to change the cluster id of the primary record with cluster id 192 to 125 and to set the cluster sequence to the next larger unused value. The search store entries associated with the master record may also be modified to change the cluster id from 192 to 125. In future clusterings, records having the name "Midland Bank" will find a candidate at cluster id 125 and may be clustered there along with "HSBC" records.

A user may choose to split clusters in a similar fashion. In some implementations, a record may be marked to be a member of a new cluster. On processing the cluster approval changes, the record may be added to the master records store as the master record of a new cluster and search-entries populated from the record may be added to the search stores.

In some implementations, search store entries are populated with the disjoint union of the entries generated from every cluster member, that is, each distinct entry generated by a search-entry expansion procedure by some member of the cluster is kept as an entry in the index linking to the cluster. This helps to expose the diversity of the cluster to the search process.

In some implementations, additional information may be stored in the search stores to facilitate evaluation of the viability of the candidate. For example, the number of tokens in a multiword field, like a business or personal name, may be stored in the search store.

Figure 14A:
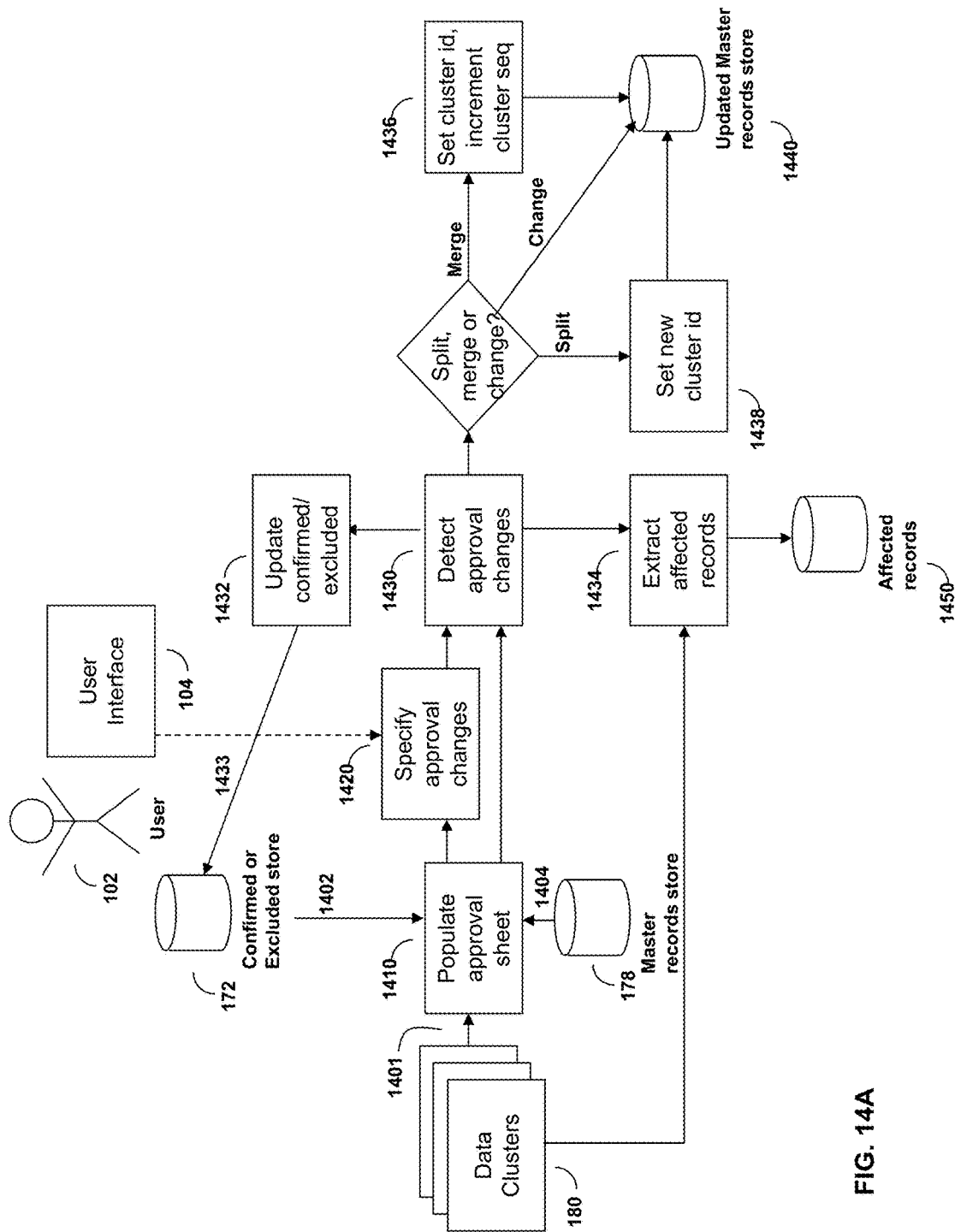
FIG. 14A-B is a flow-chart of an example of a cluster approval process.
Figure 14B:
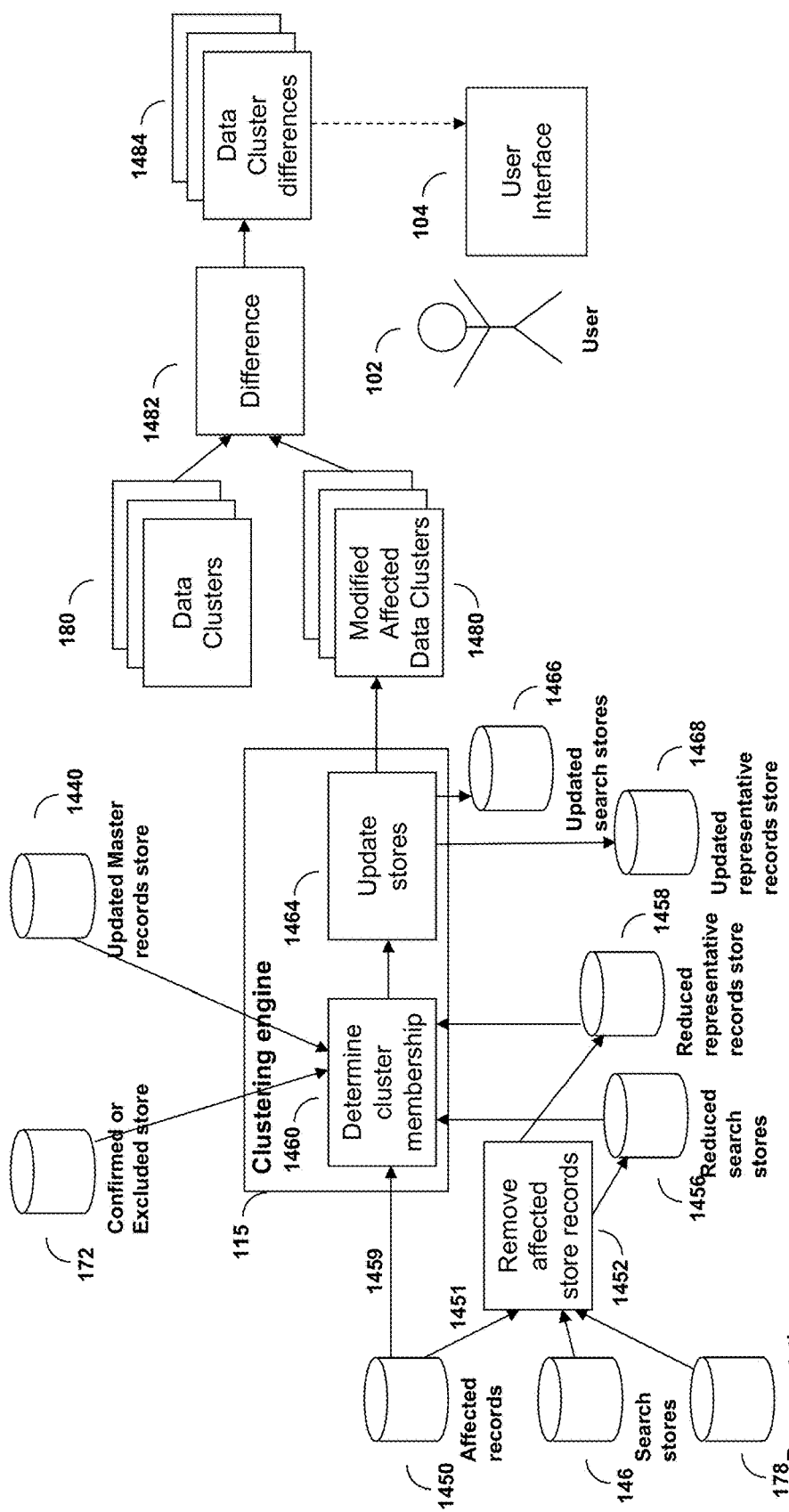

FIG. 14A-B diagrams the cluster approval process in more detail. In FIG. 14A, records from the data clusters 180 are read 1401 and an approval worksheet is populated containing a record for every member of selected data clusters, including the cluster id and other information from the data cluster record. In some implementations, columns in the approval sheet may be populated to indicate which records are confirmed and which are master records. A user 102 may view and edit the approval worksheet through a user interface 104 to specify approval changes 1420.

Any changes made by the user 102 (or through some automatic process) to the approval worksheet are detected 1430 by comparing the modified approval worksheet to the original.

In some implementations, a user 102 may confirm a record as a member of a cluster, in which event, the record, if presented to clustering in the future, will receive the current cluster id without further processing. In some implementations, an update procedure 1432 accomplishes this by adding 1433 the unique reference key of the record along with the current cluster id to a confirmed or excluded store 172, marking the record as confirmed. A user may also unconfirm a previously confirmed record in which event the record may be removed from the confirmed or excluded store 172 or marked as disabled by the update procedure 1432.

In some implementations, a user may exclude a record as a member of a cluster, in which event, the record, if presented to clustering in the future, will be blocked from membership in the cluster having the current cluster id without further processing. This may be used as a mechanism to induce the clustering algorithm to find the next best cluster for the record. In some implementations, exclusion is accomplished by a similar process as confirmation. An update procedure 1432 adds 1433 the unique reference key of the record along with the current cluster id to a confirmed or excluded store 172, marking the record as excluded. A user may unexclude a previously excluded record in which event the record may be removed from the confirmed or excluded store 172 or marked as disabled by the update procedure 1432.

In some implementations, which record is the master record of a cluster may be changed. The new master record may be stored in an updated master record store 1440 and the old master record may be removed from the master record store 1440 or disabled.

In some implementations, a record may be marked to be remapped to a new cluster. This has the effect of splitting an existing cluster. Such a marked record will have a new cluster id assigned 1438 and be stored as the master record of a new cluster in an updated master records store 1440. Only selected records need to be so marked as records closer to a marked record than to the master record of a current cluster will cluster with the marked record when records are reprocessed in a subsequent step.

In some implementations, a record may be remapped to an existing cluster. This has the effect of merging two clusters. For example, the record "Midland Bank" with cluster id 192 might be remapped to the "HSBC" cluster 125, thereby merging the clusters. When merging a record to an existing cluster, the record may be assigned the existing cluster id and becomes a new, additional master record for that cluster. In some implementations, the different master records of a cluster may be distinguished by a cluster sequence number. When a new master record is added to a cluster, the highest cluster sequence number is incremented 1436 before the record is added to the updated master records store 1440.

After appropriate updates have been made to the confirmed or excluded store 172 and the updated master records store 1440, all records potentially affected by the changes may be extracted 1434 from the data clusters 180 to give the dataset of affected records 1450. In some implementations, the affected records may be identified by extracting all records in a cluster from which a change has been initiated or to which a record has been remapped. The rationale is that the records in these clusters are all relatively close, in a sense relevant for cluster membership, yet are far enough from records in other clusters that changes to the members of these clusters will not affect membership decisions in other clusters.

In FIG. 14B, the process of reclustering records affected by cluster approval changes is diagrammed. The affected records 1450 are read 1451 and applied to the search stores and representatives stores to remove all records 1452 (except those which are confirmed) associated with the clusters in the affected records to produce reduced search stores 1456 and reduced representative stores 1458. This effectively returns the clustering process to an initial state for the affected records, with the exception that the confirmed or excluded stores 172 and updated master records store 1440 are already populated. The affected records 1450 are read 1459 and reclustered as in FIG. 9 using the confirmed or excluded stores 172, the updated master records store 1440, the reduced search stores 1456 and the reduced representative stores 1458.

Confirmed records will be assigned their existing cluster id. Affected records that are master records will be exact matches with themselves and will be assigned their associated cluster id. Excluded records will be blocked from particular clusters and will be assigned to other clusters as appropriate. This may and likely will be to a cluster not among the affected clusters. Such a reassignment is possible because the updated master records store 1440, reduced search stores 1456 and reduced representative stores 1458 contain records for all other clusters, so matching and assignment to the other clusters is possible. All other records will go where the usual cluster membership decision process takes them. Records more similar to a remapped record than the records of a previous cluster will be assigned to the cluster of the remapped record. This happens both for splitting and merging of clusters.

As records are processed, the reduced search stores 1456 and the reduced representative stores 1458 are repopulated 1464 to produce the updated search stores 1466 and updated representative stores 1468. The result of cluster membership decisions are written to a dataset of modified affected data clusters 1480. This may be compared 1482 to the original data clusters 180 to find the data cluster differences 1484. In some implementations, before and after lists or graphical images of the clusters may be shown to a user 102 in a user interface 104. The user 102 may then choose to iterate by making further approval changes and repeating the process or to discard the changes and to start over. When the user is satisfied with the approval changes, the data clusters 180 and the cluster stores 170, including the confirmed or excluded store 172, the master records store 174, the search stores 146, and the representative records store 178, may be published to be used for future clustering of new data sources.

3 Clustering Against Remote Systems

Clustering records against the data clusters held in a remote clustering system that is isolated, in particular, one that does not export any data, may be handled by a modification of the cluster membership procedure in incremental mode. The essential requirement is that, in addition to the query, certain additional data found during the clustering process on the originating system must be passed to the remote clustering system. The additional data are the variants, both at the level of tokens and of candidate records, that represent the range of variation on the originating system. These variants are required to make a comprehensive search and cluster match on the remote system.

A query may come in two forms. It may be a query formed from a query record, in which case the query record is passed along with the query. Or, it may be an isolated query with no associated query record, in which case it is simply passed on its own. This affects scoring of candidate matching records later in the process.

For tokens, each token in the originating system may have variant tokens in the remote system that are not present in the originating system. To find these new variants, every variant related to a token participating in the originating clustering process must be passed to the remote system. In some implementations, to capture the full range of variation in tokens, the collected neighborhoods of tokens corresponding to all token-representatives paired with any token in the original expanded query are retrieved and passed to the remote clustering system. On the remote system, these original tokens are added to the variant profiler and variant network stores to determine new variant pairings between the original system and the remote system and updated variant profiler and variant network stores are written. Token-representatives are formed in the updated variant network stores. Token-representatives must remain as originally created on the remote system because the search stores are indexed by these token-representatives. The new original variant tokens, i.e. those tokens from the originating system not already present in the remote variant profiler or variant network stores, are added to existing token-representative neighborhoods.

A similar requirement to pass all original variants applies to representative records retrieved from the representative records store after suitably matching candidate records have been determined, i.e. those meeting a selection criteria appropriate for the query. These representative records span the diversity of records on the originating system that satisfy the query selection criteria. Each of these records may find variant pairings on the remote system that might otherwise go undetected.

If both the variant tokens and the representative records related to the query are passed to the remote system along with the query, the cluster membership procedure described above in incremental mode may be applied to retrieve all records matching a query according to specified selection criteria. In some applications, for example, fraud detection or forensic investigation, the selection criteria for retrieving records related to a query may be different than the cluster membership criteria used to determine cluster membership. Cluster membership typically favors more restrictive criteria to avoid false positive identification, that is, placing a record in the wrong cluster, while forensic queries favor avoid looser criteria to avoid false negatives, that is, missing a record that should be a match.

Figure 15A:
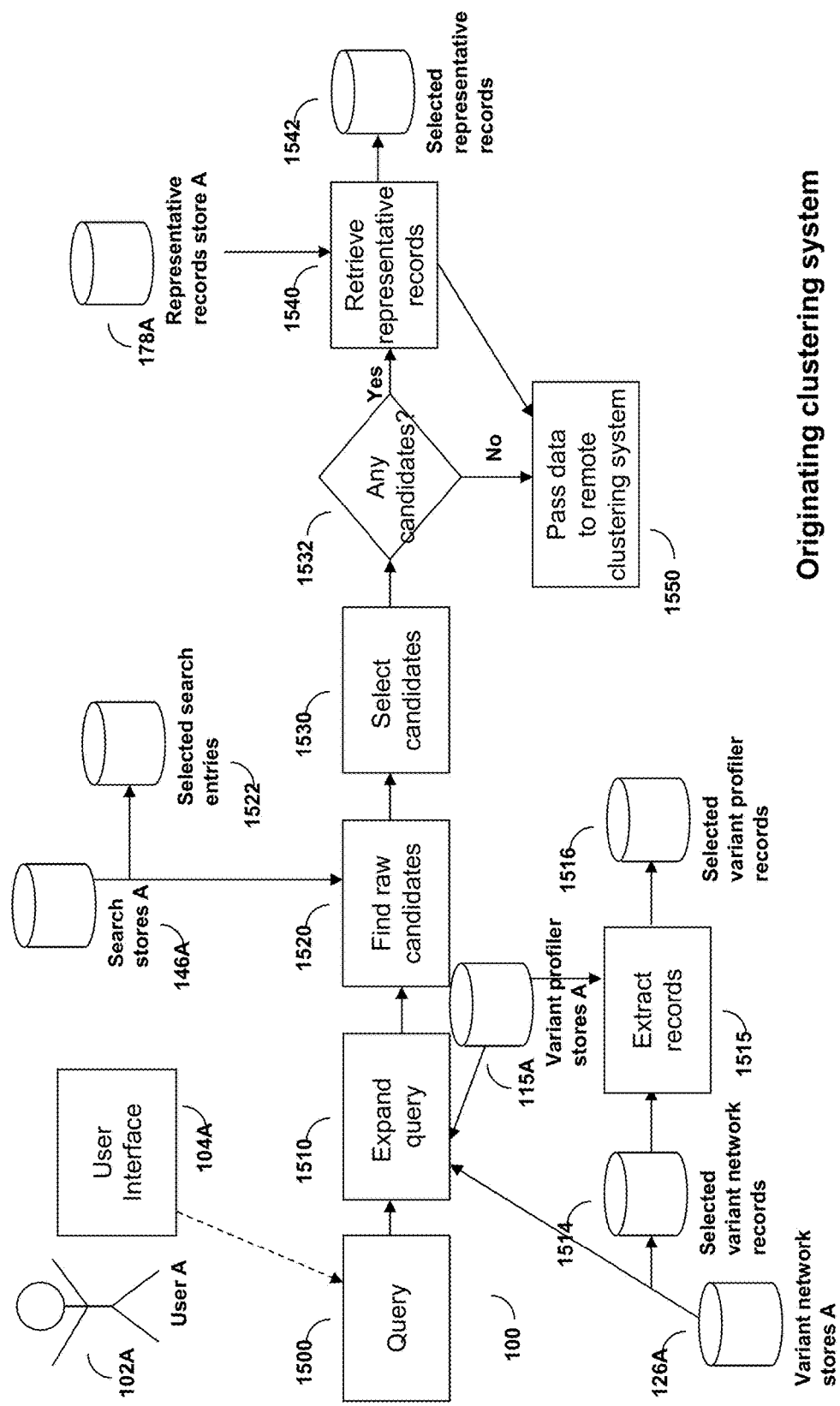
FIG. 15A-C is a flow-chart of an example of clustering originating on one system and continuing on a remote system.
Figure 15B:
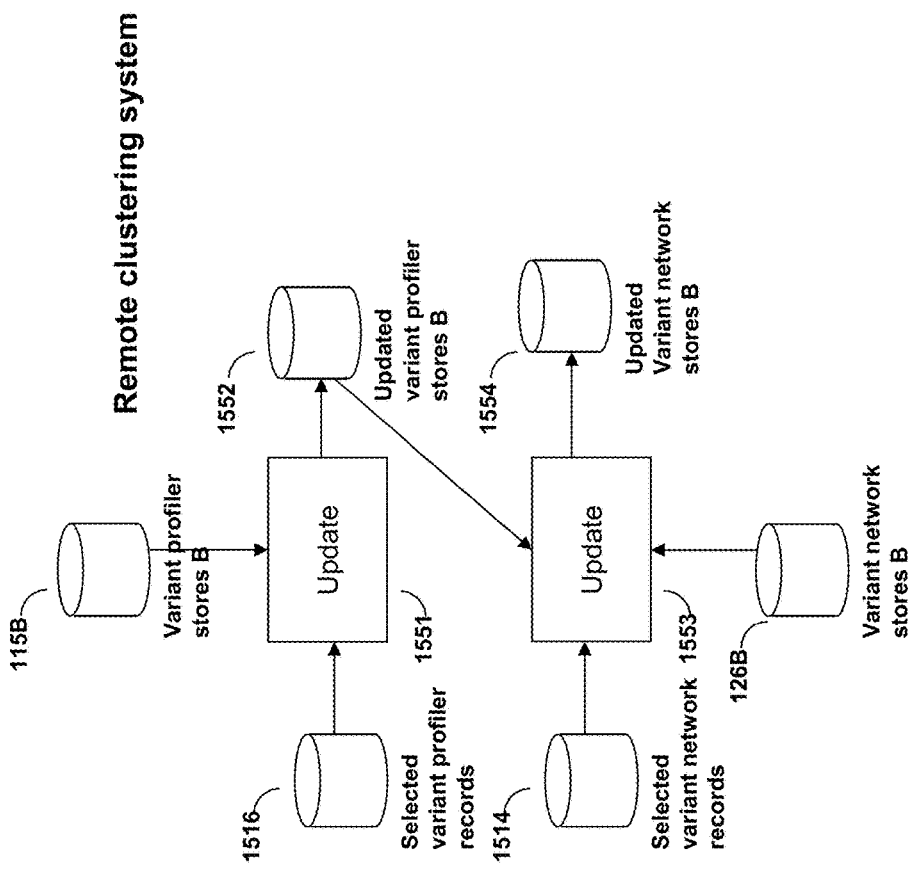
Figure 15C:
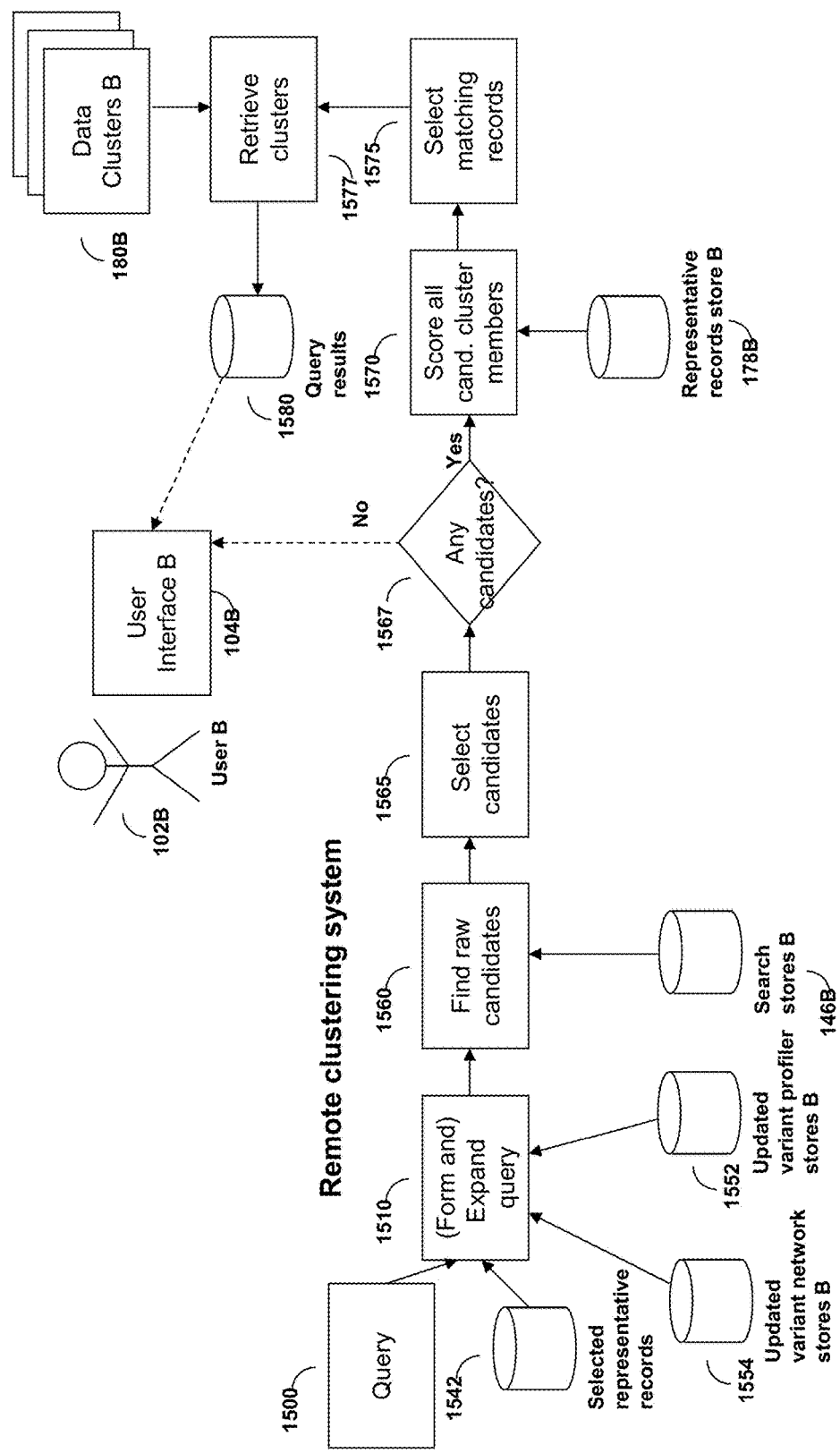

In FIG. 15A-C, an example of a query made against a remote clustering system is diagrammed. In FIG. 15A, user A 102A using a user interface 104A submits a query 1500 to a local clustering system. In some implementations, the query may be expanded 1510, drawing on records from the variant profiler stores 115A to find variant tokens paired with each token in the raw query and on records from the variant network stores 126A, for example, to find token-representatives to replace the variant tokens in the expanded query. As described above, the neighborhoods of the token-representatives for those tokens in the variant network stores 126A are extracted and held as selected variant network records 1514. Every token in the selected variant network records may be extracted 1515 from the variant profiler stores 115A and held as selected variant profiler records 1516.

Raw candidates are found 1520 from the expanded query using the search stores 146A. The search entries used may be held in selected search entries 1522. The query selection criteria is applied 1530 to the raw candidate records to select candidate records. If there are candidate records, the representative records contained in the clusters associated with the candidate records are retrieved 1540 from the representative records store 178A and held as selected representative records 1542. The query 1500 and the various selected records 1514, 1516 and 1542, if any, are passed to the remote clustering system where they are received (not shown) for processing by the remote clustering system.

In FIG. 15B, the received selected variant profiler records 1516 are used to update 1551 the variant profiler store 115B on the remote system to produce an updated variant profiler store 1552. In some implementations, this may be a temporary update used only for the purpose of this query. The received selected variant network records 1514 and the updated variant profiler store 1552 are used to update 1553 the variant network store 126B to produce the update variant network store 1554.

In FIG. 15C, the received query 1500 and the received selected representative records 1542 are read. Raw queries are formed from each selected representative record and together with the originating query are expanded 1510 to expanded queries, using the update variant profiler stores 1552 and updated variant network stores 1554. Raw candidate records are found 1560 in the remote search stores 146B. A query selection criteria is applied to the raw candidate records to find 1565 those meeting the selection criteria. A filter is applied 1567. If there are no candidates, this is reported to the user 102B through the user interface 104B.

If there are candidates, they are used to retrieve representative records from their corresponding clusters in the representative records store 178B which are then scored against the current query record, that is, either the original query record or an original representative record from which the current query was formed. If the original query itself did not have an associated query record, all representative records are taken. In some implementations, when there is a query record associated with the original query, this too is scored against the retrieved representative records 178B and the score reported along with the score between the current query record and the representative record.

The resulting scores between the current query record and representative records 178B are compared with the query match criteria and if the match criteria are met 1575, data cluster records are retrieved 1577 from the remote data clusters 180B and stored as query results 1580. The query results are then reported to the user 102B through the user interface 104B.

4 Implementations

The clustering, segmentation, and parallelization techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer, or delivered (encoded in a propagated signal) over a communication medium of a network to a storage medium of the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described above.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method, including:
   processing a first set of original records by a first processing entity to generate a second set of records that includes the original records and one or more copies of each original record, each original record including one or more fields, and the processing of each of at least some of the original records including
      generating at least one copy of the original record, and
      associating a first segment value with the original record and associating a second segment value with the copy, where the first segment value corresponds to a first portion of one or more data values of respective fields of the original record and the second segment value correspond to a second portion of the one or more data values of the respective fields of the original record, and where the second portion is different from the first portion, and
   partitioning the second set of records among a plurality of recipient processing entities based on the segment values associated with the records in the second set, and, at each recipient processing entity, performing an operation based on one or more data values of the records received at the recipient processing entity to generate results.

2. The method of claim 1, wherein the first segment value corresponds to a first sequence of characters from a first data value of a first field taken from a first set of positions of the characters in the first data value, and the second segment value corresponds to a second sequence of characters from the first data value taken from a second set of positions of the characters in the first data value.

3. The method of claim 2, wherein the first set of positions are non-overlapping with the second set of positions.

4. The method of claim 3, wherein the first set of positions are even positions relative to the first character of the data value, and the second set of positions are odd positions relative to the first character of the data value.

5. The method of claim 1, wherein associating a segment value with a record includes writing the associated segment value into a new field of the record.

6. The method of claim 1, wherein performing an operation based on the one or more data values of the records received at the recipient processing entity includes determining a match between character strings occurring in one or more data values of a first record and character strings occurring in one or more data values of at least a second record.

7. The method of claim 6, wherein the match is an approximate match.

8. The method of claim 7, wherein the approximate match allows the strings being matched to be different up to a specified edit distance.

9. The method of claim 7, wherein the approximate match is based on a match criterion that defines allowed differences between a data value of the first record and a data value of the second record, and wherein, for each original record, the first portion of the one or more data values and the second portion of the one or more data values are selected so that at least one of the first segment value or the second segment value does not change in response to a change of the one or more data values according to any of the allowed differences.

10. The method of claim 9, wherein the allowed differences include differences between a first character string occurring in the data value of the first record and a second character string occurring in the data value of the second record.

11. The method of claim 9, wherein the allowed differences include differences between a first binary value occurring in the data value of the first record and a second binary value occurring in the data value of the second record.

12. The method of claim 1, wherein performing an operation based on the one or more data values of the records received at the recipient processing entity includes surrogate key assignment.

13. The method of claim 12, wherein the results generated at the recipient processing entity include, for each record received at the recipient processing entity, the record augmented with an assigned surrogate key based on the one or more data values of the record.

14. The method of claim 1, wherein performing an operation based on the one or more data values of the records received at the recipient processing entity includes clustering the received records into one or more clusters.

15. The method of claim 14, wherein the results generated at the recipient processing entity include, for each record received at the recipient processing entity, the record augmented with an assigned cluster based on the one or more data values of the record and the one or more data values of at least some of the other records received at the recipient processing entity.

16. The method of claim 1, wherein the operation includes at least one of: surrogate key assignment, clustering, roll-up, or join.

17. The method of claim 1, wherein the first segment value corresponds to a first portion of multiple data values of respective fields of the original record and the second segment value correspond to a second portion of the multiple data values of the respective fields of the original record, and where the second portion is different from the first portion.

18. The method of claim 1, further including receiving results from each recipient processing entity at a second processing entity, and processing the received results to remove redundant results.

19. The method of claim 18, wherein the second set of records includes the original records and at least one copy of each original record.

20. The method of claim 19, wherein processing the received results to remove redundant results includes selecting at most one of: a first result associated with an original record, or a second result associated with a copy of the original record.

21. The method of claim 1, further including receiving results from each recipient processing entity at the first processing entity, and processing the received results to remove redundant results.

22. The method of claim 1, wherein each of the recipient processing entities perform the respective operations independently.

23. The method of claim 1, wherein the number of recipient processing entities is at least as large as the smallest number of different segment values associated with each original record and its copies.

24. The method of claim 1, wherein the processing entities are cores in a multicore processor, and the first processing entity sends the partitioned records from the second set of records to the recipient processing entities over an interconnection network in the multicore processor.

25. The method of claim 1, wherein the processing entities are processors in a multi-processor computer system, and the first processing entity sends the partitioned records from the second set of records to the recipient processing entities over an interconnection network in the multi-processor computer system.

26. The method of claim 1, wherein the processing entities are server computers in a rack-mounted server system, and the first processing entity sends the partitioned records from the second set of records to the recipient processing entities over an interconnection network in the rack-mounted server system.

27. The method of claim 1, wherein the processing entities are computer systems in communication over a network, and the first processing entity sends the partitioned records from the second set of records to the recipient processing entities over the network.

28. A computer program stored on a non-transitory computer-readable medium, the computer program including instructions for causing a computing system to:
process a first set of original records by a first processing entity to generate a second set of records that includes the original records and one or more copies of each original record, each original record including one or more fields, and the processing of each of at least some of the original records including
generating at least one copy of the original record, and
associating a first segment value with the original record and associating a second segment value with the copy, where the first segment value corresponds to a first portion of one or more data values of respective fields of the original record and the second segment value correspond to a second portion of the one or more data values of the respective fields of the original record, and where the second portion is different from the first portion, and
partition the second set of records among a plurality of recipient processing entities based on the segment values associated with the records in the second set, and, at each recipient processing entity, perform an operation based on one or more data values of the records received at the recipient processing entity to generate results.

29. A computing system, including:
a first processing entity that includes at least one processor configured to process a first set of original records to generate a second set of records that includes the original records and one or more copies of each original record, each original record including one or more fields, and the processing of each of at least some of the original records including generating at least one copy of the original record, and associating a first segment value with the original record and associating a second segment value with the copy, where the first segment value corresponds to a first portion of one or more data values of respective fields of the original record and the second segment value correspond to a second portion of the one or more data values of the respective fields of the original record, and where the second portion is different from the first portion, and a plurality of recipient processing entities receiving respective subsets of the second set of records partitioned based on the segment values associated with the records in the second set, each recipient processing entity configured to perform an operation based on one or more data values of the records received at the recipient processing entity to generate results.

30. A method, including:

partitioning a set of records by a first processing entity into multiple subsets of records; and processing different subsets of the set of records by different respective recipient processing entities and storing results in data storage accessible to each of the recipient processing entities, the processing by each recipient processing entity including performing an operation on at least one record in the subset based on determining whether or not there is an approximate match between one or more values of one or more fields of the record and an entry within local reference information maintained by the recipient processing entity, and performing an operation on at least one record in the subset based on determining whether or not there is an approximate match between one or more values of one or more fields of the record and an entry within the data storage that was provided by any of the other recipient processing entities, and updating the data storage based on the local reference information maintained by the recipient processing entity.

31. The method of claim 30, wherein the data storage accessible to each of the recipient processing entities includes a non-volatile storage medium.

32. The method of claim 31, wherein the local reference information maintained by each recipient processing entity is stored in a volatile storage medium.

33. The method of claim 30, wherein the approximate match allows the values being matched to be different up to a specified edit distance.

34. The method of claim 30, wherein performing an operation on each record in the subset includes surrogate key assignment.

35. The method of claim 34, wherein results generated at a recipient processing entities include, for each record received at the recipient processing entity, the record augmented with an assigned surrogate key based on the one or more values of the record.

36. The method of claim 30, wherein performing an operation on each record in the subset includes clustering the records into one or more clusters.

37. The method of claim 36, wherein results generated at a recipient processing entity include, for each record received at the recipient processing entity, the record augmented with an assigned cluster based on the one or more values of the record and the one or more values of at least some of the other records received at the recipient processing entity.

38. The method of claim 30, wherein the operation includes at least one of: surrogate key assignment, clustering, roll-up, or join.

39. A computer program stored on a non-transitory computer-readable medium, the computer program including instructions for causing a computing system to:

partition a set of records by a first processing entity into multiple subsets of records; and process different subsets of the set of records by different respective recipient processing entities and storing results in data storage accessible to each of the recipient processing entities, the processing by each recipient processing entity including performing an operation on at least one record in the subset based on determining whether or not there is an approximate match between one or more values of one or more fields of the record and an entry within local reference information maintained by the recipient processing entity, and performing an operation on at least one record in the subset based on determining whether or not there is an approximate match between one or more values of one or more fields of the record and an entry within the data storage that was provided by any of the other recipient processing entities, and updating the data storage based on the local reference information maintained by the recipient processing entity.

40. A computing system, including:

a first processing entity that includes at least one processor configured to partition a set of records into multiple subsets of records; and a plurality of recipient processing entities each configured to process a different respective subset of the set of records and store results in data storage accessible to each of the recipient processing entities, the processing by each recipient processing entity including performing an operation on at least one record in the subset based on determining whether or not there is an approximate match between one or more values of one or more fields of the record and an entry within local reference information maintained by the recipient processing entity, and performing an operation on at least one record in the subset based on determining whether or not there is an approximate match between one or more values of one or more fields of the record and an entry within the data storage that was provided by any of the other recipient processing entities, and updating the data storage based on the local reference information maintained by the recipient processing entity.

* * * * *